United States Patent [19]
Boesch et al.

[11] Patent Number: 5,870,473
[45] Date of Patent: Feb. 9, 1999

[54] ELECTRONIC TRANSFER SYSTEM AND METHOD

[75] Inventors: Brian Paul Boesch, Herndon, Va.; Stephen David Crocker, Bethesda, Md.; Donald Eggleston Eastlake, III, Carlisle, Mass.; Alden Sherburne Hart, Jr., Arlington, Va.; Robert A. Lindenberg, Sudbury, Mass.; Denise Marie Paredes, Centreville, Va.

[73] Assignee: CyberCash, Inc., Reston, Va.

[21] Appl. No.: 572,425

[22] Filed: Dec. 14, 1995

[51] Int. Cl.$^6$ .................................................... H04K 1/00
[52] U.S. Cl. .................................. 580/21; 380/25; 380/29
[58] Field of Search .................................. 380/21, 25, 23, 380/30, 29

[56] References Cited

U.S. PATENT DOCUMENTS

| | | | |
|---|---|---|---|
| 3,956,615 | 5/1976 | Anderson et al. | 235/61.7 B |
| 4,529,870 | 7/1985 | Chaum | 235/380 |
| 4,799,156 | 1/1989 | Shavit et al. | 364/401 |
| 4,906,828 | 3/1990 | Halpern | 235/379 |
| 5,224,164 | 6/1993 | Elsner | 380/44 |
| 5,235,642 | 8/1993 | Wobber et al. | 380/25 |
| 5,349,642 | 9/1994 | Kingdon | 380/25 |
| 5,369,705 | 11/1994 | Bird et al. | 380/21 |
| 5,410,602 | 4/1995 | Finkelstein et al. | 380/21 |
| 5,420,926 | 5/1995 | Low et al. | 380/24 |
| 5,428,745 | 6/1995 | de Bruijn et al. | 395/200 |
| 5,434,918 | 7/1995 | Kung et al. | 380/21 |
| 5,453,601 | 9/1995 | Rosen | 235/379 |
| 5,455,407 | 10/1995 | Rosen | 235/380 |
| 5,465,206 | 11/1995 | Hilt et al. | 364/406 |

(List continued on next page.)

FOREIGN PATENT DOCUMENTS

| | | | |
|---|---|---|---|
| 0048903A1 | 9/1980 | European Pat. Off. | H04L 9/00 |
| 0254812A2 | 2/1988 | European Pat. Off. | H04L 9/00 |
| 2261579 | 2/1992 | United Kingdom . | |
| 2279537 | 7/1993 | United Kingdom | H04K 1/00 |
| 2296413 | 1/1996 | United Kingdom . | |
| 2301919 | 12/1996 | United Kingdom . | |
| 95/16947a1 | 12/1993 | WIPO | G06F 1/00 |
| 97/03410A1 | 7/1995 | WIPO | G06F 17/60 |
| 96/33568A1 | 10/1996 | WIPO | H04L 9/32 |

OTHER PUBLICATIONS

Woo, T., et al., "Authentication for Distributed Systems", In: Computer, Jan. 1992, pp. 39–52.

Akl, S. G., "Digital Signatures: A Tutorial Survey", In: Computer, Feb. 1983, pp. 15–24.

Cox, B., et al., "NetBill Security and Transaction Protocol", http://www.ini.cmu.edu/NETBILL/publications/Usenix.html, date unknown.

Dyson, P.E., "Toward Electronic Money: Some Internet Experiments", The Seybold Group On Desktop Publishing, vol. 9, No. 10, Jun. 10, 1995, pp. 3–11.

"Exploring the World of Cyberpayments: An Introductory Survey", Colloquium Sponsored by Financial Crimes Enforcement Network, U.S. Department of the Treasury, Sep. 27, 1995.

(List continued on next page.)

*Primary Examiner*—David C. Cain
*Attorney, Agent, or Firm*—Roberts & Brownell, LLC

[57] ABSTRACT

A system and method relating to secure communications in a communication network is disclosed. The invention uses sessions having limited duration to enable parties to communicate securely in the communication network. The session of one party is independent from the session of another party. The sessions are linked at a server which confirms that the sessions are valid.

In a preferred embodiment, the secure communications occur in an electronic transfer system. In the electronic transfer system, a customer and a merchant can conduct a transaction wherein the customer can purchase a product from the merchant and pay for the product using electronic funds.

25 Claims, 73 Drawing Sheets

U.S. PATENT DOCUMENTS

| | | | |
|---|---|---|---|
| 5,535,276 | 7/1996 | Ganesan | 380/25 |
| 5,555,309 | 9/1996 | Kruys | 380/21 |
| 5,574,785 | 11/1996 | Ueno et al. | 380/21 |
| 5,602,918 | 2/1997 | Chen et al. | 380/21 |
| 5,604,801 | 2/1997 | Dolan et al. | 380/21 |
| 5,627,892 | 5/1997 | Kauffman | 380/21 |

OTHER PUBLICATIONS

Glassman, S., et al., "The Millicent Protocol for Inexpensive Electronic Commerce", http://www.research.digital.com/SRC/personal/Mark_Manasse/common/millicent/millicent.html#SECTION310, date unknown, pp. 3, 5.

Hallam–Baker, P.M., "Micro Payment Transfer Protocol (MPTP)", Version 0.1, http://www.w3.org/pub/WWW/TR/WD–mptp–95–11–22, Nov. 22, 1995.

Linehan, M., "Internet Keyed Payments Protocol (IKP)", http://www.zurich.ibm.com:80/Technology/Security/extern/ecommerce/spec, Jul. 1995, pp. 3, 7.

Marion, L., "Who's Guarding the Till at the Cybermall?", DATAMATION, Feb. 15, 1995, pp. 38–41.

Mao, W., "Financial Transaction Models in the Electronic World", http://www.zurich.ibm.com:80/Technology/Security/extern/ecommerce/spec, Jun. 29, 1995.

"Secure Electronic Payment Protocol (SEPP)", Draft Version 1.2, http://www.mastercard.com/Sepp/sepptoc.html, Nov. 3, 1995, Part 1, Sections 1, 2, 5.

"NetCheque: Papers and Documentation Describing Net-Cash(SM)and NetCheque(SM)", http://nii.isi.edu/info/netcheque/documentation.html,date unknown.

Neuman, B.C., et al., "Kerberos: An Authentication Service for Computer Networks", IEEE Communications, vol. 32, No. 9, Sep. 94, pp. 33–38.

Sirbu, M., et al., "Netbill: An Internet Commerce System Optimized for Network–Delivered Services", IEEE Personal Communications, Aug. 1995, pp. 34–39.

VISA International Service Association and Microsoft Corporation, "Secure Transaction Technology Version 1.0", http://www.visa.com/visa–stt/, Sep. 26, 1995, Sections 1.1, 1.2, 3 and 4.

Figure 4B

Table Illustrating Server Persona Data Structure 120

120.1

| 120A | persona-id |
|---|---|
| 120B | email |
| 120C | public-key |
| 120D | date-registered |
| 120E | language |
| 120F | autoclose-passphrase |
| 120G | cash-container |
| 120H | instrument-binding-data |
| 120I | agreements |

Figure 4C

Table Illustrating Fields of Cash-Container-Data 120G

| 120G.1 | Currency |
|---|---|
| 120G.2 | Available-balance |
| 120G.3 | On-hold-balance |
| 120G.4 | Agency-account-number |

Figure 4D

Table Illustrating Fields of Instrument Binding Data 120H

| | |
|---|---|
| 120H.1 | Persona-ID |
| 120H.2 | Instrument-Type |
| 120H.3 | Instrument-Sub-Type |
| 120H.4 | Instrument-Number |
| 120H.5 | Instrument-SubNumbers |
| 120H.6 | Instrument-Native-Currency |
| 120H.7 | Legal-Agreements |
| 120H.8 | Instrument-Prefix |
| 120H.9 | Instrument-Hash |
| 120H.10 | Issuer-Identification-Number |
| 120H.11 | Instrument-Holder-Name |
| 120H.12 | Instrument-Holder-Address |
| 120H.13 | Instrument-Bind-Date |
| 120H.14 | Instrument-First-Used-Date |
| 120H.15 | Binding-Status |
| 120H.16 | Sale-Transaction-Enabled |
| 120H.17 | Sale-Transaction-Limit |
| 120H.18 | Credit-Transaction-Enabled |
| 120H.19 | Credit-Transaction-Limit |
| 120H.20 | Load-Cash-Enabled |
| 120H.21 | Load-Cash-Transaction-Limit |
| 120H.22 | Unload-Cash-Enabled |
| 120H.23 | Unload-Cash-Transaction-Limit |
| 120H.24 | AutoClose-Binding |
| 120H.25 | Sale-Transaction-Limit-Time |
| 120H.26 | Credit-Transaction-Limit-Time |
| 120H.27 | Load-Transaction-Limit-Time |
| 120H.28 | Unload-Transaction-Limit-Time |

Figure 4E

Table Illustrating Server Persona Data Structure 120

120.2

| 120AA | persona-id |
|---|---|
| 120BB | email |
| 120CC | public-key |
| 120DD | date-registered |
| 120EE | content-language |
| 120FF | autoclose-passphrase |
| 120GG | cash-container |
| 120HH | instrument-binding-data |
| 120II | agreements |

Figure 4F

Table Illustrating Fields of Cash-Container-Data 120GG

| 120GG.1 | Currency |
|---|---|
| 120GG.2 | Available-balance |
| 120GG.3 | On-hold-balance |
| 120GG.4 | Agency-account-number |

Figure 4G

Table Illustrating Fields of Instrument Binding Data 120HH

| 120HH.1 | Persona-ID |
|---|---|
| 120HH.2 | Instrument-Type |
| 120HH-3 | Instrument-Sub-Type |
| 120HH.4 | Instrument-Number |
| 120HH.5 | Instrument-SubNumbers |
| 120HH.6 | Instrument-Native-Currency |
| 120HH.7 | Legal-Agreements |
| 120HH.8 | Instruments-Prefix |
| 120HH.9 | Instrument-Hash |
| 120HH.10 | Issuer-Identification-Number |
| 120HH.11 | Instrument-Holder-Name |
| 120HH.12 | Instrument-Holder-Address |
| 120HH.13 | Instrument-Bind-Date |
| 120HH.14 | Instrument-First-Used-Date |
| 120HH.15 | Binding-Status |
| 120HH.16 | Sale-Transaction-Enabled |
| 120HH.17 | Sale-Transaction-Limit |
| 120HH.18 | Credit-Transaction-Enabled |
| 120HH.19 | Credit-Transaction-Limit |
| 120HH.20 | Load-Cash-Enabled |
| 120HH.21 | Load-Cash-Transaction-Limit |
| 120HH.22 | Unload-Cash-Enabled |
| 120HH.23 | Unload-Cash-Transaction-Limit |
| 120HH.24 | AutoClose-Binding |
| 120HH.25 | Sale-Transaction-Limit-Time |
| 120HH.26 | Credit-Transaction-Limit-Time |
| 120HH.27 | Load-Transaction-Limit-Time |
| 120HH.28 | Unload-Transaction-Limit-Time |

Figure 4H

Table Illustrating Customer Session Record of Server
Session Data Structure 130

130.1

| 130A | Session-ID |
|---|---|
| 130B | Session-Key |
| 130C | Session-Salt |
| 130D | Currency |
| 130E | Opening-Amount |
| 130F | Current-Amount |
| 130G | Opening-Date |
| 130H | Closing-Date |
| 130I | Key-Use-Limit |
| 130J | Key-Lifetime |
| 130K | Persona-ID |
| 130L | Status |
| 130M | Memo |
| 130N | Transaction-Data |

Figure 4I

Table Illustrating Fields of Transaction Data 130N

| 130N.1 | amount |
|---|---|
| 130N.2 | payer-session-id |
| 130N.3 | payee-order-id |
| 130N.4 | payee-session-id |
| 130N.5 | payer-index |

Figure 4J

Table Illustrating Session Record of Server
Session Data Structure 130

130.2

| 130AA | Session-ID |
|-------|------------|
| 130BB | Session-Key |
| 130CC | Session-Salt |
| 130DD | Currency |
| 130EE | Opening-Amount |
| 130FF | Current-Amount |
| 130GG | Opening-Date |
| 130HH | Closing-Date |
| 130II | Key-Use-Limit |
| 130JJ | Key-Lifetime |
| 130KK | Persona-ID |
| 130LL | Status |
| 130MM | Memo |
| 130NN | Transaction-Data |

Figure 4K

Table Illustrating Field of Transaction Data 130NN

| 130NN.1 | amount |
|---|---|
| 130NN.2 | payer-session-id |
| 130NN.3 | payee-order-id |
| 130NN.4 | payee-session-id |
| 130NN.5 | payee-index |

Figure 4L

Table Illustrating Record 140.1 of Message Log Data Structure 140

| 140A | persona-id |
|---|---|
| 140B | session-id |
| 140C | transaction-number |
| 140D | index |
| 140E | incoming-message |
| 140F | response-message |

Figure 5B

Table Illustrating Record of Customer Application Data Structure 215

215.1

| 215A | Server-100-public-key |
|---|---|
| 215B | URL-of-server-100 |

Figure 5C

Table Illustrating Record of Customer Persona Data Structure 220

220.1

| 220A | persona-id |
|---|---|
| 220B | email |
| 220C | public-key |
| 220D | autoclose-passphrase |
| 220E | language |
| 220F | default-name-and-address |
| 220G | software-options |
| 220H | private-key |
| 220I | cash-container-data |
| 220J | instrument-binding-data |
| 220K | autoclose-account |
| 220L | agreements |
| 220M | active-sessions-data |
| 220N | pending-log-data |
| 220O | transaction-log-data |

Figure 5D

Table Illustrating Record of Customer Instrument Binding
Data Structure 230

230.1

| 230A | instrument-number |
|---|---|
| 230B | instrument-description |
| 230C | holder-name |
| 230D | holder-address |
| 230E | holder-city |
| 230F | holder-country |
| 230G | holder-zip-code |
| 230H | holder-country-code |
| 230I | holder-area-code |
| 230J | holder-telephone |
| 230K | currency |
| 230L | transaction-sale-flag |
| 230M | transaction-credit-flag |
| 230N | unload-funds-flag |
| 230O | load-funds-flag |
| 230P | status |
| 230Q | instrument-salt |
| 230R | instrument-recurring-data |
| 230S | agreements |

Figure 5E

Table Illustrating Record of Customer Active Session
Data Structure 240

240.1

| 240A | Session-ID |
|---|---|
| 240B | Session-Key |
| 240C | Session-Salt |
| 240D | Currency |
| 240E | Opening-Amount |
| 240F | Current-Amount |
| 240G | Index |
| 240H | Memo |
| 240J | Key-Use-Limit |
| 240K | Key-Lifetime |

Figure 5F

Table Illustrating Customer Pending Log
Data Structure 250

| Record | Description |
|---|---|
| 251 | Pending Persona Registration/Update Persona Information |
| 252 | Pending Link/Update Financial Instrument Binding |
| 253 | Pending Cash Payment |
| 254 | Pending Load/Unload Funds |
| 255 | Pending Open Session |
| 256 | Pending Close Session |

Figure 5G

Table Illustrating Record of Pending Registration/
Update Persona Information Record 251

| 251A | Transaction-Type |
|---|---|
| 251B | Transaction-Number |
| 251C | Transaction-Date/Time |
| 251D | Software-Version |
| 251E | Language |
| 251F | Currency |
| 251G | Requested-Persona-ID |
| 251H | Email |
| 251I | Autoclose-Passphrase |
| 251J | Original-Transaction-String |

Figure 5H

Table Illustrating Pending Link/Update Instrument
Binding Record 252

| 252A | Transaction-Type |
|---|---|
| 252B | Transaction-Number |
| 252C | Transaction-Date/Time |
| 252D | Software-Version |
| 252E | Persona-ID |
| 252F | Instrument-Number |
| 252G | Customer-ID |
| 252H | Name-On-Instrument |
| 252I | Instrument-Expiration-Date |
| 252J | Holder-Address |
| 252K | Holder-City |
| 252L | Holder-State |
| 252M | Holder-Zip-Code |
| 252N | Holder-Country |
| 252O | Holder-Country-Code |
| 252P | Holder-Area-Code |
| 252Q | Holder-Telephone |
| 252R | Description-Of-Instrument |
| 252S | Instrument-Recurring-Data |
| 252T | Instrument-Type |
| 252U | Salt |
| 252V | Autoclose-Account-Flag |
| 252W | Original-Transaction-String |

Figure 5I

Table Illustrating Pending Cash Payment Record 253

| | |
|---|---|
| 253A | Transaction-Type |
| 253B | Transaction-Number |
| 253C | Transaction-Date/Time |
| 253D | Software-Version |
| 253E | Persona-ID |
| 253F | Order-ID |
| 253G | Merchant-ID |
| 253H | Amount |
| 253I | Memo |
| 253J | Pay-To-URL |
| 253K | Session-ID |
| 253L | Index |
| 253M | Original-Transaction-String |
| 253N | URL-cancel |
| 253O | URL-success |
| 253P | URL-failure |

Figure 5J

Table Illustrating Pending Load/Unload Funds Record 254

| 254A | Transaction-Type |
|---|---|
| 254B | Transaction-Number |
| 254C | Transaction-Date/Time |
| 254D | Software-Version |
| 254E | Persona-ID |
| 254F | Instrument-Account-Number |
| 254G | Amount |
| 254H | Account-Type |
| 254I | Original-Transaction-String |

Figure 5K

Table Illustrating Pending Open Session Record 255

| 255A | Transaction-Type |
|---|---|
| 255B | Transaction-Number |
| 255C | Transaction-Date/Time |
| 255D | Software-Version |
| 255E | Persona-ID |
| 255F | Amount |
| 255G | Key-Use-Limit-Requested |
| 255H | Key-Lifetime-Requested |
| 255I | Session-User-Description |
| 255J | Currency |
| 255K | Original-Transaction-String |

Figure 5L

Table Illustrating Pending Close Session Record 256

| 256A | Transaction-Type |
|------|------------------|
| 256B | Transaction-Number |
| 256C | Transaction-Date/Time |
| 256D | Software-Version |
| 256E | Persona-ID |
| 256F | Transaction-Log |
| 256G | Session-ID |
| 256H | Session-User-Description |
| 256I | Original-Transaction-String |

Figure 5M

Table Illustrating Customer Log Data Structure 260

| Record | Description |
|---|---|
| 261 | Persona Registration/Update-Persona-Information Response |
| 262 | Link/Update Instrument Binding Response |
| 263 | Cash Payment Response |
| 264 | Load/Unload Funds Response |
| 265 | Open Session Response |
| 266 | Payment Request |
| 267 | Close Session Response |

Figure 5N

Table Illustrating Persona Registration/Update Response Record 261

| 261A | Transaction-Type |
|---|---|
| 261B | Transaction-Number |
| 261C | Transaction-Date/Time |
| 261D | Software-Severity-Code |
| 261E | Software-Message |
| 261F | Response-Code |
| 261G | Response-Message |
| 261H | Requested-Persona-ID |
| 261I | Suggested-Persona-ID |
| 261J | Email |
| 261K | Language |
| 261L | Currency |

Figure 5O

Table Illustrating Link/Update Instrument Response Record 262

| 262A | Transaction-Type |
|---|---|
| 262B | Transaction-Number |
| 262C | Transaction-Date/Time |
| 262D | Software-Severity-Code |
| 262E | Software-Message |
| 262F | Response-Code |
| 262G | Response-Message |
| 262H | Persona-ID |
| 262I | Instrument-Number |
| 262J | Instrument-Type |
| 262K | Customer-ID |
| 262L | Name-On-Instrument |
| 262M | Instrument-Expiration-Date |
| 262N | Holder-Address |
| 262O | Holder-City |
| 262P | Holder-State |
| 262Q | Holder-Zip-Code |
| 262R | Holder-Country |
| 262S | Holder-Country-Code |
| 262T | Holder-Area-Code |
| 262U | Holder-Telephone |
| 262V | Description-of-instrument |
| 262W | Currency |
| 262X | Issuer |
| 262Y | Issuer-country |
| 262Z | Autoclose-flag |

Figure 5P

Table Illustrating Cash Payment Response Record 263

| 263A | Transaction-Type |
|------|------------------|
| 263B | Transaction-Number |
| 263C | Transaction-Date/Time |
| 263D | Response-Code |
| 263E | Response-Message |
| 263F | Persona-ID |
| 263G | Order-ID |
| 263H | Merchant-ID |
| 263I | Merchant-Message |
| 263J | Amount |
| 263K | User-Memo |
| 263L | Session-Id |
| 263M | Index |

Figure 5Q

Table Illustrating Load/Unload Response 264

| 264A | Transaction-Type |
|---|---|
| 264B | Transaction-Number |
| 264C | Transaction-Date/Time |
| 264D | Software-Severity-Code |
| 264E | Software-Message |
| 264F | Response-Code |
| 264G | Response-Message |
| 264H | Persona-ID |
| 264I | Instrument-Account-Number |
| 264J | Amount |
| 264K | Fee |
| 264L | Balance |
| 264M | On-hold-balance |

Figure 5R

Table Illustrating Open Session Response Record 265

| 265A | Transaction-Type |
|---|---|
| 265B | Transaction-Number |
| 265C | Transaction-Date/Time |
| 265D | Software-Severity-Code |
| 265E | Software-Message |
| 265F | Response-Code |
| 265G | Response-Message |
| 265H | Persona-ID |
| 265I | Amount |
| 265J | Key-Use-Limit |
| 265K | Key-Lifetime |
| 265L | Session-ID |
| 265M | Session-user-description |
| 265N | Fee |
| 265O | Balance |

Figure 5S

Table Illustrating Payment Request Record 266

| 266A | Merchant-ID |
|---|---|
| 266B | Order-ID |
| 266C | Amount(s) |
| 266D | Credit-Cards-Accepted |
| 266E | Merchant-Note |
| 266F | Pay-to-URL |

Figure 5T

Table Illustrating Close Session Response Record 267

| 267A | Transaction-Type |
|---|---|
| 267B | Transaction-Number |
| 267C | Transction-Date/Time |
| 267D | Software-Severity-Code |
| 267E | Software-Message |
| 267F | Response-Code |
| 267G | Response-Message |
| 267H | Persona-ID |
| 267I | Amount |
| 267J | Transaction-Log |
| 267K | Fee |

Figure 5U

Table Illustrating Record of Customer Cash Container
Data Structure 280

280.1

| 280A | Currency |
|---|---|
| 280B | Available-balance |
| 280C | On-hold-balance |

Figure 6B

Table Illustrating Record of Merchant Appliation
Data Structure 315

| 315A | Server-100-public-key |
|------|-----------------------|
| 315B | URL-of-server-100     |

Figure 6C

Table Illustrating Record of Customer Persona Data Structure 320

320.1

| 320A | persona-id |
|------|------------|
| 320B | email |
| 320C | public-key |
| 320D | autoclose-passphrase |
| 320E | language |
| 320F | default-name-and-address |
| 320G | software-options |
| 320H | private-key |
| 320I | cash-container-data |
| 320J | instrument-binding-data |
| 320K | autoclose-account |
| 320L | agreements |
| 320M | active-sessions-data |
| 320N | pending-log-data |
| 320O | transaction-log-data |

Figure 6D

Table Illustrating Record of Merchant Instrument
Binding Data Structure 330

| | |
|---|---|
| 330A | instrument-number |
| 330B | instrument-description |
| 330C | holder-name |
| 330D | holder-address |
| 330E | holder-city |
| 330F | holder-country |
| 330G | holder-zip-code |
| 330H | holder-country-code |
| 330I | holder-area-code |
| 330J | holder-telephone |
| 330K | currency |
| 330L | transact-sale-flag |
| 330M | transact-credit-flag |
| 330N | unload-funds-flag |
| 330O | load-funds-flag |
| 330P | status |
| 330Q | instrument-salt |
| 330R | instrument-recurring-data |
| 330S | agreements |

Figure 6E

Table Illustrating Record of Merchant Session Data Structure 340

340.1

| 340A | Session-ID |
|---|---|
| 340B | Session-Key |
| 340C | Session-Salt |
| 340D | Currency |
| 340E | Opening-Amount |
| 340F | Current-Amount |
| 340G | Opening-Date |
| 340H | Closing-Date |
| 340J | Key-Use-limit |
| 340K | Key-lifetime |

Figure 6F

Table Illustrating Record of Merchant Cash-Container-Data
Data Structure 345

345.1

| 345A | Currency |
|---|---|
| 345B | Available-balance |
| 345C | On-hold-balance |

Figure 7A

Table Illustrating Record of Merchant Amount Data Structure 350

| | |
|---|---|
| 350A | Order-ID |
| 350B | Amount-of-Transaction |
| 350C | Flag |

Figure 7B

Table Illustrating Record of Merchant
Sales Session Data Structure 360

| | |
|---|---|
| 360A | Session-ID |
| 360B | Session-Key |
| 360C | Session-Salt |
| 360D | Currency |
| 360E | Opening-Amount |
| 360F | Current-Amount |
| 360G | Opening-Data |
| 360H | Closing-Date |
| 360I | Status |
| 360J | Key-Use-limit |
| 360K | Key-lifetime |
| 360L | Persona-ID |

Figure 7C

Table Illustrating Record of Merchant Cash Log
Data Structure 370

| | |
|---|---|
| 370A | Type |
| 370B | Status |
| 370C | Order-Id |
| 370D | Customer-Session-ID |
| 370E | Customer-Index |
| 370F | Customer-Currency |
| 370G | Merchant-Session-ID |
| 370H | Merchant-Index |
| 370I | Merchant-Currency |
| 370J | Merchant-Amount-Requested |
| 370K | Amount-Credited |
| 370L | Fees-Paid |
| 370M | Result-Code |
| 370N | Type |
| 370O | Status |
| 370P | Transaction-Number |
| 370Q | Requested-Session-Duration |
| 370R | Requested-Session-Count |
| 370S | Session-ID |
| 370T | Result-Code |

FIGURE 7D

Table Illustrating The Format of Sample Message 4000

| 4005  | [header]       |
|-------|----------------|
| 4013A | label1: value1 |
| 4013B | label2: value2 |
| 4017  | opaque:        |
| 4050  | [trailer]      |

Figure 10A

Table Illustrating The Format of Message R1

| 4205  | [header]          |
|-------|-------------------|
| 4213A | transaction:      |
| 4213B | date:             |
| 4213C | serverkey:        |
| 4213D | service-category: |
| 4217  | opaque:           |
| 4250  | [trailer]         |

Figure 10B

Table Illustrating The Opaque Section Contents of Message R1

| 4217A | type:                |
|-------|----------------------|
| 4217B | server-date:         |
| 4217C | swversion:           |
| 4217D | content-language:    |
| 4217E | default-currency:    |
| 4217F | requested-id:        |
| 4217G | email:               |
| 4217H | agreements:          |
| 4217I | autoclose-passphrase:|
| 4217J | pubkey:              |
| 4217K | signature:           |

FIGURE 13A

Table Illustrating the Format of Message R2

| 4305  | [header]          |
|-------|-------------------|
| 4313A | transaction:      |
| 4313B | date:             |
| 4313C | service-category: |
| 4317  | opaque:           |
| 4350  | [trailer]         |

FIGURE 13B

Table Illustrating The Opaque Section Contents Of Message R2

| 4317A | type:                |
|-------|----------------------|
| 4317B | server-date:         |
| 4317C | requested-id:        |
| 4317D | response-id:         |
| 4317E | email:               |
| 4317F | response-code:       |
| 4317G | funds-waiting:       |
| 4317H | autoclose-passphrase:|
| 4317I | pubkey:              |
| 4317J | swseverity:          |
| 4317K | swmessage:           |
| 4317L | message:             |

FIGURE 16A

Table Illustrating The Format of Message BI1

| 4405 | [header] |
|---|---|
| 4413A | persona id: |
| 4413B | transaction: |
| 4413C | date: |
| 4413D | serverkey: |
| 4413E | service-category: |
| 4417 | opaque: |
| 4450 | [trailer] |

FIGURE 16B

Table Illustrating The Opaque Section Contents Of Message BI1

| 4417A | type: |
|---|---|
| 4417B | server-date: |
| 4417C | swversion: |
| 4417D | instrument-number: |
| 4417E | instrument-type: |
| 4417F | instrument-category: |
| 4417I | instrument-functions: |
| 4417J | instrument-salt: |
| 4417K | instrument-expiration-date: |
| 4417L | instrument-name: |
| 4417M | instrument-address: |
| 4417N | instrument-city: |
| 4417O | instrument-state: |
| 4417P | instrument-postal-code: |
| 4417Q | instrument-country: |
| 4417R | agreements: |
| 4417S | autoclose: |
| 4417T | autoclose-passphrase: |
| 4417U | key: |
| 4417V | signature: |

FIGURE 17A

Table Illustrating The Format of Message BI4

| 44.105 | [header] |
|---|---|
| 44.113A | id: |
| 44.113B | transaction: |
| 44.113C | date: |
| 44.113D | service-category: |
| 44.117 | opaque: |
| 44.150 | [trailer] |

FIGURE 17B

Table Illustrating The Opaque Section Contents of Message BI4

| 44.117A | type: |
|---|---|
| 44.117B | server-date: |
| 44.117C | response-code: |
| 44.117D | swseverity: |
| 44.117E | swmessage: |
| 44.117F | instrument-number: |
| 44.117G | instrument-type: |
| 44.117H | instrument-salt: |
| 44.117J | instrument-functions: |
| 44.117K | instrument*: |
| 44.117L | message: |

FIGURE 19A

Table Illustrating The Format of Message LU1

| 4505 | [header] |
|---|---|
| 4513A | id: |
| 4513B | transaction: |
| 4513C | date: |
| 4513D | serverkey: |
| 4513E | service-category: |
| 4517 | opaque: |
| 4550 | [trailer] |

FIGURE 19B

Table Illustrating The Opaque Section Contents Of Message LU1

| 4517A | type: |
|---|---|
| 4517B | server-date: |
| 4517C | swversion: |
| 4517D | amount: |
| 4517E | instrument*: |
| 4517F | key: |
| 4517G | signature: |

FIGURE 20A

Table Illustrating The Format of Message LU2

| 45.105 | [header] |
|---|---|
| 45.113A | id: |
| 45.113B | transaction: |
| 45.113C | date: |
| 45.113D | service-category: |
| 45.117 | opaque: |
| 45.150 | [trailer] |

FIGURE 20B

Table Illustrating The Opaque Section Contents of Message LU2

| 45.117A | type: |
|---|---|
| 45.117B | server-date: |
| 45.117C | amount: |
| 45.117D | response-code: |
| 45.117E | message: |
| 45.117F | swseverity: |
| 45.117G | swmessage: |
| 45.117H | fee: |
| 45.117I | balance: |
| 45.117J | session-funds: |
| 45.117K | on-hold: |

FIGURE 22A

Table Illustrating The Format of Message OS1

| 4605 | [header] |
|---|---|
| 4613A | id: |
| 4613B | transaction: |
| 4613C | date: |
| 4613D | serverkey: |
| 4613E | service-category: |
| 4617 | opaque: |
| 4650 | [trailer] |

FIGURE 22B

Table Illustrating The Opaque Section Contents of Message OS1

| 4617A | type: |
|---|---|
| 4617B | server-date: |
| 4617C | swversion: |
| 4617D | record-note: |
| 4617E | amount: |
| 4617F | key-lifetime: |
| 4617G | key-use-limit: |
| 4617H | key: |
| 4617I | signature: |

FIGURE 23A

Table Illustrating The Format of Message OS2

| 4705 | [header] |
|---|---|
| 4713A | id: |
| 4713B | transaction: |
| 4713C | date: |
| 4713D | service-category: |
| 4717 | opaque: |
| 4750 | [trailer] |

FIGURE 23B

Table Illustrating The Opaque Section Contents of Message OS2

| 4717A | type: |
|---|---|
| 4717B | server-date: |
| 4717C | response-code: |
| 4717d | swseverity: |
| 4717E | swmessage: |
| 4717F | message: |
| 4717G | key-lifetime: |
| 4717H | key-use-limit: |
| 4717I | amount: |
| 4717J | foreign-exchange: |
| 4717K | session-funds: |
| 4717L | balance: |
| 4717M | on-hold: |
| 4717N | fee: |
| 4717O | session-id: |
| 4717P | session-key: |
| 4717Q | session-salt: |

FIGURE 25

Table Illustrating The Format of Message PR1

| 5005 | [header] |
|---|---|
| 5013A | type: |
| 5013B | merchant-id: |
| 5013C | merchant-order-id: |
| 5013D | merchant-date: |
| 5013E | merchant-swversion: |
| 5013F | note: |
| 5013G | merchant-amount: |
| 5013H | accepts: |
| 5013I | url-pay-to: |
| 5013J | url-cancel: |
| 5013K | url-success: |
| 5013L | url-failure: |
| 5013M | merchant-signed-hash-key: |
| 5013N | merchant-signed-hash: |
| 5013O | merchant-amount2: |
| 5050 | [trailer] |

FIGURE 28A

Table Illustrating The Format of Message CA1

| 5105 | [header] |
|---|---|
| 5113A | type: |
| 5113B | version: |
| 5113C | session-id: |
| 5113D | index: |
| 5113E | payee-currency: |
| 5113F | note-hash: |
| 5113G | payee-id: |
| 5113H | order-id: |
| 5113I | service-category: |
| 5117 | opaque: |
| 5150 | [trailer] |

FIGURE 28B

Table Illustrating the Opaque Section Contents of Message CA1

| 5117A | amount: |
|---|---|
| 5117B | auth-code: |

FIGURE 31A

Table Illustrating The Format of Message CA2

| 5205 | [header] |
|---|---|
| 5213A | type: |
| 5213B | version: |
| 5213C | session-id: |
| 4213D | index: |
| 5213E | service-category: |
| 5217.1 | merchant-opaque: |
| 5217.2 | customer-opaque: |
| 5250 | [trailer] |

FIGURE 31B

Table Illustrating The Opaque Section Contents of Message CA2

| 5217.1A | type: |
|---|---|
| 5217.1B | version: |
| 5217.1C | type-$_n$: |
| 5217.1D | subversion$_n$: |
| 5217.1E | payer-session-id$_n$: |
| 5217.1F | payer-index$_n$: |
| 5217.1G | note-hash$_n$: |
| 5217.1H | payee-id$_n$: |
| 5217.1I | order-id$_n$: |
| 5217.1J | merchant-amount$_n$: |
| 5217.1K | auth-code: |

FIGURE 31C

Table Illustrating The Contents of Label-Value Pair 5217.2

| 5217.2A | amount: |
|---|---|
| 5217.2B | auth-code: |

FIGURE 34A

Table Illustrating The Format of Message CA3

| | |
|---|---|
| 5305 | [header] |
| 5313A | type: |
| 5313B | version: |
| 5313C | session-id: |
| 5313D | index: |
| 5313E | service-category: |
| 5317.1 | merchant-opaque: |
| 5317.2 | customer-opaque: |
| 5350 | [trailer] |

FIGURE 34B

Table Illustrating The Opaque Section Contents of Message CA3

| | |
|---|---|
| 5317.1A | subtype: |
| 5317.1B | subversion: |
| 5317.1C | response-code: |
| 5317.1D | fee: |
| 5317.1E | problem: |
| 5317.1F | remark: |
| 5317.1G | $subtype_n$: |
| 5317.1H | $subversion_n$: |
| 5317.1I | $payer\text{-}session\text{-}id_n$: |
| 5317.1J | $payer\text{-}index_n$: |
| 5317.1K | $response\text{-}code_n$: |
| 5317.1L | $remark_n$: |
| 5317.1M | $collected\text{-}amount_n$: |
| 5317.1N | $problem_n$: |
| 5317.1O | $order\text{-}id_n$: |
| 5317.1P | request-version: |
| 5317.1Q | auth-code: |

FIGURE 34C

Table Illustrating The Contents of Label-Value Pair 5317.2(Message CA3)

| 5317.2A | response-code: |
|---|---|
| 5317.2B | remark: |
| 5317.2C | foreign exchange: |
| 5317.2D | amount: |
| 5317.2E | problem: |
| 5317.2F | order-id: |
| 5317.2G | request-version: |
| 5317.2H | auth-code: |

FIGURE 37A

Table Illustrating The Format of Message CA4

| 5405 | [header] |
|---|---|
| 5413A | type: |
| 5413B | version: |
| 5413C | session-id: |
| 5413D | index: |
| 5413F | order-id: |
| 5413G | service-category: |
| 5417 | opaque: |
| 5450 | [trailer] |

FIGURE 37B

Table Illustrating The Opaque Section Contents of Message CA4

| 5417A | response-code: |
|---|---|
| 5417B | remark: |
| 5417C | foreign exchange: |
| 5417D | amount: |
| 5417E | problem: |
| 5417F | order-id: |
| 5417G | service-category: |
| 5417H | auth-code: |

FIGURE 39A

Table Illustrating The Format of Message CS1

| 4805 | [header] |
|---|---|
| 4813A | id: |
| 4813B | transaction: |
| 4813C | date: |
| 4813D | serverkey: |
| 4813E | service-category: |
| 4817 | opaque: |
| 4850 | [trailer] |

FIGURE 39B

Table Illustrating The Opaque Section Contents of Message CS1

| 4817A | type: |
|---|---|
| 4817B | server-date: |
| 4817C | swversion: |
| 4817D | record-note: |
| 4817E | session-id: |
| 4817F | request-log: |
| 4817G | key: |
| 4817H | signature: |

FIGURE 40A

Table Illustrating The Format of Message CS2

| 4905 | [header] |
|---|---|
| 4913A | id: |
| 4913B | transaction: |
| 4913C | date: |
| 4913D | service-category: |
| 4917 | opaque: |
| 4950 | [trailer] |

FIGURE 40B

Table Illustrating The Opaque Section Contents of Message CS2

| 4917A | type: |
|---|---|
| 4917B | server-date: |
| 4917C | response-code: |
| 4917D | swseverity: |
| 4917E | swmessage: |
| 4917F | message: |
| 4917G | fee: |
| 4917H | amount: |

ELECTRONIC TRANSFER SYSTEM AND METHOD

BACKGROUND OF THE INVENTION

1. Field of Invention

Public key encryption with large key sizes (e.g., RSA) is usually required for creating acceptable levels of security for message processing over an insecure network, such as the Internet. The present invention relates to a system and method for increasing the efficiency of secure message processing over such insecure networks. More specifically, the present invention relates to a system and method for reducing the level of encryption required in a network for message exchanges. Even more specifically, the present invention relates to processing electronic cash transactions in a secure manner while substantially reducing the computational requirements for encryption.

2. Description of the Prior Art

Various methods for increasing the security of communications over insecure networks, such as the Internet, have been disclosed. An insecure network does not protect messages from observation, interception, and manipulation. On the other hand, secure networks offer various means to reduce the opportunity for observation, interception, and/or manipulation of messages.

For example, channel message security schemes (such as secure HTTP ("S-HTTP") and Secure Socket Layer (SSL) protocol) are intended to create confidence in two communicating parties that they are who they say they are and that their communications are private. SSL utilizes digitally signed certificates to provide authentication and security by heavily encrypting each message. S-HTTP relies on digitally signed messages using a heavy encryption key to ensure security and authentication.

A number of multi-party protocols have been proposed for credit transactions, most notably Secure Transport Technology (STT), Internet Keyed Payments (IKP), and Secure Electronic Payment Protocol (SEPP). All of these approaches are built around a credential issuing authority and require that both merchants and customers be authenticated by the credential issuing authority which in turn has been authenticated by a higher authority. In STT, merchants and customers each have two sets of RSA of keys, one to be used to sign messages and one used to encrypt and decrypt symmetrical keys. Thus, in this system, each party needs two certificates (one for each key). A merchant will have a pair of credentials for each credit card it accepts. SEPP and IKP use RSA encryption differently; but, like STT, utilize multiple public key signatures and encryptions per transaction.

Another system has been described under the name "NetBill." While the NetBill approach is less reliant on public key encryption than others, it still requires public key signatures throughout a transaction.

Another approach is that of DigiCash. In the DigiCash model, the user creates a random number, which acts like a serial number for a digital coin. Like the other proposed systems, DigiCash achieves its primary objective of a secure, anonymous cash payment system by requiring heavy reliance on modular exponentiation (which is the basis for other public key techniques such as RSA encryption). It also requires a bank or third party to create tokens that have intrinsic value. It is uncertain how such a system will be treated under banking, tax, and currency laws in the United States and other jurisdictions.

Other systems, such as Mondex, implement security through the use of hardware connected to the user's computer. For Internet transactions, a proprietary card reader must be added to the computers of all customers and merchants who will use a particular card.

The reliance on encryption, especially public key encryption, whether based in software or hardware comes at a price: the greater the use of encryption, the greater the processing effort required to decrypt messages. Where message processing costs are important, such as in commercial network payment transaction, processor and hardware costs can become a significant deterrent to using networks such as the Internet for secure communications.

The current art can only achieve acceptable security with the concomitant high cost of processor time, additional hardware, or both. What is needed to encourage the development of insecure networks such as the Internet for commercial use is a software-based system that offers reduced processing costs of encrypted messages while maintaining an acceptable level of security for the communications being transmitted.

SUMMARY OF INVENTION

Therefore, the present invention aims to provide a system and method for very efficient, economic and secure transactions over the Internet, or other insecure networks. This provides the basis for implementing relatively small value, secure payment (including small cash payments) for products over the Internet or other insecure networks.

In accordance therewith, we herein disclose a method for securely communicating in a communication system. The communication system comprises a first device at a first party's location, a second device at a second party's location, and a server in communication therewith. The method comprises creating a first session associated with the first party, wherein the first session has first use parameters for limiting the duration that said first session can be used and a first set of data. The first use parameters and said first set of data are identifiable by the server. The method also comprises creating a second session associated with the second party. The second session has second use parameters for limiting the duration that the second session can be used and a second set of data. The second use parameters and said second set of data are identifiable by the server. The method further comprises linking a portion of the first session with a portion of the second session in the communication system. The portion of the first session includes said first set of data and said first use parameters and the portion of the second session includes the second set of data and the second use parameters. The method still further comprises verifying the first and second parties based upon at least portions of the first and second sets of data by the server, and determining whether the first and second sessions can be used based upon the first and second use parameters by the server. When the server verifies the first and second parties and determines that the first and second sessions can be used, the first and second parties are assured of communicating securely in the communication system.

Another aspect of the present invention is directed to a method for securely communicating in a communication system. The communication system has a device at a user's location and a server in communication therewith, and the method comprises transmitting a request from the device to the server for creating a session having use parameters associated therewith, encrypting a first key with a second key by the server, and transmitting the encrypted first key and the use parameters associated with the session from the server to the device. The method also comprises receiving the encrypted first key and the use parameters by the device and decrypting the encrypted first key so that the device can communicate securely in the communication system by using the decrypted first key according to the use parameters.

BRIEF DESCRIPTION OF DRAWINGS

Representative embodiments of the present invention will be described with reference to the following drawings:

FIG. 4B depicts a customer persona 120.1 of server persona data structure 120.

FIG. 4C depicts the fields of cash container data 120G of FIG. 4B.

FIG. 4D depicts the fields of instrument binding data 120H of FIG. 4B.

FIG. 4E depicts a merchant persona 120.2 of server persona data structure 120.

FIG. 4F depicts the fields of cash container data 120GG of FIG. 4E.

FIG. 4G depicts the fields of instrument binding data 120HH of FIG. 4E.

FIG. 4H depicts customer session record 130.1 of server session data structure 130.

FIG. 4I depicts the fields of transaction data 130N of FIG. 4H.

FIG. 4J depicts merchant session record 130.2 of server session data structure 130.

FIG. 4K depicts the fields of transaction data 130NN of FIG. 4J.

FIG. 4L depicts a record 140.1 of message log data structure 140.

FIG. 5B depicts record 215.1 of customer application data structure 215.

FIG. 5C depicts record 220.1 of customer persona data structure 220.

FIG. 5D depicts record 230.1 of customer instrument binding data structure 230.

FIG. 5E depicts record 240.1 of customer active session data structure 240.

FIG. 5F depicts customer pending log data structure 250.

FIG. 5G depicts pending registration/update persona information record 251 of customer pending transaction data structure 250.

FIG. 5H depicts pending link/update instrument binding record 252 of customer pending transaction data structure 250.

FIG. 5I depicts pending cash payment record 253 of customer pending transaction data structure 250.

FIG. 5J depicts pending load/unload funds record 254 of customer pending transaction data structure 250.

FIG. 5K depicts pending open session record 255 of customer pending transaction data structure 250.

FIG. 5L depicts pending close session record 256 of customer pending transaction data structure 250.

FIG. 5M depicts customer log data structure 260.

FIG. 5N depicts persona registration/update response record 261 of customer log data structure 260.

FIG. 5O depicts link/update instrument response record 262 of customer log data structure 260.

FIG. 5P depicts cash payment response record 263 of customer log data structure 260.

FIG. 5Q depicts load/unload funds response record 264 of customer log data structure 260.

FIG. 5R depicts open session response record 265 of customer log data structure 260.

FIG. 5S depicts payment request record 266 of customer log data structure 260.

FIG. 5T depicts close session response record 267 of customer log data structure 260.

FIG. 5U depicts a record 280.1 of Customer cash container data structure 280.

FIG. 6B depicts a record of the merchant application data structure of the database of the merchant computer.

FIG. 6C depicts a record of the merchant persona data structure of the database of the merchant computer.

FIG. 6D depicts a record of the merchant instrument binding data structure of the database of the merchant computer.

FIG. 6E depicts a record of the merchant session data structure of the database of the merchant computer.

FIG. 6F depicts a record of the merchant cash container data structure of the database of the merchant computer.

FIG. 7A depicts a record of the merchant amount data structure of the database of the merchant computer.

FIG. 7B depicts a record of the merchant sales session data structure of the database of the merchant computer.

FIG. 7C depicts a record of the merchant cash log data structure of the database of the merchant computer.

FIG. 7D depicts the format of a sample message.

FIGS. 10A and 10B depict the format of registration message R1.

FIGS. 13A and 13B depict the format of registration message R2.

FIGS. 16A and 16B depict the format of binding message BI1.

FIGS. 17A and 17B depict the format of binding message BI4.

FIGS. 19A and 19B depict the format of load/unload message LU1.

FIGS. 20A and 20B depict the format of load/unload message LU2.

FIGS. 22A and 22B depict the format of open session message OS1.

FIGS. 23A and 23B depict the format of open session message OS2.

FIG. 25 depicts the format of payment request message PR1.

FIG. 28 depicts FIGS 28A and B depict the format of cash payment message CA1.

FIGS. 31A, 31B and 31C depict the format of message CA2.

FIGS. 34A, 34B and 34C depict the format of message CA3.

FIGS. 37A and 37B depict the format of message CA4.

FIGS. 39A and 39B depict the format of message CS1.

FIGS. 40A and 40B depict the format of message CS2.

DETAILED DESCRIPTION OF THE PREFERRED EMBODIMENTS

Reference is now made to FIGS. 1–40 for the purpose of describing, in detail, the preferred embodiments of the present invention. The Figures and accompanying detailed description are not intended to limit the scope of the present invention.

I. Information And Information Flow

Figure 1:
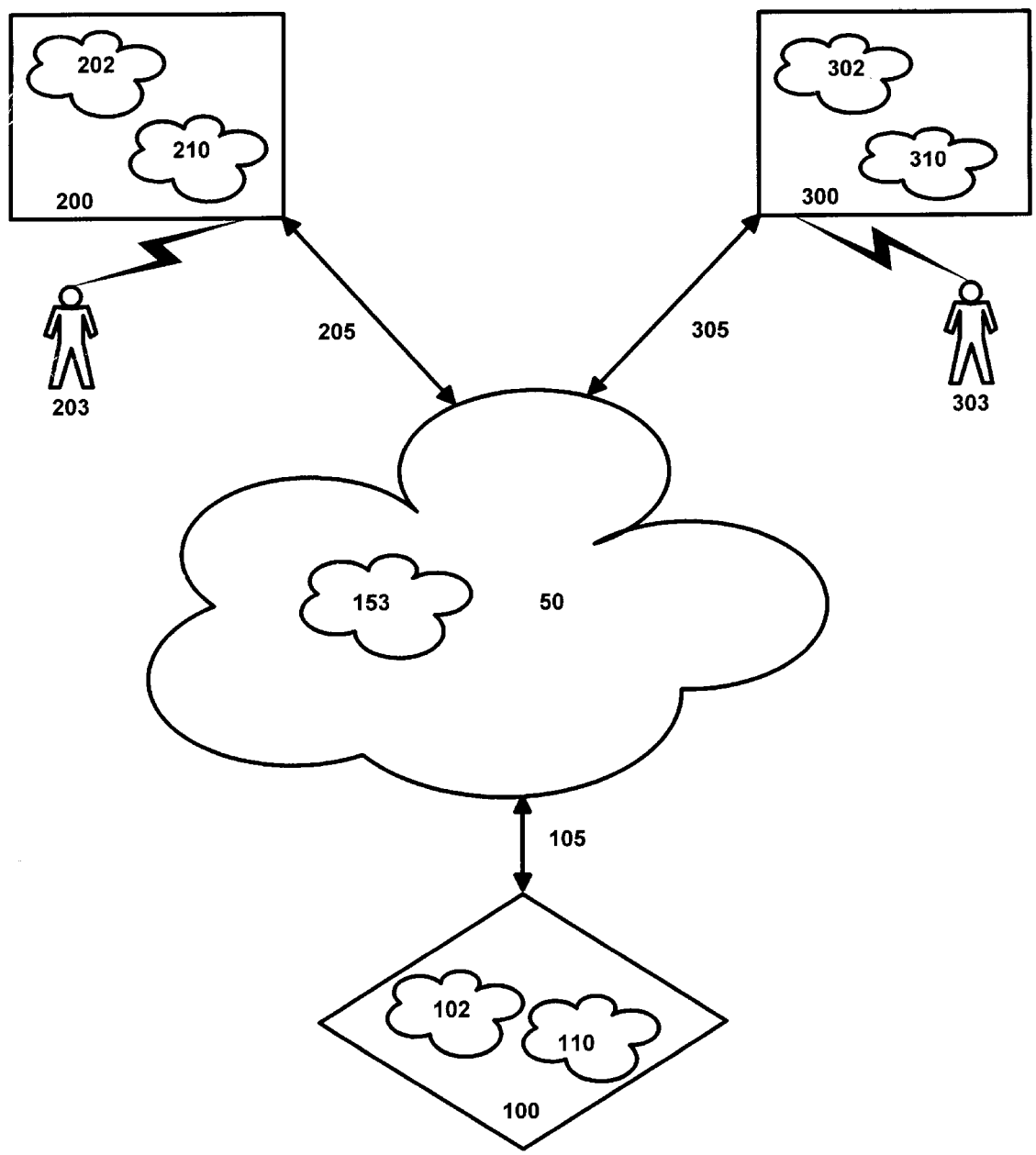
FIG. 1 depicts the general architecture of the present invention.

The present invention is generally depicted in FIG. 1. FIG. 1 shows three entities: server computer 100, customer computer 200 and merchant computer 300, connected to each other via the Internet 50. The connections are identified by lines 105, 205 and 305, respectively.

Customer computer 200 represents the computer of an individual, customer user 203, who wants to buy a product over the Internet 50. (A "product" includes goods, services, information, data, and the like.) Customer computer 200 includes customer database 202 and customer application software 210. Merchant computer 300 represents the computer of an individual, merchant user 303, who provides the product to customer user 203 over the Internet 50. Merchant computer 300 includes merchant database 302 and merchant application software 310. Information relating to merchant user 303 is stored within merchant database 302. Merchant application software 310 executes the processes of the present invention.

While the following detailed description is provided for a single customer user 203 and a single merchant user 303, it is noted that the present invention contemplates communication and transactions between both single and multiple customer users 203 and single and multiple merchant users 303.

Server computer 100 communicates securely—as will be described in detail later—with customer computer 200 and merchant computer 300 over the Internet 50 to effect transactions between customer user 203 and merchant user 303. Server computer 100 includes server database 102 and server software 110. Information relating to server computer 100, customer user 203 and merchant user 303 is stored within server database 102. Server software 110 executes the processes of the present invention.

Communication between server computer 100, customer computer 200 and merchant computer 300 is preferably carried out by hypertext transport protocol ("HTTP") over the World Wide Web ("WWW") services provided on the Internet 50. Of course, other protocols and networks may be used or desired.

Figure 2:
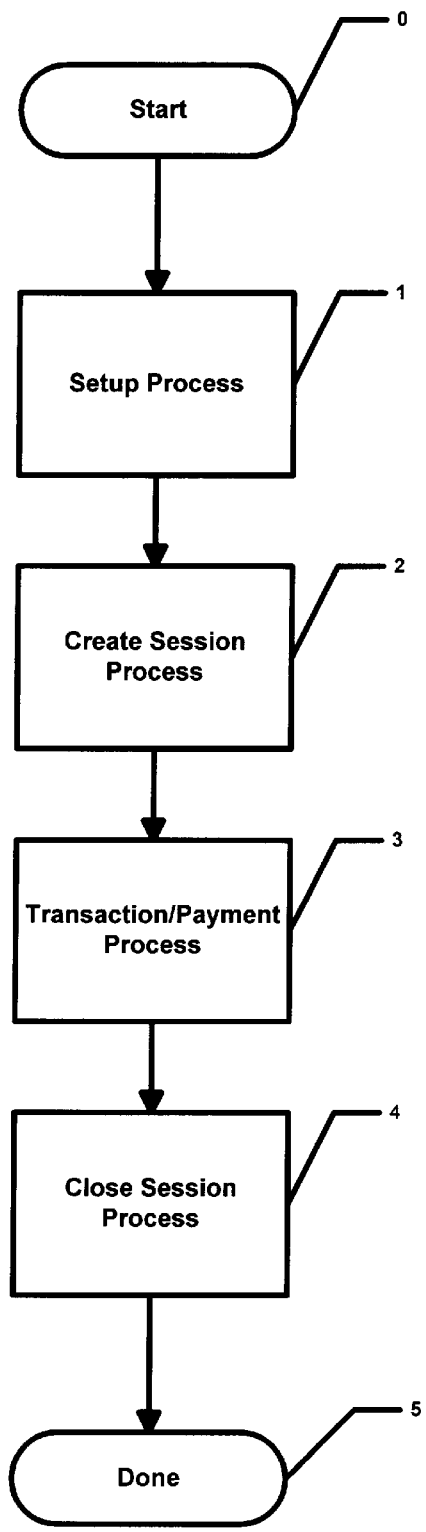
FIG. 2 depicts the general processes of the present invention.

FIG. 2 depicts the general processes performed by the present invention. The processes start at step 0.

Preliminarily, setup processes are performed at step 1. In the setup processes, customer user 203 and merchant user 303 (collectively "clients") are configured within database 102 of server computer 100. In this manner, clients can be recognized by and communicate with server computer 100. Customer database 202 and merchant database 302 are also configured at step 1.

An open session process is performed at step 2. Generally, a session is an opportunity (or window) in which customer user 203 may purchase a product from merchant user 303 over the Internet 50 or in which merchant user 303 may provide a product to customer user 203 over the Internet 50. Customer user 203 and merchant user 303 have their own independent sessions. Sessions are of limited duration. This duration is governed by parameters. These parameters are preferably set by customer user 203 and merchant user 303. Alternatively, server computer 100 may set such parameters.

A transaction/payment process is performed at step 3. In this step, customer user 203 and merchant user 303 agree upon a product to be provided at an agreed upon price. Customer user 203 pays for the product with electronic cash. Electronic cash is a representation of funds (real cash, credit, etc.) used in the present invention. The electronic cash is received by merchant user 303 who can provide the purchased product to customer user 203. Customer user 203 may conduct business with multiple merchant users 303 during a session. Customer user 203 and merchant user 303 are only able to transact business for the duration of sessions such as those created at step 2.

A close session process may be included in the present invention at step 4. This step ends the session created at step 2.

The processes performed by the present invention end at step 5.

Figure 3A:
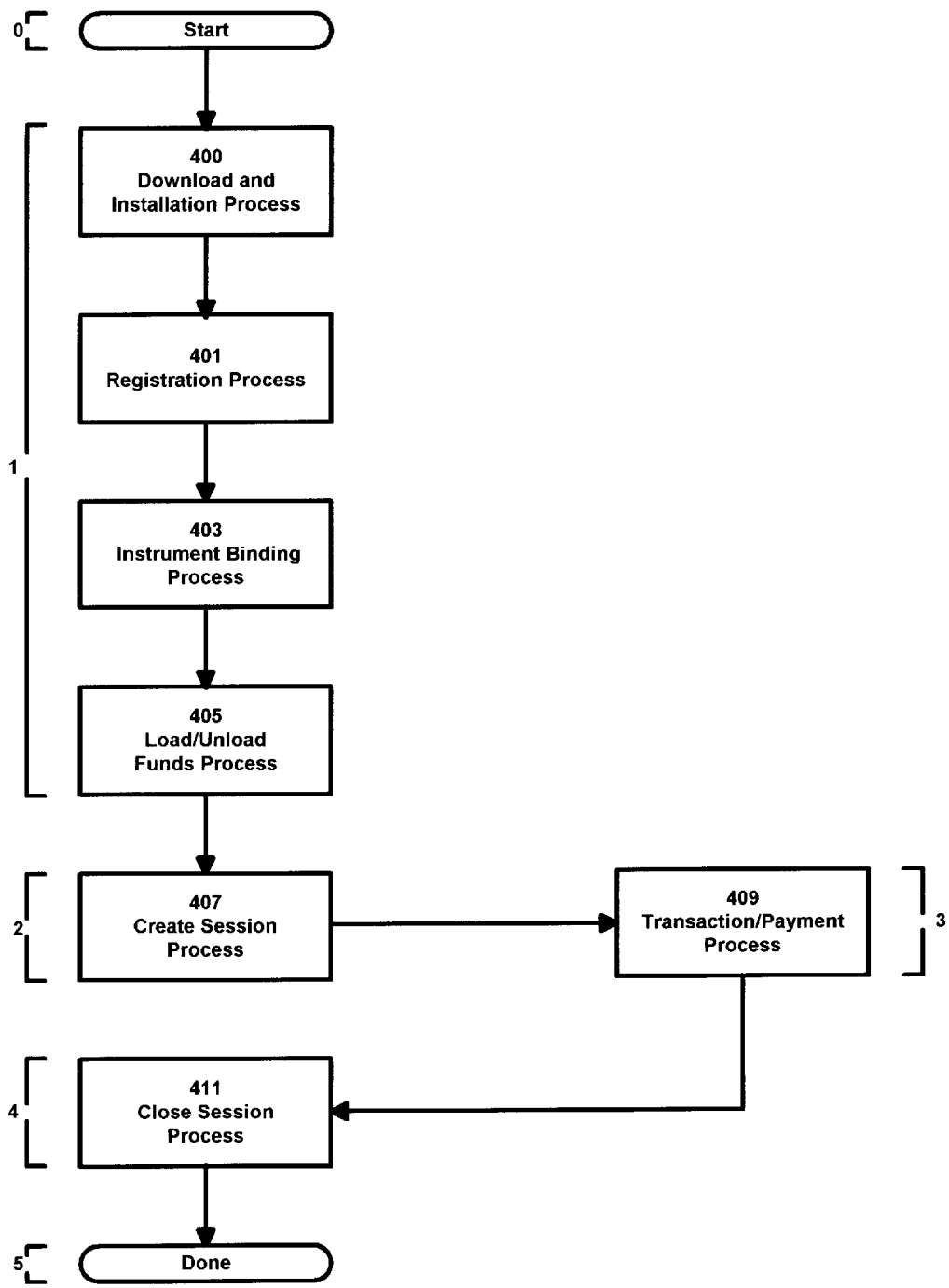
FIG. 3A more particularly depicts the processes shown in FIG. 2.

Referring to FIG. 3A, the processes described above in steps 1 through 4 of FIG. 2 are now more particularly described. Initially, the setup processes performed at step 1 include download and installation process 400, registration process 401, instrument binding process 403 and load/unload funds process 405.

During the download and installation process 400, customer user 203 and merchant user 303 each download and install a copy of client application software 153 (FIG. 1) which preferably resides on the Internet 50. Within customer computer 200 and merchant computer 300, the copy of client application software 153 resides as customer application software 210 and merchant application software 310, respectively. (Merchant application software 310 includes other software to enable merchant computer 300 to perform the functions described below.) Using well known techniques, customer application software 210 and merchant application software 310 are linked to the web browser of customer computer 200 and merchant computer 300, respectively, and are accessed through the browser as necessary.

Next, at registration process 401, customer user 203 and merchant user 303 register with server computer 100. That is, "persona" for customer user 203 and merchant users 303 is created within database 102 of server computer 100. A "persona" is herein defined as a collection of data relating to a specific client. Therefore, by this registration process, each customer user 203 and merchant user 303 who has registered with server computer 100 has their own persona in server computer 100. (The details of personas will be described later.) The right of a persona to preform certain operations (e.g., load funds, unload funds, submit certain messages to server computer 100) may be enabled or disabled on a message or service basis.

During the instrument binding process 403 of FIG. 3A, a client (a customer user 203 or a merchant user 303) communicates information to server computer 100 which it uses to establish that the client may use a financial instrument. Financial instruments may include credit cards, debit cards, demand deposit accounts ("DDAs") or other financial instruments. The issuer of the instrument being bound or a third party guarantor sets whatever criteria are deemed necessary by it to determine if the client may use the instrument. For example, a bank issuing a credit card may find sufficient that the client provide a five digit postal code and his mother's maiden name in order to use the credit card. A list of these criteria may, for example, be provided to server computer 100 in which case server computer 100 can communicate with the client to establish whether the client meets these criteria so that the client can use the financial instrument.

Once the client establishes that the client may use the instrument by this process, the instrument is "bound" to or associated with the client's persona created during registration process 401. Once the instrument is bound, the client can use the instrument for transactions as will be described later.

Load/unload funds process 405 is discussed next. For customer user 203, a "load" is the process by which funds associated with a bound instrument are "loaded" (or transferred) to the persona of customer user 203. In the persona of customer user 203, the funds are represented as electronic cash. For customer user 203, an "unload" is the process by which electronic cash is "unloaded" (or transferred) from the persona of customer user 203 to a bound instrument. For merchant user 303, an "unload" is the process by which electronic cash is "unloaded" from the persona of merchant user 303 to a bound instrument. For merchant user 303, a "load" is the process by which funds associated with a bound instrument are "loaded" to the persona of merchant user 303. In the persona of merchant user 303, the funds are represented as electronic cash.

The open session process described for step 2 in FIG. 2 is further explained with regard to the open session process 407 of FIG. 3A. When customer user 203 creates a session, customer user 203 is enabled to transact business over the Internet 50 with one or more merchant users 303 who have each created their own independent sessions. (Of course, merchant users 303 may also act as customer users 203 if they so desire.) The transaction/payment process 409 is performed next. During this process, customer user 203 and merchant user 303 may negotiate and agree upon the elements of a transaction (e.g., a particular product and price). Then, merchant user 303 may request that customer user 203 pay the agreed upon price for the product. In response to the request of merchant user 303, customer user 203 may communicate to merchant user 303 that customer user 203 accepts the agreed upon price for the product. It is preferred that merchant user 303 cause information regarding the transaction to be submitted to server computer 100 for validation. If server computer 100 validates the transaction, electronic cash is transferred from the persona of customer user 203 to the persona of merchant user 303. Once notified of validation, merchant user 303 can provide the product to customer user 203.

At close session process 411, the session created during open session process 407 may be terminated. When customer user 203 (or merchant user 303) closes the session, server computer 100 disables customer user 203 (or merchant user 303) from transacting business over the Internet 50 with another merchant user 303 (or customer user 203) who has an open session unless customer user 203 has other open sessions.

Figure 3B:
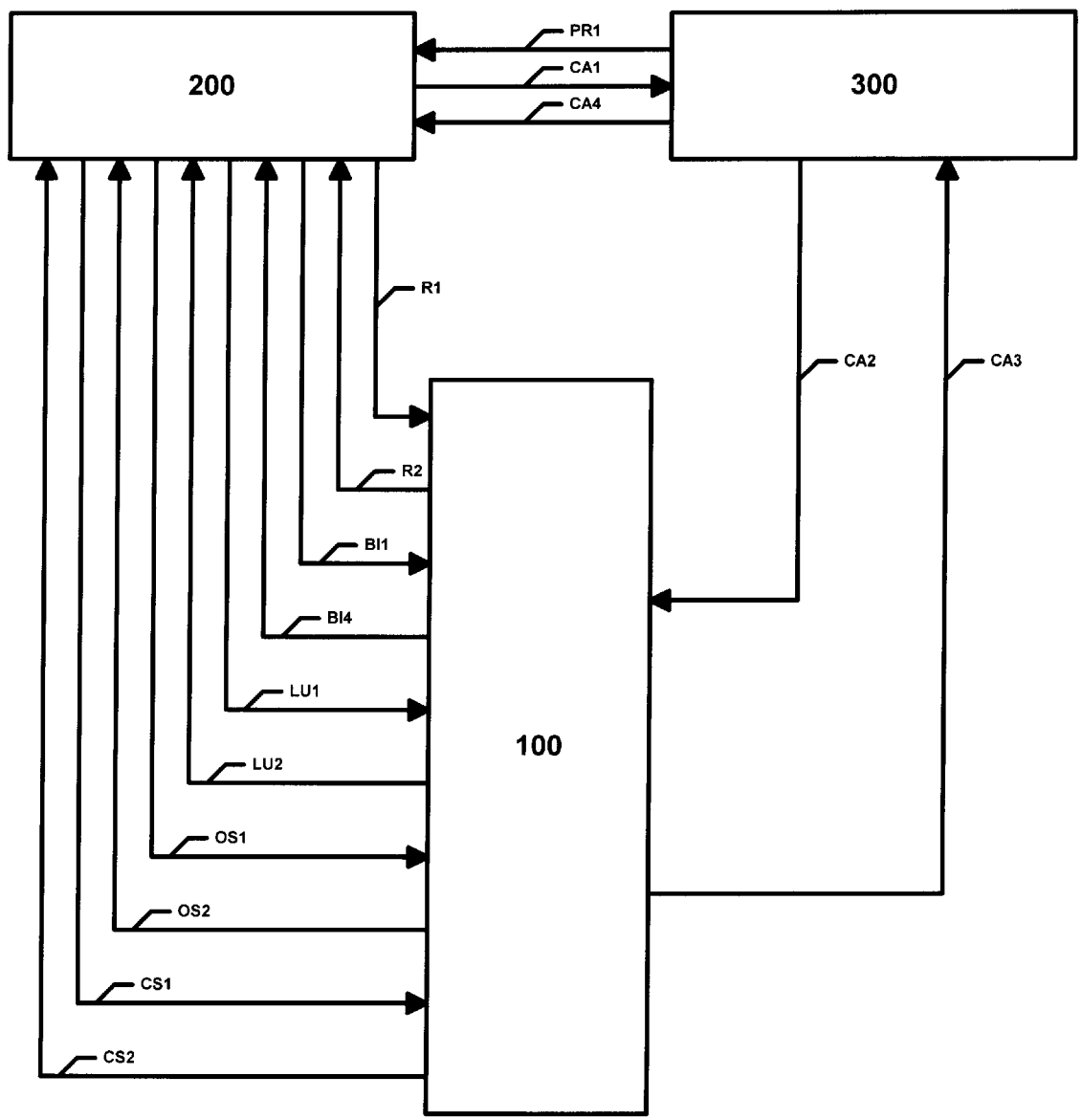
FIG. 3B depicts the flow of messages in the present invention.

Referring to FIG. 3B which depicts the flow of messages of the present invention, registration process 401 is carried out by customer computer 200 sending message R1 ("Registration 1") to server computer 100. In response to message R1, server computer 100 sends message R2 ("Registration 2") back to customer computer 200. The information included in these registration messages will be described later.

During instrument binding process 403, customer computer 200 sends message BI1 ("Bind Instrument 1") to server computer 100. The information in message BI1 is used by server computer 100 to confirm the authority of the binder of the instrument with the issuer of that instrument or a third party guarantor. The confirmation process could augmented by the exchange of messages (herein, messages BI2 and BI3) between server computer 100 and customer computer 200. Messages BI2 and BI3 would have a format similar to that of the other messages described herein. The content of message BI2 may include requests for additional information (prompted by the issuer of the instrument) or clarification of information as required by the issuer of the instrument or the third party guarantor. For example, message BI2 may cause customer user 203 to be prompted for customer user 203's mother's maiden name. Message BI3 may contain the response of customer user 203.

In response to message BI1, server computer 100 sends message BI4 ("Bind Instrument 4") back to customer computer 200. The information included in these binding messages will be described later. In the description which follows, messages BI1 and BI4 are the operative messages for instrument binding.

During load/unload funds process 405, customer computer 200 sends message LUI ("Load/Unload 1") to server computer 100. In response to message LU1, server computer 100 sends message LU2 ("Load/Unload 2") back to customer computer 200. The information included in these load/unload funds messages will be described later.

During open session process 407 customer computer 200 sends message OS1 ("Open Session 1") to server computer 100. In response to message OS1, server computer 100 sends message OS2 ("Open Session 2") back to customer computer 200. The information included in these open session messages will be described later.

During transaction/payment process 409, merchant computer 300 sends message PR1 ("Payment Request 1") to customer computer 200. In response to message PR1, customer computer sends back message CA1 ("CAsh payment 1") to merchant computer 300. After receiving message CA1, merchant computer sends message CA2 ("CAsh payment 2") server computer 100. In response to message CA2, server computer 100 sends back message CA3 ("CAsh payment 3") to merchant computer 300. In response to message CA3, merchant computer 200 sends message CA4 ("CAsh payment 4") to customer computer 200. The information included in these transaction/payment messages will be described later.

During optional close session process 411, customer computer 200 sends message CS1 ("Close Session 1") to server computer 100. In response to message CS1, server computer 100 sends message CS2 ("Close Session 2") to customer computer 200. The information included in these close session messages will be described later.2

It is noted that FIG. 3B depicts messages R1/R2, BI1/BI4, LU1/LU2, OS1/OS2 and CS1/CS2 passing between customer computer 200 and server computer 100. Merchant user 303 causes these same messages to flow between merchant computer 300 and server computer 100. It follows that merchant user 303 executes registration process 401, instrument binding process 403, load/unload funds process 405, open session process 407 and close session process 411 in the same way as customer user 203, unless otherwise noted. In the case of merchant user 303, data associated with these processes is manipulated with regard to the merchant database and merchant data structures included in server computer 100.

The databases and data structures used in the preferred embodiments of the present invention are described next.

II. Databases

Referring to FIG. 1, server computer 100, customer computer 200, and merchant computer 300 include databases 102, 202 and 302, respectively. While the following description of databases 102, 202 and 302 refer to specific data structures and formats, those skilled in the art will readily appreciate that such specific data structures and formats are not critical to and are not considered part of the present invention. Therefore, any modifications to the data structures and formats would be within the scope of the appended claims.

It is preferred that values be stored in databases 202 and 302 when a response message is received by customer computer 200 and merchant computer 300, respectively. However, where it enhances clarity, values are described as being stored prior to the receipt of such a response message.

A. Server Database 102

Figure 4A:
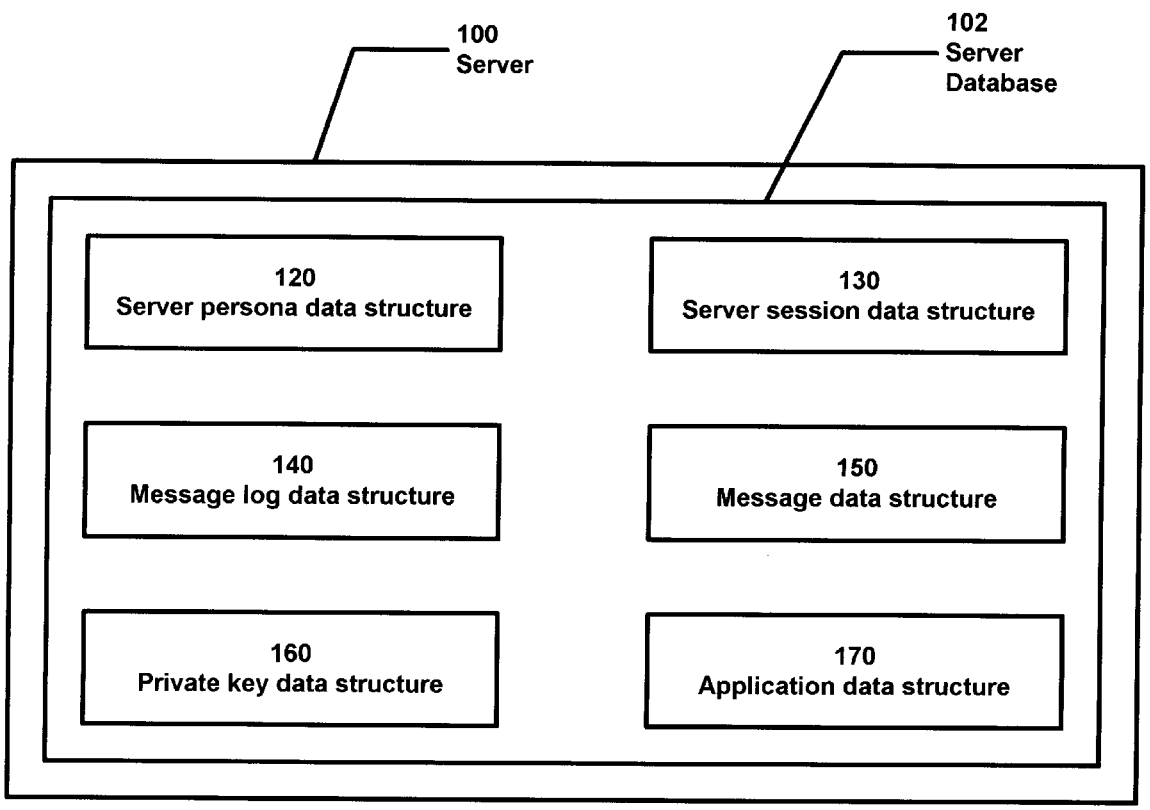
FIG. 4A depicts the structure of the database of the server computer 100.

Server database 102 stores data enabling server computer 100 to communicate with and process transactions between customer computer 200 and merchant computer 300. FIG. 4A depicts the general structure of server database 102.

As shown in FIG. 4A, server database 102 includes server persona data structure 120, server session data structure 130, message log data structure 140, message data structure 150 and public key data structure 160 and application data structure 170. Each of these data structures is now described in detail.

1. Server Persona Data Structure 120

Server persona data structure 120 stores data relating to the universe of customer users 203 and merchant users 303 who have registered with server computer 100. Referring to FIG. 4B, persona data structure 120 includes one or more customer personas 120.1. It is preferred that customer persona 120.1 be recorded having fields 120A–120H. Server persona data structure 120 contains a customer persona 120.1 for each registered customer user 203. The fields of customer persona 120.1 are now described.

Field 120A stores a persona id for customer user 203. The persona id identifies particular customer user 203. In order to increase system security, server database 102 does not store recognizable information for customer user 203. For example, the actual name and address of customer user 203 is not stored within server database 102. Rather, the persona id is used for identification. The persona id field is optional in that the information stored in public key field 120C (described below) may also be used to locate records associated with customer user 203. Because a persona id is shorter than a public key it is more efficient, and thus preferred, to use the persona id for this purpose.

Field 120B contains an email address for customer user 203. Using the email address of field 120B, server computer 100 is able to send email to customer user 203 over the Internet 50.

Field 120C stores an RSA public key for customer persona 120.1. As is more fully described below, the RSA public key of field 120C is generated by customer application software 210. The RSA public key of field 120C is the public component of an RSA public/private key pair. Both the RSA public and private key for a customer computer 200 are stored in customer computer 200, as described later. In the preferred embodiment, RSA keys are 768 bits in length. This length reflects a balance between increasing security (achieved using longer keys) and decreasing processing costs (achieved using shorter keys). As processor power increases in the future, longer RSA keys may be used to increase security without compromising system performance.

If the customer RSA public key is encapsulated in a certificate by appropriate certification authority, the key from the certificate is used in place of the public key and the persona id field 120A is no longer optional as previously described. Certificate based systems are well known in the art and are not described.

The date that customer user 203 registered with server computer 100 is stored in field 120D. The date of field 120D permits the running of promotions (e.g., if you register before this date, then this will happen) and assists in the resolution of disputes.

Field 120E contains a preferred language of communication for customer user 203.

Field 120F stores an autoclose passphrase for customer user 203. The autoclose passphrase is a passphrase which allows customer user 203 to close customer persona 120.1 in certain circumstances as described later.

Data 120G represents a data structure containing fields 120G.1–120G.4, shown in FIG. 4C. Fields 120G.1–120G.4 store data for each cash container established by customer user 203. Server persona data structure 120 contains a set of fields 120G.1–120G.4 for each cash container established by customer user 203. The cash container stores electronic cash. It is contemplated that multiple cash containers can be used, e.g., one for each currency that customer user 203 intends to transact business in.

Fields 120G.1–120G.4 are now described in detail with reference to FIG. 4C.

Field 120G.1 stores the currency associated with the amount of electronic funds stored in fields 120G.2 and/or 120G.3.

Field 120G.2 stores the available-balance of the cash container.

Field 120G.3 stores the on-hold-balance of the cash container.

Electronic cash stored in fields 120G.2 and/or 120G.3 is preferably deposited into an agency account (a form of banking instrument in which funds are held by one party for the benefit of the other). The account number of this agency account is stored in field 120G.4.

Data 120H represents a data structure containing fields 120H.1–120H.28, shown in FIG. 4D. Fields 120H.1–120H.28 store data for instruments bound to customer persona 120.1. Server persona data structure 120 contains a set of fields 120H.1–120H.28 for each instrument bound to a customer persona 120.1. Fields 120H.1–120H.28 are now described in detail with reference to FIG. 4D.

Field 120H.1 stores the persona id of field 120A (FIG. 4B). The persona id of field 120H.1 indicates the persona 120.1 to which the instrument having data stored in fields 120H.1–120H.28 is bound.

Field 120H.2 contains an instrument type for the bound instrument. Instrument types preferably include bank accounts, debit cards and credit cards.

Field 120H.3 stores an instrument subtype for the bound instrument. The instrument subtype is a sub-classification of an instrument type (e.g., "VISA" for the instrument type credit card").

Customer user 203 may elect to activate an "autoclose" feature when registering its persona 120.1. The autoclose feature permits customer user 203 to provide a passphrase (described later) to close customer persona 120.1 and to unload all electronic cash associated with that persona to an autoclose instrument. If the instrument being bound is the autoclose instrument, field 120H.4 contains an instrument number for the bound instrument. The instrument number identifies the instrument. It is preferred that the instrument number be encrypted before it is stored. Alternatively, the instrument number could be saved in a separate store device not connected to server computer 100. If the instrument being bound is not the autoclose instrument, the instrument number is used to compute field 120H.9 (as described later) and the instrument number is not stored in field 120H.4.

Bound instruments may have a secondary number further identifying the bound instrument, for example, an American Express CID or a US-DDA account R/T number. Such secondary numbers, referred herein to as instrument sub-numbers, are stored in field 120H.5.

Bank accounts are created in a single currency. The native currency of a bank account instrument is stored in field 120H.6.

Field 120H.7 stores one or more integers representing legal agreements. In the preferred embodiment, the operator of server computer 100 determines what legal agreements must be agreed to by customer user 203 in order for customer user 203 to use the bound instrument to perform certain operations.

Field 120H.8 contains an instrument prefix. The instrument prefix of 120H.8 is subset of the instrument number described in reference to field 120H.4. In the preferred embodiment, the instrument prefix of field 120H.8 (for credit cards, debit cards, and bank accounts) is the first two and the last four digits of the instrument number of field 120H.4.

Field 120H.9 stores an instrument hash value, preferably an MD5 hash of the instrument number described with reference to field 120H.4. (The term "hash" as used in this application refers to cryptographic hashes, as opposed to other mathematical hashing functions such as algebraic hashes.) The instrument number represented by the hash is preferably made more difficult to guess by concatenating the instrument number with a random number generated and provided to server computer 100 by customer computer 200 (such number commonly referred to as a "salt") before hashing. The instrument salt is stored in field 230Q of customer instrument binding data structure 230 as discussed below. The instrument hash of field 120H.9 is used to verify the instrument number without requiring the instrument number to be stored at server computer 100. This reduces the attractiveness of server computer 100 as a target for thieves and scoundrels.

Field 120H.10 contains an identification number of the issuer of the bound instrument, also known as a "BIN", or bank id number.

If the instrument being bound is to be used as autoclose instrument, fields 120H.11 and 120H.12 contain the name and address of a holder of the bound instrument. It is preferred that this information be encrypted before being stored. Alternatively, the instrument number could be saved in a separate store device not connected to server computer 100.

Fields 120H.13 and 120H.14 store dates that the bound instrument was bound and was first used, respectively.

Field 120H.15 contains a status of a bound instrument. The content of binding status field 120H.15 is dependent upon the instrument being bound. For example, to bind a DDA, customer user 203 may be required to sign a form and authorize the operator of server computer 100 to initiate a pre-notification ("pre-note") process with an automated clearing house ("ACH"). Before receiving the signed form or the response to the pre-note, server computer 100 may show that the binding was "created". Upon receiving the signed form, status field 120H.15 may contain "pending pre-note". If the pre-note is sent before the signed form, field 120H.15 may contain "pending-signature". If both have been received and are acceptable, field 120H.15 may contain "enabled". If there were a problem with either, or if a specified time period for receiving either requirement expires, field 120H.15 may contain "disabled". Field 120H.15 may also contain "disabled" if the instrument is subsequently determined not to be usable (e.g., an account is frozen by a bank). The status of other bound instruments will depend on the instrument type and the steps necessary to bind a particular type of instrument. Of course, the prenote process may be performed on-line.

Field 120H.16 is a flag indicating whether the bound instrument is enabled for sale transactions. A sale transaction is where customer persona 120.1 is used to pay for something using a bound instrument directly, as in the use of a debit card.

If field 120H.16 indicates that the bound instrument is enabled for sale transactions, a limit in customer user 203's chosen (native) currency is stored in field 120H.17. If a native currency does not exist, the sale transaction limit of 120H.17 is U.S. dollars. A special value may be used to indicate that there is no sale transaction limit for the bound instrument. This special value may be any value that is not within the set of acceptable values of the field. For example, if the limit of field 120H.17 is expressed as a positive number, the special value could be negative one.

Field 120H.18 is a flag indicating whether the bound instrument is enabled for credit/return transactions. A credit/return transaction is an operation where a merchant credits customer persona 120.1 in lieu of providing the product originally agreed to.

If field 120H.18 indicates that the bound instrument is enabled for credit/return transactions, a limit in customer user 203's chosen native currency, per credit/return transaction is stored in field 120H.19. If a native currency does not exist, the credit/return transaction limit of field 120H.19 is U.S. dollars. A special value, may be used to indicate that there is no credit/return transaction limit for the bound instrument, as previously described.

Field 120H.20 is a flag indicating whether a bound instrument is enabled for load operations, as previously described.

If field 120H.20 indicates that the bound instrument is enabled for load operations, a limit is stored in field 120H.21. The load cash transaction limit of field 120H.21 represents a limit, in native currency. If a native currency does not exist, the load cash transaction limit of field 120H.21 may default to U.S. dollars. A special value may be used to indicate that there is no load cash transaction limit for the bound instrument as previously described.

Field 120H.22 is a flag indicating whether the bound instrument is enabled for unload operations, as previously described.

If field 120H.22 indicates that the bound instrument is enabled for unload cash transactions, a limit for cash transactions is stored in field 120H.23. The unload cash transaction limit of field 120H.23 represents a limit, in native currency. If a native currency does not exist, the unload cash transaction limit of field 120H.23 may preferably default to U.S. dollars. A special value may be used to indicate that there is no unload cash transaction limit for the bound instrument, as previously described.

Field 120H.24 is a flag indicating whether the bound instrument is designated as the autoclose binding for customer persona 120.1. An autoclose binding must have its unload cash transaction flag (field 120H.22) enabled.

Field 120H.25 stores a number of hours over which the sales transaction limit stored in field 120H.17 applies.

Field 120H.26 stores a number of hours over which the credit transaction limit stored in field 120H.19 applies.

Field 120H.27 stores a number of hours over which the load cash transaction limit stored in field 120H.21 applies.

Field 120H.28 stores a number of hours over which the unload cash transaction limit stored in field 120H.23 applies.

Field 120I stores legal agreements as previously described.

While the foregoing description of customer persona 120.1 was set forth with respect to data relating to customer user 203, it is noted that a merchant user 303 has merchant persona 120.2 stored in server persona data structure 120. Merchant persona 120.2 is shown in FIGS. 4E, 4F, and 4G where fields 120AA–120HH, 120GG.1–120GG.4, and 120HH.1–120HH.28 correspond to fields 120A–120H, 120G.1–120G.4, and 120H.1–120H.28 of FIGS. 4B, 4C and 4D.

2. Server Session Data Structure 130

Server session data structure 130, shown generally in FIG. 4A, stores data associated with a session. Server session data structure 130 is now described for customer user 203.

Referring to FIG. 4H, server session data structure 130 includes one or more customer session records 130.1. Server session data structure 130 contains one record 130.1 for each active session of customer user 203.

Server computer 100 identifies a session by a unique session identification number ("session id"). The session id is stored in field 130A.

Messages exchanged between server computer 100 and customer computer 200 during a session includes encrypted data. Field 130B contains an encryption key (known as a "session key"). The session key of field 130B is used by server computer 100 to calculate a key to decrypt encrypted messages received from customer computer 200.

Field 130C stores a session salt, preferably 8-bytes in length. As will be described below, messages exchanged inside a session between server computer 100, customer computer 200 and merchant computer 300 are not authenticated using digital signatures. Instead, messages exchanged inside a session are authenticated by knowledge of the session key and session salt described above. To ensure that the unencrypted part of a message is not altered, it is hashed and the hash value is included in the encrypted part of the message. Use of the session salt of field 130C ensures that the hash values are more secure.

In the present invention, customer user 203 may transact business in one or more currencies. Field 130D indicates a denomination of currency (for example, U.S. dollars) that customer user 203 will use during the session.

Field 130E represents a maximum amount of electronic cash (in the currency of field 130D) available to customer user 203 at the start of the session.

Field 130F represents an amount of electronic cash (in the currency of field 130D) available to user 203 at a particular instant during the session. The initial value of field 130F is the value stored in opening amount field 130E. Thereafter, the value of current amount of field 130F is determined by subtracting each amount spent for products during the session from the previous value of 130F.

Field 130G indicates a date and time that the session was created. Field 130H indicates the date and time that the session actually closed.

Field 130I represents the maximum number of times (key use limit) that server computer 100 will recognize customer computer 200's use of the session key of field 130B.

Field 130J represents a length of time (key lifetime) that the session key of field 130B is valid.

Field 130K stores the persona id of customer user 203. It is through the persona id of field 130K that a session is associated with a persona 120.1.

Field 130L stores the status of a session associated with the session id in field 130A. The status is either "open" or "closed".

Field 130M stores an optional string (memo) provided by customer user 203 describing the session associated with the session id in field 130A. Field 130M may contain a string provided by customer user 203 at the opening of a session and a string provided at the close of a session.

Transaction data 130N comprises fields 130N.1–130N.5. Fields 130N.1–130N.5, shown in FIG. 4I, are maintained for each transaction initiated by customer user 203 during the session identified by the session id in field 130A. The maximum number of such transactions is equal to the key-use limit stored in field 130I. Fields 130N.1—130N.5 are now described in detail with reference to FIG. 4I.

Field 130N.1 contains the amount charged to customer user 203 for a particular transaction.

Field 130N.2 stores the session id stored in field 130A.

Field 130N.3 stores an order identification number ("order id") generated by merchant computer 300 to identify a particular order.

Field 130N.4 stores the session id of merchant 303 from which the product associated with a particular transaction as purchased.

Field 130N.5 contains the index value assigned by customer computer 200 to a particular transaction. The index value must be within the key use-limit established as set forth in field 130I. Because the transactions executed by customer persona 120.1 may not be received by server computer 100 in the order that they are executed, the index value is stored in a manner, such as bit map of permitted index values, which allows server computer 100 to determine if a permitted index has been used and to take appropriate action should that occur.

While the foregoing description of server session data structure 130, customer session record 130.1 was set forth with respect to data relating to customer user 203, it is noted that a merchant 303 user has corresponding data stored in server session data structure 130. Such a merchant session record 130.2 is shown in FIGS. 4J and 4K where fields 130AA–130NN correspond to fields 130A–130N, and fields 130NN.1–130NN.5 correspond to fields 130N.1–130N.5.

3. Message Log Data Structure 140

Message log data structure 140 (FIG. 4A) tracks messages received and sent by server computer 100. This permits server computer 100 to identify duplicate messages and respond accordingly. Duplicate messages are used to ensure consistent state between a client and server computer 100 in the face of unpredictable communications over the Internet 50. For example, a duplicate of a valid message could be responded to with the original response. Server computer 100 might not, however, duplicate the processing of the duplicate message. A record 140.1 of message log data structure 140 is now described with reference to FIG. 4L.

Field 140A contains the persona id included in the message received by server computer 100.

Field 140B contains the session number included in a message CA2 (described later) received by server computer 100. For all other messages received by server computer 100, this field is preferably null.

Field 140C contains the transaction number included in a message R1, BI1, LU1, OS1, or CS1 (described later) received by server computer 100. For any message CA2 received by server computer 100, this field is preferably null.

Field 140D contains the index included in message CA2 received by server computer 100. For all other messages received by server computer 100, this field is preferably null.

Field 140E contains a hash of, or copy of, the message received (incoming) by server computer 100 associated with fields 140A–140D.

Field 140F contains a copy of a message sent by server computer 100 in response to the message saved in field 140E.

4. Message Data Structure 150

Message data structure 150 (FIG. 4A) includes templates indicative of the format and contents of messages used in the present invention by type and version. For example, a particular message may differ between one or more supported versions of customer application software 210 or merchant application software 310. When a message is received by server computer 100, it is compared to a template for that message. As described later, if the message does not conform to the template, an error message is returned to the sender of the message.

5. Private Key Data Structure 160

Private key data structure 160 maintains a list of the RSA public/private key pairs of server computer 100 that are used in supported versions of customer application software 210 or merchant application software 310. As will be described later, encrypted messages sent to server computer 100 include a pointer which informs server computer 100 which RSA public key of server computer 100 was used by customer application software 210 or merchant application software 310 to encrypt the message. In this manner, server computer 100 can find the corresponding RSA private key to decrypt the encrypted message.

6. Application Data Structure 170

Application data structure 170 tracks existing version(s) of customer application software 210 and merchant application software 310. Application data structure 170 is also used to determined whether an update to customer application software 210 or merchant application software 310 is available or necessary. For example, server computer 100 may advise a customer computer 200 that customer application software 210 is non-current yet usable, or that the software is no longer usable and must be replaced.

B. Customer Database 202

Figure 5A:
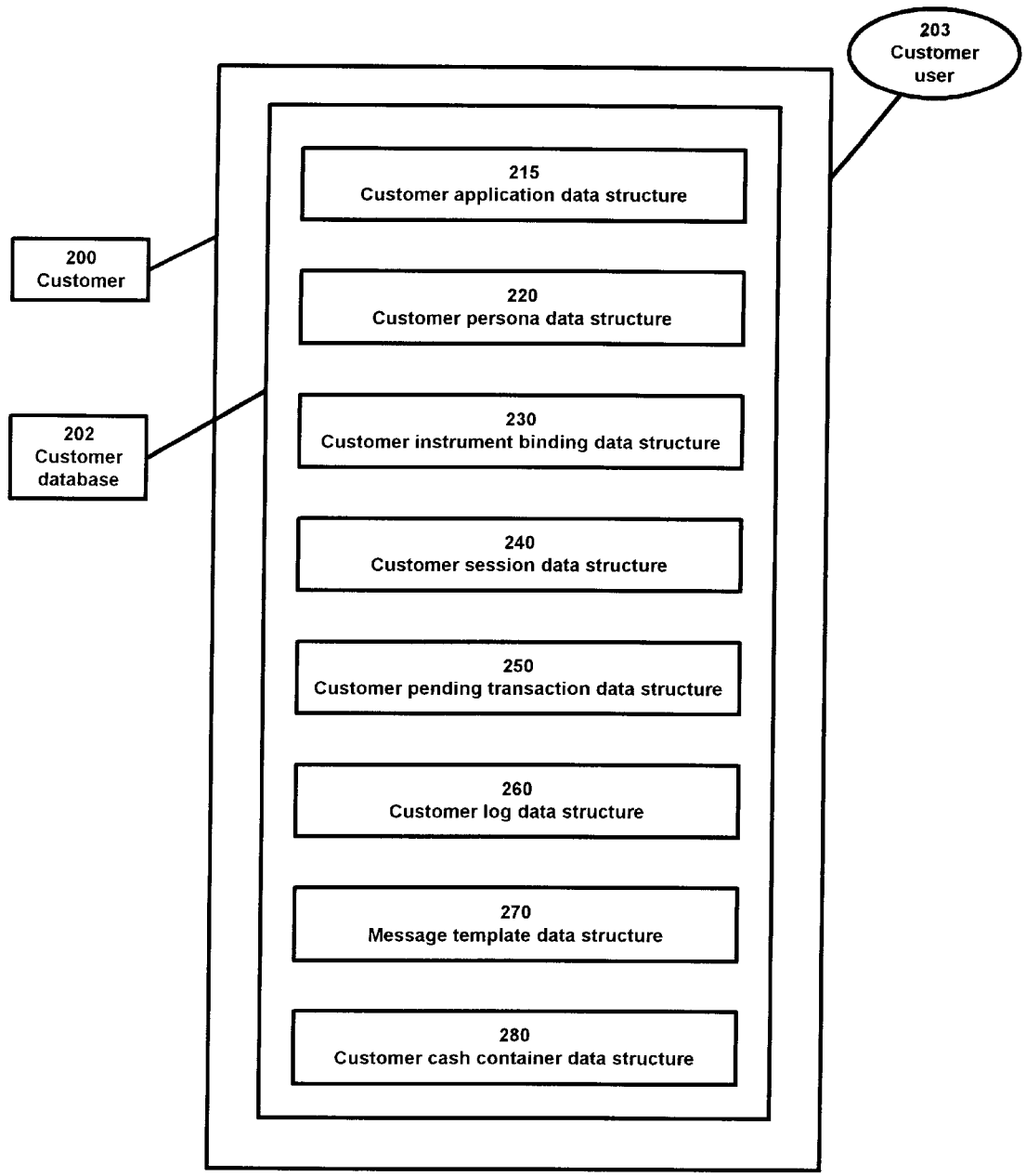
FIG. 5A depicts the structure of the database of the customer computer 200.

FIG. 5A depicts the general structure of customer database 202. Customer database 202 includes customer application data structure 215, customer persona data structure 220, customer instrument binding data structure 230, customer session data structure 240, customer pending transaction data structure 250, customer log data structure 260, message template data structure 270 and customer cash data structure 280. Each of these data structures is now described in detail.

1. Customer Application Data Structure 215

Customer application data structure 215 stores data relating to server computer 100. Referring to FIG. 5B, customer application data structure 215 includes record 215.1, shown there in detail.

Field 215A contains an RSA public key for server computer 100. The RSA public key of field 215A is used by customer computer 200 to encrypt data in messages sent by customer computer 200 to server computer 100.

Field 215B stores a uniform resource locator for ("URL") for server computer 100. The URL of field 215B is the address of server computer 100 on the world wide web of the Internet 50.

While the foregoing description of customer application data structure 215 and record 215.1 was set forth with respect to data relating to customer user 203, it is noted that a merchant user 303 has corresponding data stored in merchant application data structure 315, shown in FIG. 6B. A merchant record 315.1 is shown in FIG. 6B where fields 315A–315B correspond to fields 215A–215B.

2. Customer Persona Data Structure 220

Customer persona data structure 220 stores data relating to customer user 203. Referring to FIG. 5C, customer persona data structure 220 includes record 220.1, shown there in detail.

Fields 220A–220C correspond to and contain the same information as fields 120A–120C (FIG. 4B).

Field 220D stores an autoclose passphrase for customer user 203. The autoclose passphrase is a passphrase which allows customer user 203 to close customer persona 120.1 in certain circumstances as described later.

Field 220E contains a preferred language of communication for customer user 203.

A default name and address of customer user 203 is stored in field 220F. The default name and address of field 220F is the name and address of the individual whose customer persona 120.1 is indicated by the persona id of field 220A. The default name and address of field 220F facilitates providing such information when it is requested.

Field 220G retains preferred customer application software 210 settings (options), for example, the communication preferences (e.g., time-out range in seconds), alert preferences (e.g., show alerts before submitting transactions off-line and/or when logging on), and security preferences (e.g., ask for passphrase before a payment operation).

Field 220H stores the RSA private key for a customer persona 120.1. The RSA private key of field 220H is the complement to RSA public key of field 120C, stored in server database 102.

Cash container data 220I represents fields 280A–280C shown in FIG. 5U.

Instrument binding 220J represents fields 230A–230S shown in FIG. 5D.

Field 220K retains the autoclose account number associated with the autoclose password stored in field 220D.

Field 220L stores one or more integers representing legal agreements. In the preferred embodiment, the operator of server computer 100 determines what legal agreements must be agreed to by customer user 203 in order for customer user 203 to create a persona.

Active sessions data 220M represents fields 240A–240K.

Pending log data 220N represents records 251–256 of pending log data structure 250.

Transaction log data 220O repressents records 261–267 of transaction log data structure 260.

While the foregoing description of customer persona data structure 220 and record 220.1 was set forth with respect to data relating to customer user 203, it is noted that merchant user 303 has corresponding data stored in merchant persona data structure 320, shown in FIG. 6C. A merchant record 320.1 is shown in FIG. 6C where fields 320A–320O correspond to fields 220A–220O.

3. Customer Instrument Binding Data Structure 230

Customer instrument binding data structure 230 retains information at customer computer 200 regarding bound instruments. Referring to FIG. 5D, customer instrument binding data structure 230 includes one or more records 230.1. Customer database 202 contains one record 230.1 for each instrument bound to customer persona 120.1. A detailed record 230.1 of customer instrument binding data structure 230 is shown in FIG. 5D where:

Field 230A stores the instrument number.

Field 230B contains a description of the bound instrument.

Fields 230C–230J respectively represent the name, address, city, country, postal code, country code, area code and telephone number of the holder of the bound instrument.

Field 230K stores a default currency associated with the bound instrument.

Fields 230L–230O are flags indicating whether the bound instrument is enabled for sale transactions, credit return transactions, unload and load operations. Fields 230L–230O correspond to fields 120H.16, 120H.18, 120H.22 and 120H.20, respectively (FIG. 4D).

Field 230P contains a status of the bound instrument. The binding status of field 230P corresponds to the binding status of field 120H.15 of FIG. 4D.

Field 230Q stores a salt for the bound instrument. The salt of field 230Q represents a random number generated by customer application software 210. As previously described, is used by server to strengthen the result of the instrument hash value stored in field 120H.9.

Field 230R stores certain information associated with a bound instrument and is referred to as "instrument recurring data". The recurring data is a data string which is used by customer application software 210 to reconstruct a set of label-value pairs identified by server computer 100 at the time an instrument is bound. The fields are returned to server computer 100 by customer computer 200 during operations that require use of the instrument associated with the recurring data. In this way, server computer 100 may receive information regarding the instrument when necessary without storing that information in its data structures. The particular label-value pairs that are contained within recurring data depend on the type of the bound instrument and the requirements of the issuer of the instrument. For example, a credit card might require the card number, the card expiration date, and the name and address of the card holder to be returned to the server each time the card is used to load funds into persona 120.1. The recurring data would contain data which would allow customer application software 210 to return this information in the proper label-value pair format.

Field 230S corresponds to and stores the same information as field 120H.7 (FIG. 4D) relating to legal agreements.

While the foregoing description of customer instrument binding data structure 230 and record 230.1 was set forth with respect to data relating customer user 203, it is noted that a merchant user 303 has corresponding data stored in merchant persona data structure 330, shown in FIG. 6D. A merchant record 330.1 is shown in FIG. 6D where fields 330A–330S correspond to fields 230A–230S.

4. Customer Session Data Structure 240

Customer session data structure 240 maintains information at customer computer 200 relating to a session. Referring to FIG. 5E, customer session data structure 240 includes one or more records 240.1. Customer session data structure 240 contains one record 240.1 for each active session of customer user 203. A detailed record 240.1 of customer session data structure 240 is shown in FIG. 5E.

Fields 240A–240F correspond to and contain the same information relating to a session as fields 130A–130F (FIG. 4H). Field 240G contains the last index used by customer computer 200 during the session. Field 240H contains the same information as field 130M. Fields 240J–240K contain the same data as fields 130I–130J, respectively.

While the foregoing description of customer session data structure 240 and record 240.1 was set forth with respect to data relating a customer user 203, it is noted that a merchant user 303 has corresponding data stored in merchant persona data structure 340, shown in FIG. 6E. A merchant record 340.1 is shown in FIG. 6E where fields 340A–340K correspond to fields 240A–240K (FIG. 5E).

5. Customer Pending Transaction Data Structure 250

Customer pending transaction data structure 250 stores (1) data necessary to create messages sent by customer computer 200 and (2) a copy of each message sent by customer computer 200. Referring to FIG. 5F, customer pending transaction data structure 250 includes the following records: pending persona registration/update persona information 251, pending link/update financial instrument binding 252, pending cash payment 253, pending load/unload funds 254, pending open session record 255, and pending close session record 256. Each record 251–256 is now described in detail with reference to FIGS. 5G–5L. It is preferred that a pending record 251–256 be deleted upon receipt by customer computer 200 of a response message unless customer user 203 has indicated otherwise.

a. Pending Persona Registration/Update Persona Information Record 251

Pending persona registration/update persona information record 251 stores data relating to processes by which customer user 203 creates customer persona 120.1. Referring to FIG. 5G, record 251 is shown in detail.

Field 251A indicates a code which represents a type (transaction type) of action being performed. For example, field 251A may contain "creation" which would indicate that user 203 is creating persona 120.1. If a persona 120.1 already exits and the action being performed is to change something associated with that persona, field 251A may contain "modification".

Field 251B stores a transaction number, that is, a unique number indicative of a particular action. The transaction number of field 251B is generated by client application software 210. The transaction number of field 250B allows server computer 100 to send an associated reply message. Because transaction numbers are unique, the transaction number of field 251B also permits server computer 100 to determine whether a message R1 is a duplicate message.

Field 251C represents the date and time that message R1 was assembled and sent to server computer 100.

Field 251D stores the version of the application software 210 used to assemble message R1. As further described later, the software version number of field 251D is used to determine whether customer application software 210 is outdated.

Field 251E contains a preferred language for customer user 203, corresponding to field 220E (FIG. 5B).

Field 251F contains a preferred currency for customer user 203, corresponding to field 240D (FIG. 5E).

Field 251G stores a persona id requested by customer user 203. It should be noted that the requested persona id of field 251G may not be the same as the persona id of field 120A finally assigned to customer user 203. For example, server computer 100 may reject the requested persona id of field 251G if it is already in use by another customer user 203.

Field 251H contains the email address for customer user 203, corresponding to field 220B (FIG. 5C).

Field 251I contains an autoclose passphrase, corresponding to field 120F (FIG. 4B).

Field 251J stores an original transaction string which is a copy of original message R1 sent from customer computer 200 to server computer 100.

b. Pending Link/Update Instrument Record 252

Pending link/update record 252 stores data relating to processes by which customer user 203 binds an instrument to customer persona 120.1 or updates an existing bound instrument. Referring to FIG. 5H, a record 252 is shown in detail.

Field 252A indicates a code which represents a type of action (transaction type) being performed. For example, field 252A may contain "link" which would indicate that user 203 is linking an instrument to customer persona 120.1. If the action being performed is to change something associated with an instrument already linked with that persona, field 252A may contain "update".

Fields 252B–252D correspond to and store the same information as field 251B–251D of FIG. 5G. These fields relate to the transaction number, transaction date and time, and software version, respectively.

Field 252E contains the persona id of customer user 203, corresponding to field 220A (FIG. 5B).

Field 252F stores the number of the instrument being bound to persona 120.1.

Field 252G stores additional customer identification information needed to use the instrument being bound, for example, American Express card customer identification number.

Field 252H stores the name of the person to whom the instrument being bound was issued.

Field 252I stores the expiration date of the instrument being bound.

Fields 252J–252Q respectively store the street address, city, state, postal code, country, country code, area code and telephone number of the person to whom the instrument being bound was issued.

Field 252R contains customer user 203's selected description of the instrument being bound.

Instrument recurring data field 252S stores information stored in field 230R as relates to bound instruments.

Field 252T stores the type of instrument being bound, for example, VISA, American Express, etc.

Field 252U contains a random number salt, generated by customer computer 200. The salt of field 252U is used to strengthen the instrument number hash mainatined at server 100.

Field 252V stores a flag which if set indicates that the instrument is the autoclose account instrument.

Field 252W stores an original transaction string which is a copy of the original message BI1 sent by customer computer 200 to server computer 100.

c. Pending Cash Payment Record 253

Pending cash payment record 253 stores data relating to transactions involving cash payments. Referring to FIG. 5I, a record 253 is shown in detail.

Field 253A indicates a code which represents a type of action (transaction type) being performed. For example, if a session is open, then field 254A may indicate "cash payment" indicating that customer user 203 is sending a message CA1 (described later).

Fields 253B–253D correspond to and store the same information as fields 251B–251D (FIG. 5G). These fields relate to the transaction number, transaction date and time, and software version, respectively.

Field 253E contains the persona id of customer user 203, corresponding to field 220A (FIG. 5C).

Field 253F stores an order identification number ("order id"). The order id of field 254F is generated by merchant computer 300 to identify a particular order.

Field 253G contains merchant user 303's persona id 120AA (FIG. 4E).

Field 253H stores an amount of electronic cash that a customer user 203 is paying for a product which is the subject of the current transaction.

Field 253I provides a location for an optional customer user 203 generated memo that describes this particular transaction.

Field 253J contains the URL of a merchant computer 300 to which customer user 203 wishes to direct a cash payment. Customer application software 210 uses the URL field 253J to direct pay cash requests in the form of message CA1 to merchant computer 300 for forwarding to server computer 100.

Field 253K stores the session-id of the session during which the current transaction was initiated.

Field 253L stores the index associated with current transaction.

Field 253M stores an original transaction string which is a copy of message CA1 sent by customer computer 200, through merchant computer 300, to server computer 100. <cr> Field 253N contains the URL of merchant computer 300 on which customer user 203 wishes to cancel a transaction. Customer application software 210 uses the URL field 253N to cancel transaction requests in the form of message CA1.

Field 253O contains the URL of merchant computer 300 to indicate a successful cancellation of a transaction by customer user 203. Customer application software 210 uses the URL field 253O to indicate a successful cancellation in the form of message CA4.

Field 253P stores the URL of merchant computer 300 to indicate a failure of a transaction. Customer application software 210 uses the URL field 253P to indicate a failure of a transaction in the form of message CA4.

d. Pending Load/Unload Funds Record 254

Pending load/unload funds record 254 stores data relating to transactions involving loading and unloading of electronic cash. Referring to FIG. 5J, a record 254 is shown in detail.

Field 254A indicates a code which represents a type of action (transaction type) being performed. For example, field 254A may contain "load" which would indicate that user customer 203 is "transferring" funds into the cash container field 280B of record 280.1 from the instrument identified in field 254F. Alternatively, field 254A may contain "unload" which would indicate that customer user 203 is "transferring" electronic cash funds from cash container field 280B to the instrument identified in field 254F.

Fields 254B–254D correspond to and store the same information as fields 251B–251D (FIG. 5G). These fields relate to the transaction number, transaction date and time, and software version, respectively.

Field 254E contains the persona id of customer user 203, corresponding to field 220A (FIG. 5C).

Field 254F stores an account number identifying a bound instrument from which funds are to be loaded or to which funds are to be unloaded.

Field 254G stores an amount of funds to be loaded from or unloaded to a bound instrument.

Field 254H stores the type of account from which funds are being load or to which funds are being loaded.

Field 254I stores an original transaction string which is a copy of message LU1 sent by customer computer 200 to server computer 100.

e. Pending Open Session Record 255

Pending session record 255 stores data relating to processes by which customer user 203 creates a session. Referring to FIG. 5K, a record 255 is shown in detail.

Field 255A indicates a code which represents a type of action (transaction type) being performed. For example, field 255A may contain "open-session" which would indicate that user customer 203 is creating a session.

Fields 255B–255D correspond to and store the same information as fields 251B–251D (FIG. 5G). These fields relate to the transaction number, transaction date and time, and software version, respectively.

Field 255E contains the persona id of customer user 203, corresponding to field 220A (FIG. 5C).

Field 255F stores an amount of electronic cash to be made available during a session.

Field 255G stores a value representing the maximum number of transactions (key use limit) that customer user 203 may request during a session.

Field 255H stores a value representing the maximum amount of time (key lifetime) the session will remain open.

Field 255I stores the text of an optional description of a session as entered by customer user 203.

Field 255J stores the currency associated with the amount value stored in field 255F.

Field 255K stores an original transaction string which is a copy of message OS1 sent by customer computer 200 to server computer 100.

f. Pending Close Session Record 256

Pending close-session record 256 stores data relating to processes by which customer user 203 closes a session. Referring to FIG. 5L, a record 256 is shown in detail.

Field 256A indicates a code which represents a type of action being performed. For example, field 256A may contain "close-session" which would indicate that user customer 203 is closing a session.

Fields 256B–256D correspond to and store the same information as fields 251B–251D (FIG. 5G). These fields relate to the transaction number, transaction date and time, and software version, respectively.

Field 256E contains the persona id of customer user 203, corresponding to field 220A (FIG. 5C).

Field 256F contains either "yes" or "no". The value of field 257 determines whether customer user 203 has elected to receive a log of the transactions initiated by customer user 203 during the session to be closed.

Field 256G stores the session-id of the open session to be closed. Alternatively, if all open sessions are to be closed, field 256G will be null.

Field 256H stores the text of an optional description related to the session closing as entered by customer user 203.

Field 256I stores an original transaction string which is a copy of message CS1 sent by customer computer 200 to server computer 100.

6. Customer Log Data Structure 260

Referring to FIG. 5A, customer log data structure 260 maintains a copy of each message received by customer computer 200. Customer log data structure 260 stores data received by customer computer 200 from server computer 100. Referring to FIG. 5M, customer log data structure 260 includes the following records: persona registration/update persona information response 261, link/update financial instrument binding response 262, cash payment response 263, load/unload funds response 264, open session response 265, payment request 266, and close session response 267. Each record 261–267 is now described in detail with reference to FIGS. 5N–5U.

a. Persona Registration/Update Response Persona Information Record 261

Persona registration/update persona information record 261 stores data relating to the response of server computer 100 to a request to create a customer persona 120.1 by customer user 203. Referring to FIG. 5N, a record 261 is shown in detail.

Field 261A indicates a type of action that was requested and is the same as the value of field 251A of record 251. Field 261B stores a transaction number that is the same as the value stored in 251B.

Field 261C represents the date and time that message R1 was assembled and sent to server computer 100.

As will be discussed later, messages from customer computer 200 to server computer 100 convey a code containing the version number of the customer application software 210 used to create the message. At server computer 100, each software version is associated with one of three "status" labels: current, warning, or fatal. Server computer 100 checks the software version reported in customer's messages and includes in its reply message one of the three possible status labels. The status label returned in message R2 is stored in software severity field 261D. A text message regarding the content of software severity field 261D may also be returned by server computer 100 and, if so, is stored in field 261E.

A code representing the success or failure of message R1 is returned by server computer 100 and is stored in response code field 261F. A text message regarding the content of the response code field 261F, if sent by server computer 100, is stored in field 261G.

Field 261H stores a persona id requested by customer user 203. As described below, if the requested persona id is in use, server computer 100 will suggest a persona id to customer user 203. The persona id suggested by server computer 100 is stored in field 261I.

Field 261J contains the email address for customer user 203 corresponding to field 220B (FIG. 5C).

Field 261K contains a preferred language for customer user 203, corresponding to field 220E (FIG. 5C).

Field 261L contains a preferred currency for customer user 203, corresponding to field 240D (FIG. 5E).

b. Link/Update Response Instrument Record 262

Link/update instrument record 262 stores data relating to the response by server computer 100 to a request by customer user 203 to bind an instrument to customer persona 120.1. Referring to FIG. 5O, a record 262 is shown in detail.

Field 262A indicates a type of action (transaction) that was requested and is the same as the value of field 252A of record 252.

Fields 262B–262G correspond to and store the same information as field 261B–261G of FIG. 5N. These fields relate to the transaction date and time, software severity code, software message, response code, and response message respectively.

Field 262H contains the persona id of customer user 203, corresponding to field 220A (FIG. 5C).

Field 262I stores the number of the instrument being bound to customer persona 120.1. Field 262J stores the type of instrument being bound, for example, VISA, American Express, etc. to customer persona 120.1.

Field 262K stores customer identification information needed to use the instrument being bound, for example, American Express card customer identification number <cr>.

Field 262L stores the name of the customer to whom the instrument being bound was issued.

Field 262M stores the expiration date of the instrument being bound.

Fields 262N–262U respectively store the street address, city, state, postal code, country, country code, area code and telephone number of the person to whom the instrument being bound was issued.

Field 262V stores the text of a description of the instrument being bound as entered by customer user 203.

Field 262W stores the native currency, if any associated with an instrument which is returned by server computer 100.

Field 262X stores the name of the issuer of the instrument which is returned by server computer 100.

Field 262Y stores the country of issuance of the instrument.

Field 262Z stores a flag which if set indicates that the instrument is the autoclose account instrument.

c. Cash Payment Response Record 263

Cash payment response record 263 stores data relating transactions involving cash payments and sessions. Referring to FIG. 5P, a record 263 is shown in detail.

Field 263A indicates a type of action (transaction type) that was requested and is the same as the value of field 253A of record 253.

Fields 263B–263E correspond to and store the same information as field 261B–261C and 261F–261G of FIG. 5N. These fields relate to the transaction number, date and time, response code, and response message respectively.

Field 263F contains the persona id of customer user 203, corresponding to field 220A (FIG. 5C).

Field 263G stores an order identification number ("order id"). The order id of field 263I is generated by merchant computer 300 to identify a particular order.

Field 263H contains a merchant user 303 persona id 120AA.

Field 263I provides a location to store a message from merchant user 303.

Field 263J stores an amount of electronic cash that a customer user 203 is paying for a product which is the subject of the current transaction.

Field 263K provides a location for an optional customer user 203 generated memo.

Field 263L stores the session-id of the session during which the current transaction was initiated.

Field 263M stores the index associated with the current transaction.

d. Load/Unload Funds Response Record 264

Load/unload funds response record 264 stores data relating to the response of server computer 100 to a request to load or unload funds by customer user 203. Referring to FIG. 5Q, a record 264 is shown in detail.

Field 264A indicates a type of action (transaction type) that was requested and is the same as the value of field 254A of record 254.

Fields 264B–264G correspond to and store the same information as field 261B–261G of FIG. 5N. These fields relate to the transaction date and time, software severity code, software message, response code, and response message respectively.

Field 264H contains the persona id of customer user 203, corresponding to field 220A (FIG. 5C).

Field 264I stores an account number identifying a bound instrument from which electronic cash is to be loaded or to which electronic cash is to be unloaded.

Field 264J stores an amount of electronic cash to be loaded from or unloaded to a bound instrument.

Field 264K stores an amount of any fee charged by the operation of server computer 100 to load or unload funds from customer persona 120.1.

Field 264L stores an amount equal to the available balance of the funds held by customer persona 120.1 as determined by server computer 100, corresponding to the value stored in field 120G.2 (FIG. 4C).

Field 264M stores an amount of funds which have been loaded (or unloaded) but are not available to customer user 203. These funds are awaiting processing, corresponding to the value stored in field 120G.3 (FIG. 4C).

e. Open Session Response Record 265

Create session response record 265 stores data relating to the response of server computer 100 to a request to create a session by customer user 203. Referring to FIG. 5R, a record 265 is shown in detail.

Field 265A indicates a type of action that (transaction type) was requested and is the same as the value of field 255A of record 255.

Fields 265B–265G correspond to and store the same information as field 261B–261G of FIG. 5N. These fields relate to the transaction date and time, software severity code, software message, response code, and response message respectively.

Field 265H contains the persona id of customer user 203, corresponding to field 220A of FIG. 5C.

Field 265I stores an amount of electronic cash made available during a session.

Field 265J stores a value representing the maximum number of transactions (key use limit) that customer user 203 may request during a session.

Field 265K stores a value representing the maximum amount of time (key lifetime) the session will remain open.

Field 265L stores a session id number.

Field 265M stores the text of an optional description of the session to be opened as entered by customer user 203.

Field 265N stores an amount of any fee charged by the operation of server computer 100 to create a session.

Field 265O stores the available balance remaining in the cash container (field 120G.2) after the value in amount field 265I is subtracted.

f. Payment Request Record 266

Payment request record 266 stores data relating to a request from merchant user 303 for payment for the product. The request is in the form of a message PR1 (described later) which is sent by merchant computer 300 to customer computer 200. Referring to FIG. 5S, a record 266 is shown in detail.

Field 266A contains a merchant user 303 persona id 120AA.

Field 266B stores an order identification number ("order id"). The order id of field 266B is generated by merchant computer 300 to identify a particular order.

Field 266C stores an amount of electronic funds that a customer user 203 is paying for the product which is the subject of the current transaction.

Field 266D stores a list of credit cards accepted by merchant 203 for payment.

Field 266E provides a location to store a message (note) from merchant user 303.

Field 266F stores the pay-to-URL. The value of label-value pair 5013I is an Internet 50 uniform resource locator. The Internet 50 uniform resource locator of label-value pair 5013I is the address on the Internet 50 to which customer computer 200 is to sends message CA1, described later.

g. Close Session Response Record 267

Close session response record 267 stores data relating to the response of server computer 100 to a request to close a session by customer user 203. Referring to FIG. 5T, a record 267 is shown in detail.

Field 267A indicates a type of action (transaction type) that was requested and is the same as the value of field 256A of record 256.

Fields 267B–267G correspond to and store the same information as field 261B–261G of FIG. 5N. These fields relate to the transaction date and time, software severity code, software message, response code, and response message respectively.

Field 267H contains the persona id of customer user 203, corresponding to field 220A (FIG. 5C).

Field 267I stores an amount of electronic cash remaining in the session after the close of a session after all payments and fees have been deducted.

Field 267J stores the transaction log returned by server computer 100 if requested by customer user 203 in message CS1. This would also indicate whether or not a transaction log was returned.

Field 267K stores an amount of any fee charged by the operation of server computer 100 to close the session.

7. Message Template Data Structure 270

Referring to FIG. 5A, message template data structure 270 tracks the format and contents of messages that customer user 203 sends and receives. A message which contains all the required labels with valid values (e.g., syntax, etc.) as determined by reference to message template data structure 270 will be processed even if there are extraneous label-value pairs. A message which does not contain all the required label-value pairs, or which includes labels associated with invalid values as determined by reference to message template data structure 270 will fail as to form.

Figure 6A:
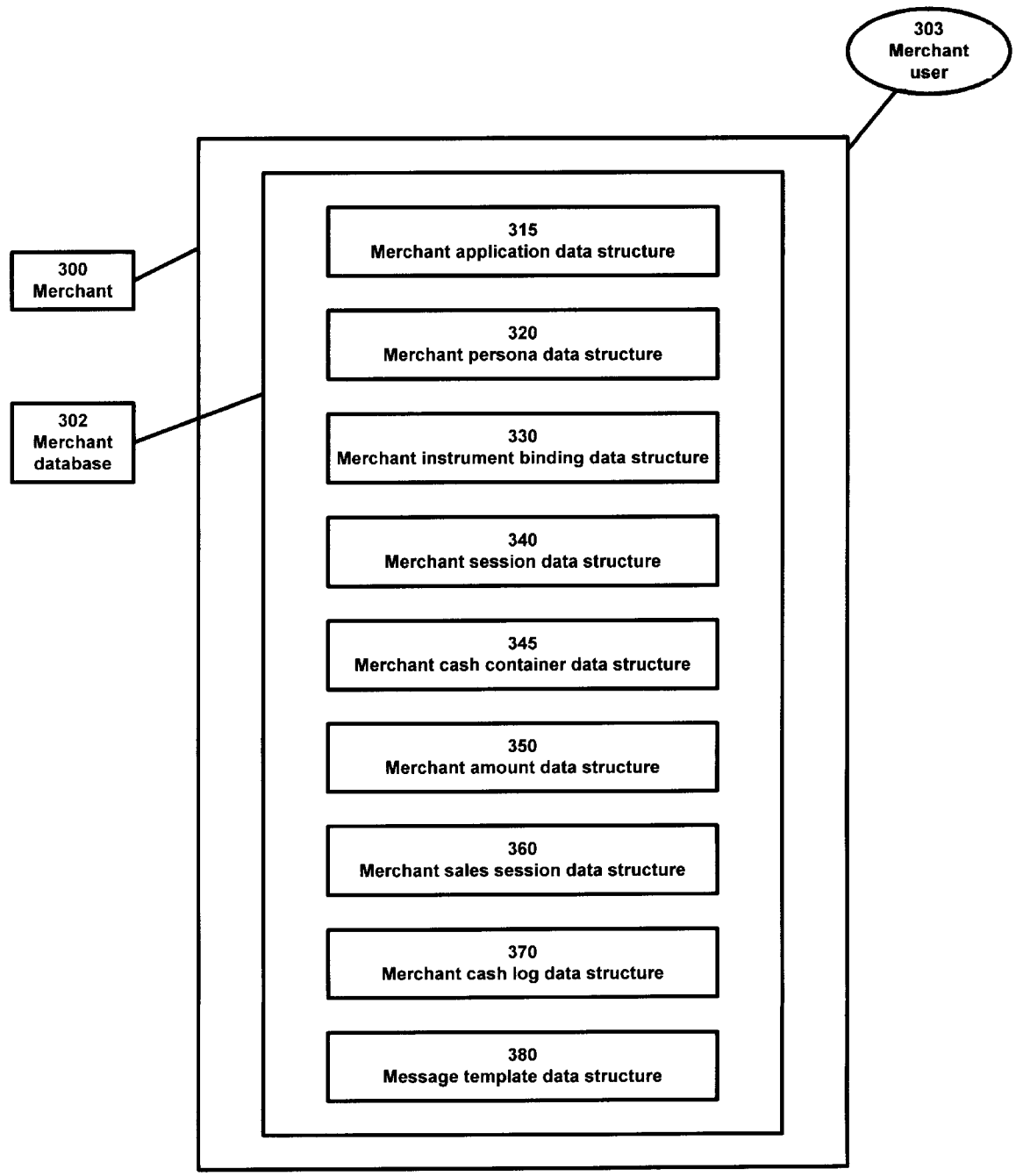
FIG. 6A depicts the structure of the database of the merchant computer.

While the foregoing description of message templates 270 was set forth with respect to data relating a customer user 203, it is noted that a merchant user 303 has corresponding data stored in message templates 380, shown in FIG. 6A.

8. Cash Container Data Structure 280

Customer cash container data structure 280 maintains information at customer computer 200 relating to cash containers. Referring to FIG. 5U, cash container data structure 280 includes one record 280.1 for each cash container established by customer user 203. A detailed record 280.1 of customer cash container data structure 280 is shown in FIG. 5U.

Fields 280A–280C correspond to and contain the same information relating to a cash container as fields 120G.1–120G.3 (FIG. 4C).

While the foregoing description of customer cash container data structure 280 and record 280.1 was set forth with respect to data relating a customer user 203, it is noted that a merchant user 303 has corresponding data stored in merchant cash container data structure 345, shown in FIG. 6F. A merchant record 345.1 is shown in FIG. 6F where fields 345A–345C correspond to fields 280A–280C (FIG. 5U).

C. Merchant Database 305

The database 305 of merchant computer 300 is described next.

FIG. 6A depicts the general structure of the merchant database 302 of merchant computer 300. FIG. 6A, depicts merchant application data structure 315 (previously described), merchant persona data structure 320 (previously described), merchant instrument binding data structure 330 (previously described), merchant session data structure 340 (previously described), merchant amount data structure 350, merchant sales session data structure 360, merchant cash log 370, message template data structure 380 (previously described), and merchant cash container data structure 345 (previously described). Data structures 350, 360 and 370 are now described.

1. Merchant Amount Data Structure 350

Merchant amount data structure 350 tracks the amount of electronic cash merchant user 303 expects to receive from customer user 203 for an order. Referring to FIG. 7A, record 350 is shown in detail.

Field 350A stores an order id, corresponding to field 253F of FIG. 5I.

Field 350B stores an amount of electronic cash (amount of transaction) corresponding to field 253H of FIG. 5I.

Field 350C is a flag indicating whether an order has been paid for by customer user 203.

2. Merchant Sales Session Data Structure 360

Merchant sales session data structure 360 tracks the sessions of merchant user 303. Referring to FIG. 7B, record 360 is shown in detail.

Fields 360A–360D correspond to fields 340A–340D (FIG. 6E). Field 360E corresponds to field 340H (FIG. 6E). Fields 360F corresponds to field 340F (FIG. 6E). Fields 360J–360K correspond to fields 340J–340K (FIG. 6E). Field 360G stores the date that the merchant sales session identified by session id field 360A was opened. Field 360H stores the date that such session was closed.

3. Merchant Cash Log Data Structure 370

Merchant cash log 370 tracks electronic cash transactions and session data not retained in merchant sales session data structure 360. More specifically, merchant cash log data structure 370 stores data relating to collections and sessions initiated by a merchant user 303. Referring to FIG. 7C, a record 370 is shown in detail.

Fields 370A–370M store data relating to collection messages CA2 submitted by merchant computer 300 to server computer 100. Those fields are now described in detail.

Field 370A indicates a type of action being performed. In this case, the type stored in field 370A is "collection".

Field 370B stores a status of the current collection request. The status of field 370B may include "attempt", "success" or "failure". The label "attempt" will be returned when the request has been sent to server computer 100 but no response has been received. If the request is processed by server computer 100 and the collection request is honored, field 370B will contain the label "success". If server computer 100 denies the request, field 370B will contain the label "failure" and field 370M will include a code identifying the reason for such failure.

Field 370C stores an order identification number ("order id"). The order id of field 370A is generated by merchant computer 300 to identify a particular order.

Field 370D stores the session id of field 240A used by customer computer 200 in the current collection request.

Field 370E stores the index of field 240G used by customer computer 200 in the current collection request.

Field 370F stores the currency of field 240D used by customer computer 200 in the current collection request.

Field 370G stores the session id of field 340A used by merchant computer 300 in the current collection request.

Field 370H stores the index of label-value pair 5213D used by merchant computer 300 in the current collection request.

Field 370I stores the currency of field 340D used by merchant computer 300 in the current collection request.

Field 370J stores an amount of electronic cash funds requested to be paid to merchant user 303 in the current collection request.

Field 370K stores an amount of electronic cash credited to merchant cash container field 345B for the current collection. The amount of electronic cash credited is null if the status of field 370B is null.

Field 370L stores an amount of electronic cash funds paid to the operator of server computer 100 for processing the current collection request (i.e., a fee).

If the content of status field 370B is "failure", field 370M stores a result code. The result code is used by merchant application software 310 to associate a message with the failure reported in status field 370B. Thus, the code returned in field 370M could prompt merchant application software to display a message such as "collection failed due to inadequate funds."

Fields 370N–370T store data relating to sessions initiated by merchant computer 300 (message OS1). Those fields are now described in detail.

Field 370N indicates a type of action being performed. In this case, the type stored in field 370N is "OS".

Field 370O stores a status of the current collection request. The status of field 370O may include "attempt", "success" or "failure". The label "attempt" will be returned when the request has been sent to server computer 100 but no response has been received. If the request is processed by server computer 100 and the collection request is honored, field 370O will contain the label "success". If server computer 100 denies the request, field 370O will contain the label "failure" and field 370T will include a code identifying the reason for such failure.

Field 370P stores a transaction number, that is, a unique number indicative of a particular session initiated by merchant computer 300.

Field 370Q stores a merchant user 303's requested amount of time that the current session should last (i.e., requested session duration).

Field 370R stores a merchant user 303's requested number of times that the session key of field 340J can be used (i.e., requested session court).

If the status of field 370O is "success", field 370S stores a session id for merchant computer 300 for the current session.

If the content of status field 370O is "failure", field 370T stores a result code. The result code is used by merchant application software 310 to associate a message with the failure reported in status field 370T.

III. General Information

The preferred format of messages used in the present invention is now described.

Due to the nature of the Internet 50, the present invention uses a message transmission independent mechanism so that messages can be transmitted using several different protocols. These protocols may include e-mail (simple mail transport protocol) and world wide web (hyper text transport protocol or other protocols, such as remote procedure protocol (RPC)). Therefore, messages used in the present invention have a particular and preferred format that is not specific to the transport protocol. The particular and preferred format is based on RFC 822, which is well known in the art and therefore, only briefly described.

FIG. 7D depicts the format of a sample message 4000. Sample message 4000 includes header 4005, body 4010 and trailer 4050. Body 4010 includes transparent (unencrypted) label-value pairs 4013A, 4013B, etc. and may include opaque (encrypted) label-value pair 4017. (Label-value pairs consist of a label and data relating to the label, separated by a label terminator, for example, "name: Brian".)

Header 4005 defines the start of sample message 4000. Header 4005 may include a system identifier, for example, "CyberCash" (the assignee of the present invention) and a number of the message protocol ("protocol number") in which sample message 4000 was assembled.

Transparent label-value pairs 4013A, 4013B, etc. include any clear (non-encrypted) text associated with sample message 4000. Encryption and decryption are described below.

Opaque label-value pair 4017 includes the label "opaque". The value of opaque label-value pair 4017 is a block of encrypted data. The value of opaque label-value pair 4017 includes a predetermined set of label-value pairs encrypted with a DES key. After encryption, the value is preferably base-64 encoded. The predetermined set of label-value pairs is referred to herein as the "opaque section contents" of sample message 4000. For request messages sent outside of a session (R1, BI1, LU1 and CS1), the value of opaque label-value pair 4017 begins with that DES key, RSA encrypted under a public RSA key of server computer 100. RSA encryption is computationally expensive. For reply messages (R2, BI4, LU2, OS2 and CS2) and messages inside a session (CA1, CA2, CA3 and CA4), no additional information, beyond the opaque section contents, is required in the value of opaque label-value pair 4017, thus avoiding the expense of RSA encryption. The opaque section contents varies in length and represents data encrypted with the DES key used.

Trailer 4050 closes sample message 4000. Trailer 4050 preferably includes a transmission checksum. It is preferred that the transmission checksum of field 4050D be an MD5 hash performed on all printable characters in header 4005 and those appearing in body 4010. Thus, all white space, including new-lines, spaces, tabs, carriage returns, etc. are omitted from the checksum hash. In this manner, the correctness of the message transmission can be checked while avoiding sensitivity to gateways or processing that might, for example, change the line terminator sequence or convert tabs to spaces.

Encryption and decryption techniques used in the present invention are now described.

The present invention preferably uses both RSA and DES methods for data encryption and decryption. Such methods are well known in the art. RSA is fully described in U.S. Pat. No. 4,405,829. The present invention preferably relies on 768-bit RSA keys reflecting a balance between concerns relating to security, execution time, and export control. The size of the RSA key may change as high-end computers with fast processing speeds become more prevalent in customer installations and the export requirements are relaxed. As is known to those skilled in the art, other public/private asymmetric key systems (such as Rabin, and ElGamal) could be used in the current invention for authentication purposes.

In the present invention, digital signatures are used to authenticate information. The details of digital signatures are widely discussed in computer security literature. The present invention utilizes two methods for authentication: RSA/MD5 digital signatures and knowledge of shared information (e.g., a salt value and/or a key value).

As mentioned above, the present invention also depends on hashing hashing of data. A has preferably is calculated using the well-known MD5 algorithm which is described in Internet publication RFC 1321, applied to a "synthetic message".

If a label-value pair is specified in a hash input, but is not present in a message, the label and label terminator are preferably omitted from the hash.

IV. Processes of the Present Invention

A. Download And Installation Process 400

During the download and installation process 400 as previously described with respect to FIG. 3A, an RSA public key of server computer 100 is stored in field 215A of customer application data structure 215. Merchant computer 300 obtains a copy of user application software 153 in the same manner as customer user 203 using download and installation process 400. In such case, user application software 153 resides on merchant computer 300 as a component of merchant application software 310 and an RSA public key of server computer 100 is stored in field 315A of merchant application data structure 315.

B. Registration Process 401

Figure 8:
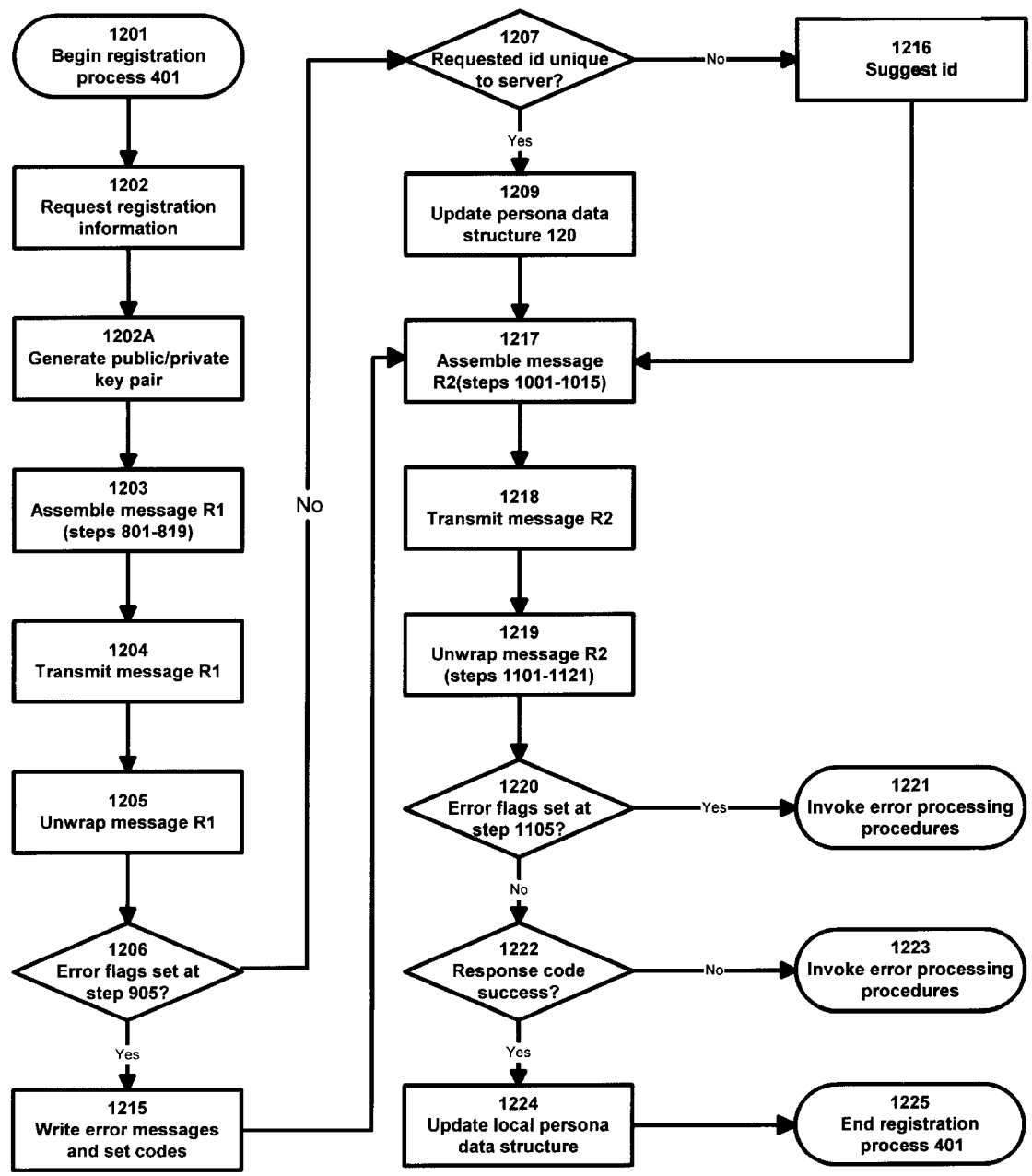
FIG. 8 is a flow diagram illustrating registration process 401.

FIG. 8 depicts a flow diagram illustrating registration process 401 which begins at step 1201.

At step 1202, customer application software 210 prompts or requests customer user 203 to enter information relating to customer user 203. This information will be included in message R1 sent to server computer 100 and will become part of customer persona 120.1. In the preferred embodiment, customer user 203 enters a preferred language of communication, a currency in which transactions will be processed, a requested persona id, an email address and an autoclose passphrase.

At step 1202A, customer application software 210 generates an RSA public/private key pair for customer computer 200. The RSA public key is stored in field 220C of customer persona data structure 220 (FIG. 5C). The RSA private key is stored in field 220H of customer persona data structure 220 (FIG. 5C).

Figure 9:
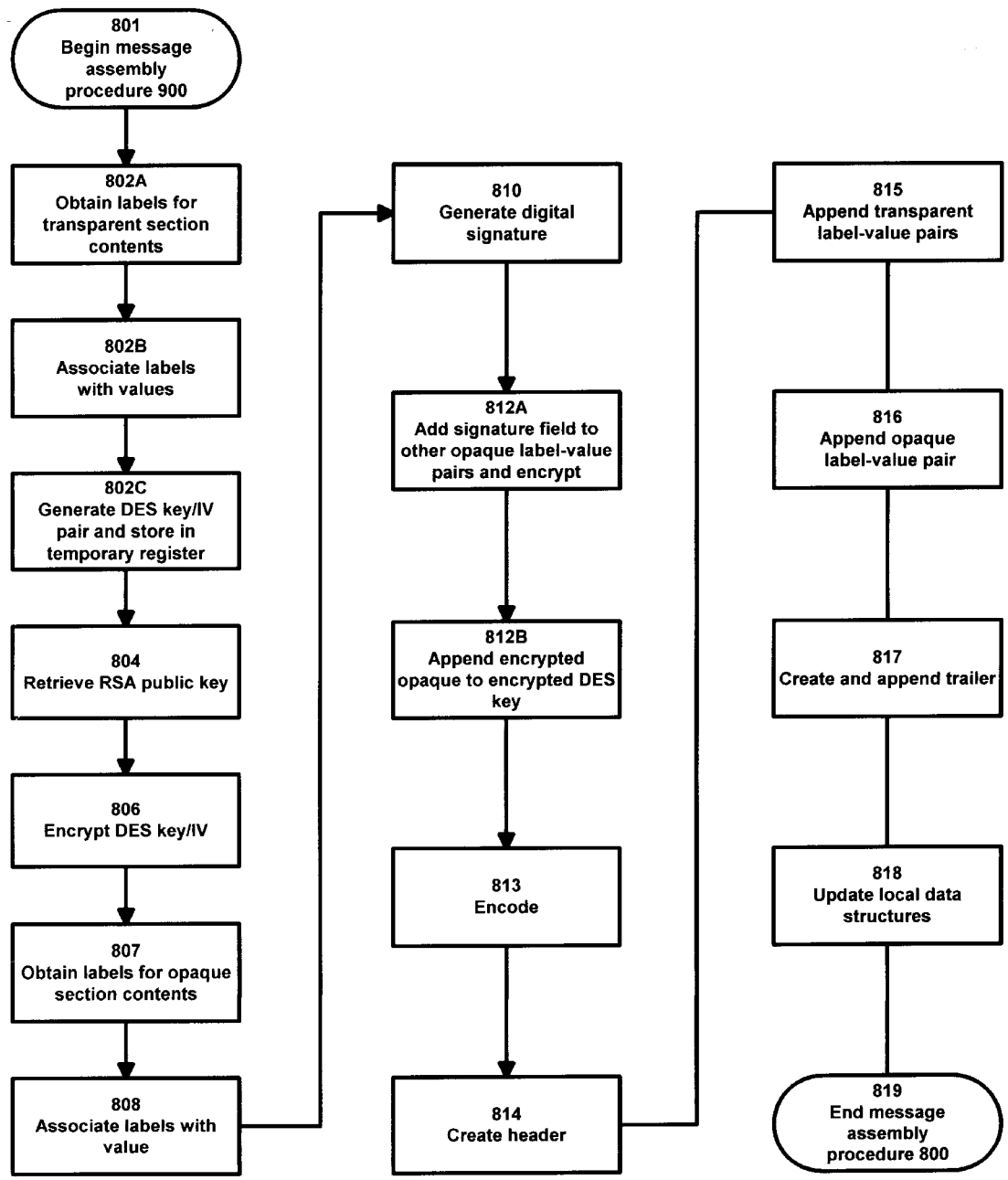
FIG. 9 is a flow diagram illustrating message assembly procedure 800.
Figure 11A:
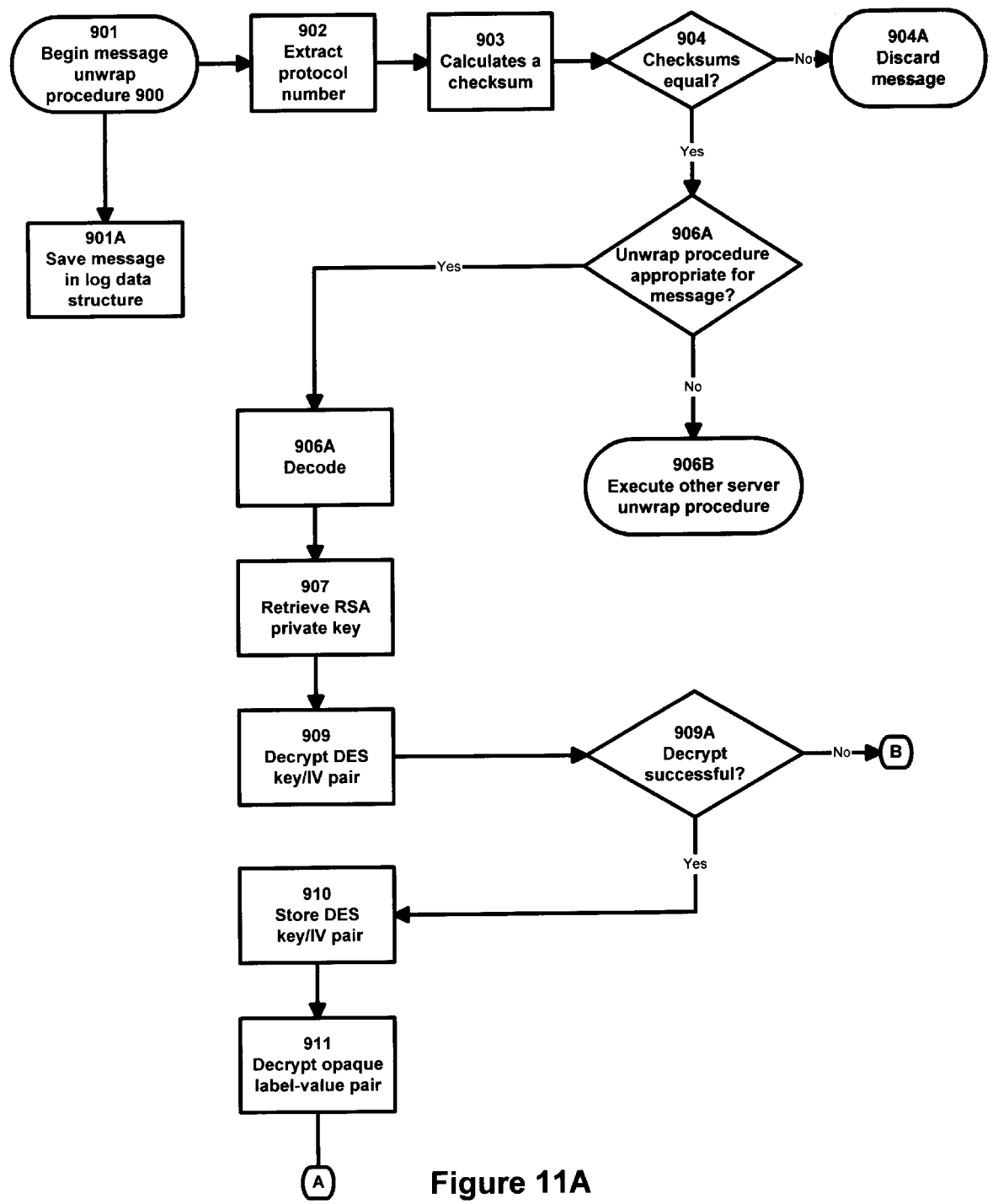
FIGS. 11A and 11B is a flow diagram illustrating server message unwrap procedure 900.
Figure 11B:
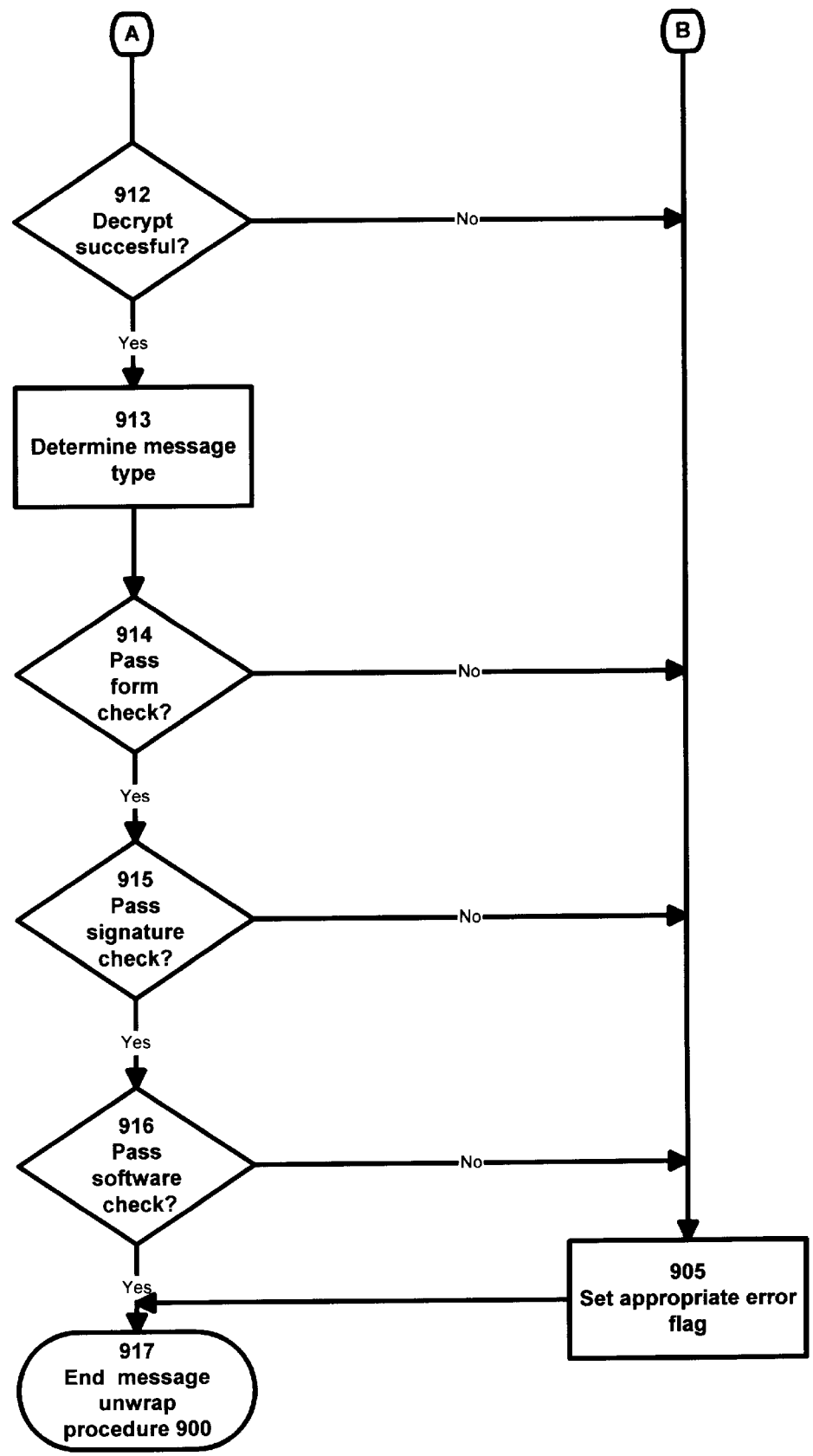

At step 1203, message R1 is assembled in accordance with message assembly procedure 800, depicted in FIG. 9. Message R1 will be sent from customer computer 200 to server computer 100 and will include the information entered by customer user 203 at step 1202. Message assembly procedure 800 is now described with reference to FIG. 9.

Message assembly procedure 800 begins a step 801. Steps 802A–802B create transparent label-value pairs 4213A–4213D of message R1, shown in FIG. 10A. Steps 802C–813 create opaque label-value pair 4217 of message R1, based upon the opaque section contents of message R1, shown in FIG. 10B. Steps 814–817 assemble header 4205, transparent label-value pairs 4213A–4213D, opaque label-value pair 4217 and trailer 4250 of message R1.

At step 802A, customer application software 210 accesses message template data structure 270 (FIG. 5A) to obtain a list of labels, which, when matched up with associated values, make up transparent label-value pairs 4213A–4213C of message R1. At step 802B, values are associated with each label as follows:

Label-value pair 4213A has the label "transaction". The value of field 4213A is a transaction number, generated by client software 210, which uniquely identifies message R1. The value of label-value pair 4213A allows server computer 100, upon receipt of message R1, (1) to send an associated reply message R2, described later, and (2) to determine if message R1 is a duplicate message (i.e., already received by server computer 100). The value associated with label-value pair 4213A is stored in field 251B of pending persona registration/update persona information record 251 (FIG. 5G).

Label-value pair 4213B has the label "date". The value of label-value pair 4213B indicates the date and time that message R1 was assembled and sent to server computer 100, according to the clock of customer computer 200. The value associated with label-value pair 4213B is stored in field 251C.

Label-value pair 4213C has the label "serverkey". As described below, a DES key/IV pair used by customer computer 200 to encrypt the opaque label-value pair 4217 of message R1 is encrypted using an RSA public key of server computer 100. The value of label-value pair 4213C points to the corresponding RSA private key stored in server private key data structure 160 (FIG. 4A).

Label-value pair 4213D has the label "service-category". The value of label-value pair 4213D is a label which may be used to route message R1 to a processor within server computer 100 that handles messages of a particular service category. This option permits the functions of server computer 100 to be distributed among multiple processors thereby improving capacity of the system.

At step 802C, customer application software 210 uses well known techniques to generate a random 128-bit quantity. It is preferred that the first 64-bits of the quantity so generated be treated as a 56-bit DES key and the second 64-bits be treated as a 64-bit initialization vector ("IV"). The 56-bit DES key is represented as a 64-bit quantity having the least significant bit of each eight bit byte ignored. This 128-bit quantity may be viewed as a DES key/IV pair. The DES key/IV pair is stored in a temporary register.

Next, at step 804, customer application software 210 retrieves the RSA public key for server computer 100 from field 215A of client application data structure 215 (FIG. 5B). As stated previously, the RSA public key for server computer 100 is preferably 768-bits in length. Of course, other length RSA keys may be used. At step 806, the RSA public key retrieved at step 804 is used to encrypt the DES key/IV pair created at step 802.

At step 807, customer application software 210 accesses message template data structure 270 (FIG. 2B) to obtain a list of labels, which, when matched up with associated values, make up the opaque section contents of message R1, shown in FIG. 10B. At step 808, values are associated with each label as follows:

Label-value pair 4217A has the label "type". The value of label-value pair 4217A references a record in message data structure 270 (FIG. 2B) which sets forth the labels of message R1. The value of label-value pair 4217A is obtained from customer application software 210 which generates the label when customer user 203 initiates the registration process.

Label-value pair 4217B has the label "server-date". The value of label-value pair 4217B indicates the date and time message R1 was assembled as measured by customer computer 200's perception of the date of server computer 100's clock.

Label-value pair 4217C has the label "swversion" (software version). The value of label-value pair 4217C indicates the version of customer application software 210 communicating with server computer 100. The value of label-value pair 4217C is obtained from data embedded in customer application software 210. The value associated with label-value pair 4217C is stored in field 25 ID.

Label-value pair 4217D has the label "content-language". The value of label-value pair 4217D indicates a preferred language of communication for customer user 203. The value of label-value pair 4217D is obtained from customer user 203 during registration process 401 at step 1202. The value associated with label-value pair 4217D is stored in field 251E.

Label-value pair 4217E has the label "default-currency". The value of label-value pair 4217E indicates a default currency in which transactions of customer user 203 will be processed, unless changed by customer user 203. The value of label-value pair 4217E is obtained from customer user 203 during registration process 401 at step 1202 of FIG. 8. The value associated with label-value pair 4217E is stored in field 251F.

Label-value pair 4217F has the label "requested-id". The value of label-value pair 4217F indicates the persona id requested by customer user 203. The value of label-value pair 4217E is obtained from customer user 203 during registration process 401 at step 1202 of FIG. 8. The value associated with label-value pair 4217F is stored in field 251G.

Label-value pair 4217G has the label "email". The value of label-value pair 4217G indicates an email address for customer user 203. The value of label-value pair 4217G is obtained from customer user 203 during registration process 401 at step 1202 of FIG. 8. The value associated with label-value pair 4217G is stored in field 251H.

Label-value pair 4217H has the label "agreements". The value of label-value pair 4217H indicates legal agreements which customer user 203 has accepted in order to use the present invention. Legal agreements are presented to customer user 203 at step 1202 of FIG. 8. The value of label-value pair 4217H is generated when an agreement is accepted by customer user 203 and stored in field 220L of customer instrument persona data structure 220 (FIG. 5C).

Label-value pair 4217I has the label "autoclose-passphrase". The value of label-value pair 4217I indicates an autoclose passphrase for customer user 203. The value of label-value pair 4217I is provided by customer user 203 during registration process 401 at step 1202 of FIG. 8. The value associated with label-value pair 4217I is stored in field 220D of customer persona data structure 220 and field 251I of customer pending data structure 250.

Label-value pair 4217J has the label "pubkey". The value of label-value pair 4217J represents the RSA public key for customer persona 120.1 generated by customer application software 210 during registration process 401 at step 1202A of FIG. 8.

Referring again to FIG. 9, at step 810, the digital signature for message R1, represented by label-value pair 4217K of FIG. 10B, is created. Label-value pair 4217K has the label "signature". The value of label-value pair 4217K represents the digital signature of customer persona 120.1. For message R1, the value of label-value pair 4217K is a hash of the printable U.S. ASCII characters in the the label-value pairs 4213A-4213C, and label-value pairs 4217A-4217J in alphabetical order, encrypted with the RSA private key of customer persona 120.1. The RSA private key of customer persona 120.1 is obtained from field 220H (FIG. 5C.)

At step 812A, label-value pair 4217K, created in step 810, is appended to label-value pairs 4217A–4217J. Label-value pairs 4217A–4217K are encrypted with DES key/IV pair stored in the temporary register at step 802C. At step 812B, the result of step 812A is appended to the RSA-encrypted DES key/IV pair created in step 806.

At step 813, data assembled at step 812B is encoded using well known techniques (preferably base-64), completing assembly of the opaque section contents of message R1.

Message R1 is assembled at steps 814–818. At step 814, header 4205 is created using the message template found at customer message template data structure 270 (FIG. 5A) and a protocol number embedded in customer application software 210.

Next, at step 815, transparent label-value pairs 4213A–4213C as described above are appended.

At step 816, opaque label-value pair 4217 is appended. Label-value pair 4217 has the label "opaque" signifying that the value which follows is encrypted data. The value of label-value pair 4217, shown in FIG. 10A, represents the data which was encoded at step 813.

Trailer 4250 is assembled at step 817. The checksum of trailer 4250 is calculated as described above with respect to sample message 4000. Trailer 4250 is added to message R1. At step 818, a copy of message R1 is saved in field 251J.

The assembly of message R1 is now complete. Message assembly process 800 ends at step 819.

Referring again to FIG. 8, registration process 401 continues at step 1204. There, customer computer 200 transmits message R1 to server computer 100. Customer computer 200 waits for a reply message R2 from server computer 100.

At step 1205, server computer 100 receives message R1 from customer computer 200 and unwraps message R1 by executing server message unwrap procedure 900. Server message unwrap procedure 900 is now described with reference to FIGS. 11A and 11B, where it begins at step 901.

At step 901 A, a copy of message R1 is stored in field 140E (FIG. 4L).

At step 902, server software 110 extracts the protocol number from field 4205C of header 4205 of message R1. Next, based upon the protocol number extracted at step 902, server message data structure 150 (FIG. 4A) is accessed to determine the expected format of message R1. The expected format may include message syntax (e.g., permitted end-of-line characters) and message coding (e.g., ASCII or hex). Message R1 is parsed in accordance with the expected format as follows.

At step 903 server computer 100 calculates a checksum using the same data used by customer computer 200 at step 817 of message assembly procedure 800. At step 904, the checksum calculated at step 903 is compared to the checksum 4250D of trailer 4250 of message R1. If the checksums are not equal, message R1 is discarded at step 904A where server message unwrap procedure 900 also terminates.

If the checksums are equal at step 904, processing continues at step 906A where the message is checked to determine if it is appropriate for message unwrap procedure 900. If a message includes a label "serverkey", message unwrap procedure 900 is appropriate. Messages received by server computer 100 for which unwrap procedure 900 is inappropriate will not contain the "serverkey" label but will instead include a label "type" in the transparent part of the message. Such messages will be unwrapped using other procedures as described later. If a message is inappropriate, processing continues at step 906B where the message is diverted to another unwrap procedure. Message R1 is appropriate; therefore, processing continues at step 906C where the value of opaque label-value pair 4217 is decoded.

At step 907, the RSA public key used by customer computer 200 to encrypt the DES key/IV pair at step 806 of message assembly procedure 800 is determined. To do this, server software 110 obtains the value of label-value pair 4213C associated with the label "serverkey". The value of label-value pair 4213C is a pointer to a field in private key data structure 160 which stores the RSA private key component corresponding to the RSA public key used by customer computer 200 at step 806.

At step 909, the RSA private key determined at step 907 is used to decrypt that portion of opaque label-value pair 4217 corresponding to the RSA-encrypted DES key/IV pair. In this manner, the DES key/IV pair used to encrypt the remainder of opaque label-value pair 4217 is obtained. At step 909A, it is determined whether the decryption of the DES key/IV succeeded or failed. Should the decryption fail for any reason, processing continues at step 905 where we have found it preferable to set an appropriate error flag and server unwrap procedure 900 terminates at step 917. If the decryption of the DES key/IV pair is successful, processing continues at step 910.

At step 910, the DES key/IV pair obtained at step 909 is stored in a temporary register.

At step 911, the DES key/IV pair obtained at step 909 is used to decrypt that portion of opaque label-value pair 4217 revealing to label-value pairs 4217A–4217K of FIG. 10B. At step 912, the decryption of the opaque-value pair 4217 is determined to either succeed or fail. Should the decryption fail for any reason, processing continues at step 905 where we have found it preferable to set an appropriate error flag and server unwrap procedure 900 terminates at step 917. If the decryption of opaque-value pair 4217 is successful, processing continues at step 913.

At step 913, the message type is determined by reference to label-value pair 4217A. For example, the value of label-value pair 4217A for message R1 may be "registration."

We have found it preferable to have three checks of message R1 performed at steps 914, 915 and 916 as follows.

Server form check of step 914 is message type and software version dependent. That is, the expected form of the message, and the criteria that determine whether it is acceptable, depend on the message and any variations of the message that are valid at a given time as determined by reference to message type and version data structure 150 as previously described. At a minimum, the form check procedure will ascertain whether an incoming message contains all the labels that are prescribed for that message, whether there are values for each label that requires a value, and whether the values are of the type, syntax, and value range as required. If a message can be parsed but does not meet a form criteria, server computer 100 will set an error flag at step 905 and return an error code in message R2 (described later). A message which is so malformed that it cannot be parsed by server computer 100 will be discarded. If the form check at step 914 is successful, processing continues at step 915.

At step 915, the digital signature represented by the value of label-value pair 4217K is verified (Pass signature test!). First, server software 110 obtains the RSA public key for customer persona 120.1 from the value of label-value pair 4217J. The RSA public key obtained from label-value pair 4217J is used to decrypt label-value pair 4217K. Next, server software 1 10 accesses message data structure 150 to determine which label-value pairs were hashed at step 810 of message assembly procedure 800 to compute the value of label-value pair 4217K. Server software 110 then hashes the same label-value pairs which were hashed at step 810. The two hash values are compared. If the hash values differ, an appropriate error flag is set at step 905. In this case, server message unwrap procedure 900 terminates at step 917. If the hash values match, processing continues at step 916.

At step 916, a check as to whether customer application software 210 is current is performed as follows. Server software 110 obtains the version number of customer application software 210 used to assemble message R1 from the value of label-value pair 4217C. The obtained value is compared to the latest supported version number of customer application software 210.

Each version has associated with it one of three "status" labels. If the software check returns "current", then the customer application software 210 that constructed message R1 is the latest version of that software available. No flags are set and message unwrap procedure 900 ends at step 917. If the software check returns "warning", the version of customer application software 210 is not the latest but is still deemed usable. A flag is set at step 905 which will cause a warning message to be sent to customer user 203 in message R2 (described below) and message unwrap procedure 900 ends at step 917. If the label associated with customer application software 210 is "fatal", the application software is not usable and an error flag is set at step 905 which will cause an error message to be sent to customer user 203 in message R2 (described below). Message unwrap procedure 900 ends at step 917.

Referring again to FIG. 8, processing continues at step 1206. If any of the tests of steps 909A, 912, 914, 915 or 916 caused an error flag to be set at step 905, error processing procedures are executed by server computer 100 at step 1215. While the level of error processing at step 1215 is largely an administrative decision, it is preferred that a minimum, failures of the checksum, signature, and form, and a "fatal" return on the software check procedure result in a return message containing a code that can be processed by customer application software 210 and a message that can be read by customer user 203. The error processing procedure in step 1215 entails associating a flag with a specific error code (described later in the context of the return message R2) and creating a text message (either from a data structure of messages or a message sent by the system administrator). Server computer 100 then generates a message R2 similar to that described later to customer computer 200 conveying the error code and any related message.

If the tests of steps 909A, 912, 914, 915 and 916 did not cause an error flag to be set at step 905, processing continues at step 1207 where the value of label-value pair 4217F, is compared to the persona id of field 120A for all customer personas 120.1 and field 120AA for all merchant personas 120.2 contained in server persona data structure 120.

At step 1209, if unique, server software 110 creates a new persona 120.1 in server persona data structure 120. Information contained in message R1 is then transferred into the new persona 120.1 as follows: The value of label-value 4217F, and the two-digit check code, is assigned to the persona id of field 120A. The value of label-value pair 4217G, is stored in email address field 120B. The RSA public key of field 120C receives the value of label-value pair 4217J. The value of label-value pair 4217B is assigned to field 120D. The value of label-value pair 4217D is stored in field 120E. The value of label-value pair 4217H is stored in field 120I. The value of label-value pair 4217I is stored in field 120F. In this case, processing continues at step 1217.

If the value of label-value pair 4217F is not unique to server persona data structure 120 at step 1207, processing continues at step 1216.

At step 1216, a suggested persona id is determined by computing a random number and appending it to the requested id without hyphenation. Thus, "Brian" becomes "Brian15". In this case, processing continues at step 1217.

Figure 12:
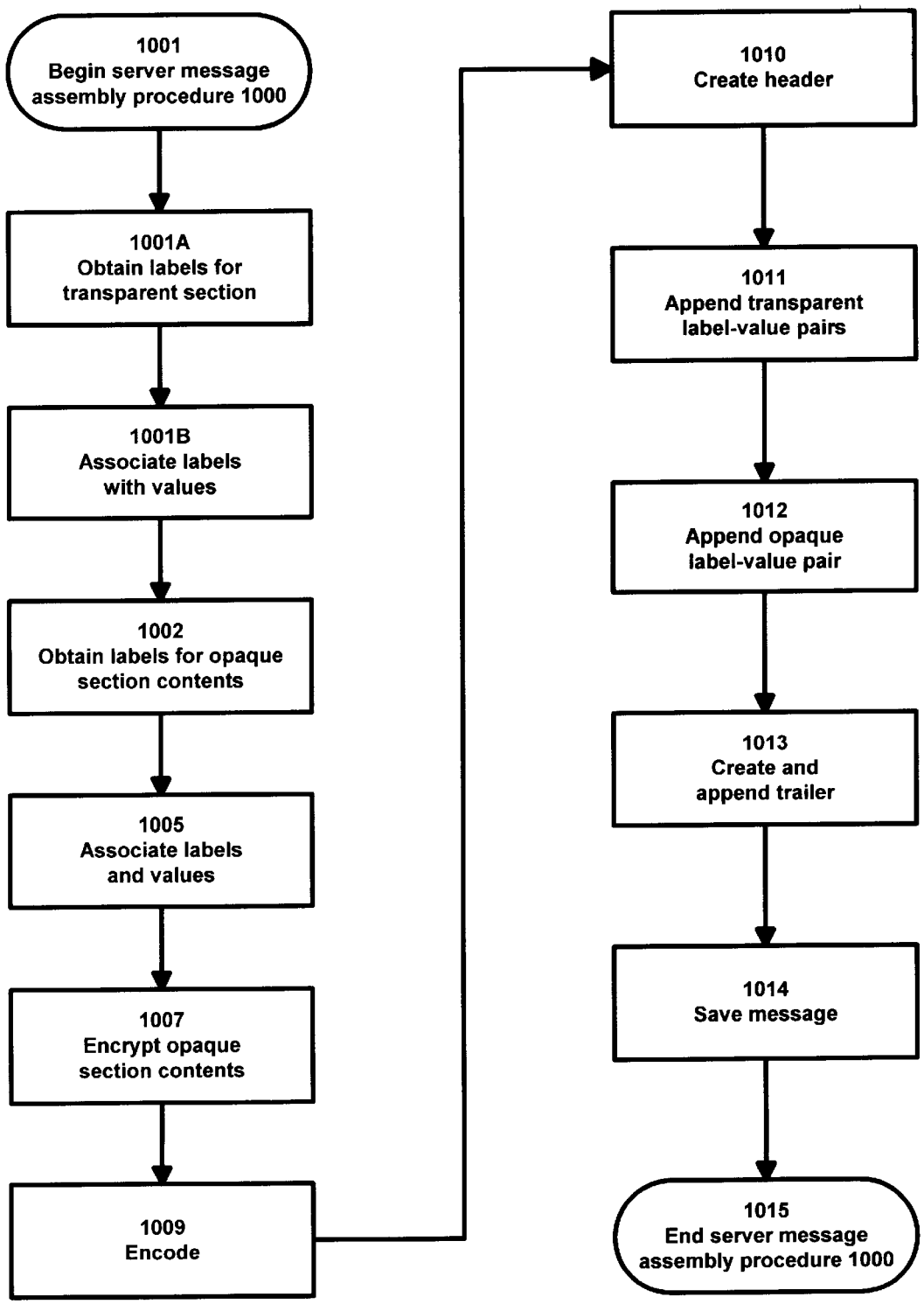
FIG. 12 is a flow diagram illustrating server message assembly procedure 1000.
Figure 14:
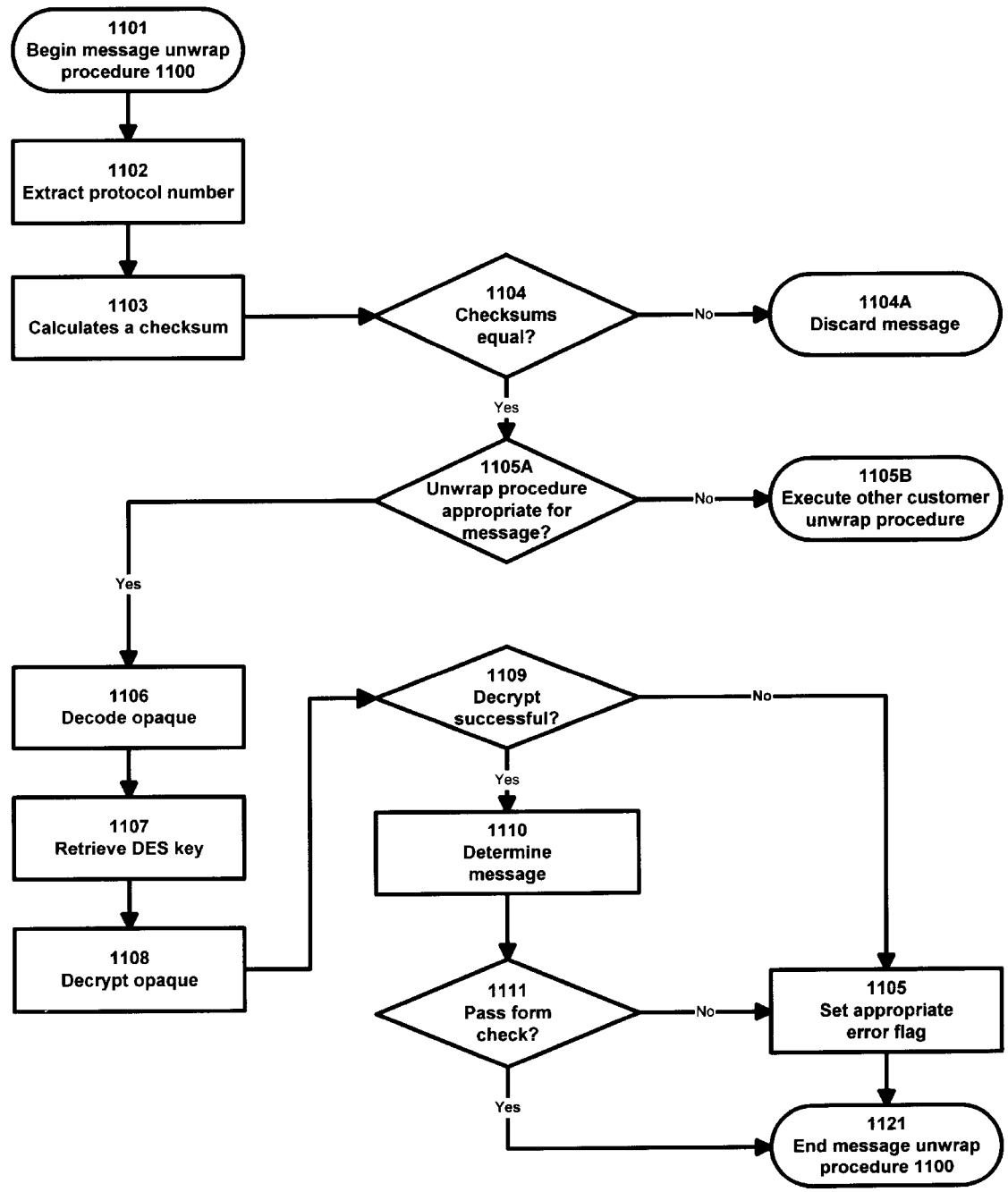
FIG. 14 is a flow diagram illustrating client message unwrap procedure 1100.

At step 1217, server software 110 assembles reply message R2, shown in FIG. 13, according to the flow diagram of FIG. 12. FIG. 12 depicts server message assembly procedure 1000.

Server message assembly procedure 1000 begins at step 1001. Steps 1001A–1001B create transparent label-value pair 4313 of message R2. Steps 1002–1009 create opaque label-value pair 4317 of message R2. Steps 1010–1014 assemble header 4305, transparent label-value pairs 4313A–4313C, opaque label-value pair 4317 and trailer 4350 of message R2.

At step 1002, server software 110 accesses message data structure 150 (FIG. 4A) to obtain a list of labels, which, when matched up with associated values, make up the transparent label-value pairs 4313A–4313B of message R2. At step 1002B, values are associated with each label as follows:

Label-value pair 4313A has the label "transaction". The value of label-value pair 4313A is a transaction number. The value of label-value pair 4313A is the same as that received in message R1 in label-value pair 4213A.

Field 4313B has the label "date". The value of label-value pair 4313B is the same as that received in message R1 in label-value pair 4213B.

Label-value pair 4313C has the label "service-category". The value of label-value pair 4313C is the same as that received in message R1 in label-value pair 4213D.

At step 1002, server software 110 accesses message template data structure 150 to obtain a list of labels which, when matched up with associated values, make up the opaque section contents of message R2, shown in FIG. 13B.

Processing continues at step 1005. There, values are matched up with labels to form label-value pairs 4317A–4317K, of FIG. 13B.

The opaque section contents of message R2 are shown in FIG. 13B where label-value pair 4317A has the label "type". Label-value pair 4317A references a record in message data structure 150 which sets forth the labels of the opaque section contents of message R2. The value of label-value pair 4317A is obtained from server software 110.

Label-value pair 4317B has the label "server-date". The value of label-value pair 4317B indicates the date and time message R2 was assembled according to the clock of server computer 100.

Label-value pair 4317C has the label "requested-id". The value of label-value pair 4317C indicates the persona id requested by customer user 203. The value of label-value pair 4317C was received in label-value pair 4217F in message R1.

Label-value pair 4317D has the label response-id'The value of label-value pair 4317D indicates the persona id of customer user 203, or, if the requested-id in label-value pair 4317C was a duplicate, indicates a suggested persona id.

Label-value pair 4317E has the label "email". The value of label-value pair 4317E indicates an email address for customer user 203. The value of label-value pair 4317E was received in label-value pair 4217G of message R1.

Label-value pair 4317F has the label "response-code". The value of label-value pair 4317F indicates whether registration process 401 was a success or failure.

Label-value pair 4317G has the label "funds-waiting". The value of label-value pair 4317G indicates if there are any messages holding funds waiting for the holder of the email address in label-value pair 4317E. Alternatively, label-value pair could indicate the number of such email messages. Either approach provides a means by which the registrant obtains any such funds preferably requires the registrant to send server computer 100 a message containing a password provided by the sender of the funds.

Label-value pair 4317H has the label "autoclose-passphrase". The value label-value pair 4217H indicates an autoclose passphrase for customer user 203. The value of label-value pair 4317H was received in label-value pair 4217I of message R1.

Label-value pair 4317I has the label "pubkey". The value of label-value pair 4317I shown in FIG. 13B represents the RSA public key of customer persona 120.1 received in label-value pair 4217J of message R1.

Label-value pair 4317J has the label "swseverity" (software severity). The value of label-value pair 4317J indicates whether customer application software 210 needs to be updated, but is still usable ("warning") or is no longer usable ("fatal"). The value of label-value pair 4317J is null if customer application software 210 is current.

Label-value pair 4317K has the label "swmessage" (software message). The value of label-value pair 4317K indicates instructions as to what customer user 203 should do in the case of a "fatal" or "warning" software severity. The value of label-value pair 4317K is only present if the value of label-value pair 4317J is not null.

Label-value pair 4317L has the label "message". The value of label-value pair 4317L is a free text message associated with an error or success condition returned in label-value pair 4317F and displayed to customer user 203.

Referring again to FIG. 12, processing continues at step 1007. There, label-value pairs 4317A–4317L of FIG. 13B are assembled and encrypted with the DES key/IV pair decrypted at step 910.

At step 1009, label-value pairs 4317A–4317L encrypted at step 1007 are encoded using well known techniques (preferably base-64).

Message R2 is assembled at steps 1010–1014. At step 1010, header 4305 is assembled using the message and type data structure 150 and the protocol number from the incoming message R1.

Next, at step 1011, transparent label-value pairs 4313A and 4313B previously described are appended.

At step 1012, opaque label-value pair 4317 is appended. Label-value pair 4317 has the label "opaque" signifying that the value which follows is encrypted data. The value of label-value pair 4317 represents the data encoded at step 1009.

Trailer 4350 is assembled (created) at step 1013. The checksum of trailer 4350 is calculated as described above with respect to sample message 4000. Trailer 4350 is appended to message R2. At step 1014, a copy of the complete message R2 is saved at field 140F of server message log data structure 140.

The assembly of message R2 has now been completed. Message assembly procedure 1000 ends at step 1015.

Referring again to FIG. 8, at step 1218, message R2 is sent (transmitted) from server computer 100 to customer computer 200.

At step 1219, customer computer 200 receives message R2 from server computer 100 and unwraps message R2 by executing message unwrap procedure 1100. Message unwrap procedure 1100 is now described with reference to FIG. 14, where it begins at step 1101.

At step 1102, customer computer software 210 extracts the protocol number from header 4305 of message R2. Next, based upon the extracted protocol number at step 1102, message template data structure 270 (FIG. 5A) is accessed to determine the expected format of message R2. The expected format may include message syntax (e.g., permitted end-of-line characters) and message coding (e.g., ASCII or hex). Message R2 is parsed in accordance with the expected format as follows.

At step 1103, customer computer 200 calculates a checksum using the same data used by server computer 100 at step 1013 of server message assembly procedure 1000. At step 1104, the checksum calculated at step 1103 is compared to the checksum of trailer 4350 of message R2. If the checksums are not equal, message R2 is discarded at step 1104A where message unwrap procedure 1100 terminates.

If the checksums are equal at step 1104, processing continues at step 1105A where the message is checked to determine if it is appropriate for message unwrap procedure 1100. If a message does not include the label "type" in the transparent part of the message, message unwrap procedure 1100 is appropriate. Messages received by customer computer 200 containing the label "type" in the transparent part of the message will be unwrapped using other procedures (described elsewhere) at step 1105B. Here, message R2 is appropriate; therefore, processing continues at step 1106 where the value of opaque label-value pair 4317 is decoded.

At step 1107, the DES key/IV pair stored in temporary register at step 802 of message assembly procedure 800 is retrieved.

At step 1108, the DES key/IV pair retrieved at step 1107 is used to decrypt the value of opaque label-value pair 4317. If for any reason the decryption of opaque label-value pair 4317 is not successful, step 1109 directs the processing of message R2 to step 1105 where an error flag is set. In this case processing of message unwrap procedure 1100 stops at step 1121. If the decryption of label-value pair 4317 is successful, processing continues at step 1110.

At step 1110, the message type is determined by reference to label-value pair 4317A. For example, value of label-value pair 4317A for message R2 may be "registration-response."

A check of message R2 is then performed at step 1111 as follows. Message data structure 270 (FIG. 5A) contains data regarding the form of incoming messages. At a minimum, the form check procedure will ascertain whether an incoming message contains all the labels that are prescribed for that message, whether there are values for each label that requires a value, and whether the values are of the type (e.g., text, signed numbers, ), syntax (e.g., in the form of a valid e-mail address) and within any specified limits as required. If there are additional labels, customer computer 200 will ignore them. If a message cannot be parsed, or if it can be parsed but does not meet a form criteria, an error flag will be set at step 1105.

If the message passes the form check at step 1111, message unwrap procedure 1100 terminates at step 1121.

Referring again to FIG. 8, processing continues at step 1220. There, we have found it preferable to handle error messages as follows:

(1) if an error flag was set at step 1105, the flag will be detected at step 1220 and processing of message R2 will terminate at step 1221. From the perspective of customer user 203, no further action is taken with respect to message R2. In the preferred embodiment of the present invention, we prefer to include a mechanism within customer application software 210 to create and send to server computer 100 a message. This message includes the R2 message as received by customer computer 200 and any diagnosis of what caused the message to fail. No response to this message is sent by server computer 100 to customer computer 200. Rather, the information is used to ascertain whether a problem exists within the system and if appropriate corrective measures need to be taken.

(2) if no error flag was set at step 1105 but an error in message R1 was detected at step 905 or step 1216, processing will continue at step 1222 where the content of label-value 4317F is checked. If the value of label-value 4317F is other than "success", error processing routines are performed at step 1223 causing customer application software 210 to display the message contained in label-value 4317K associated with the content of label-value 4317F and to interpret the value of label-value 4317F and take whatever action may be associated with that value. In particular, if the only error flag set was detected at step 1216 indicating that the requested id was not unique, the id suggested by server computer 100 and returned in label-value pair 4317D is displayed and the registration process is restarted at step 1201; or (3) if message R1 passed the check at step 905 and no flags were set at step 1105 and the id requested by customer user 203 was accepted by server computer 100, processing continues at step 1224 where customer application software 210 updates customer database 202 as follows: The value of label-value 4317D and the two-digit check code is assigned to the customer persona id of field 220A. The value of label-value pair 4317E is stored in the email address of field 220B. The RSA public key of field 220C receives the value created by customer application software 210 and echoed in label-value pair 4317I. In addition, record 261 of customer log data structure 260 is created as follows: The transaction number from label-value pair 4313A is stored in field 261B. The date from label-value pair 4317B is stored in field 261C. The requested id from label-value pair 4317C is stored in field 261H. The response id from label-value pair 4317D is store in field 261I. The email address from label-value pair 4317E is stored in field 261J. The response-code from label-value pair 4317F is stored in field 261F. The software severity code from label-value pair 4317J is stored in field 261D. The software-message from label-value pair 4317K is stored in field 261E. The response message associated with the response code from field 4317L is stored in field 261G.

Processing continues at step 1225 where registration process 401 ends.

C. Instrument Binding Process 403

Figure 15:
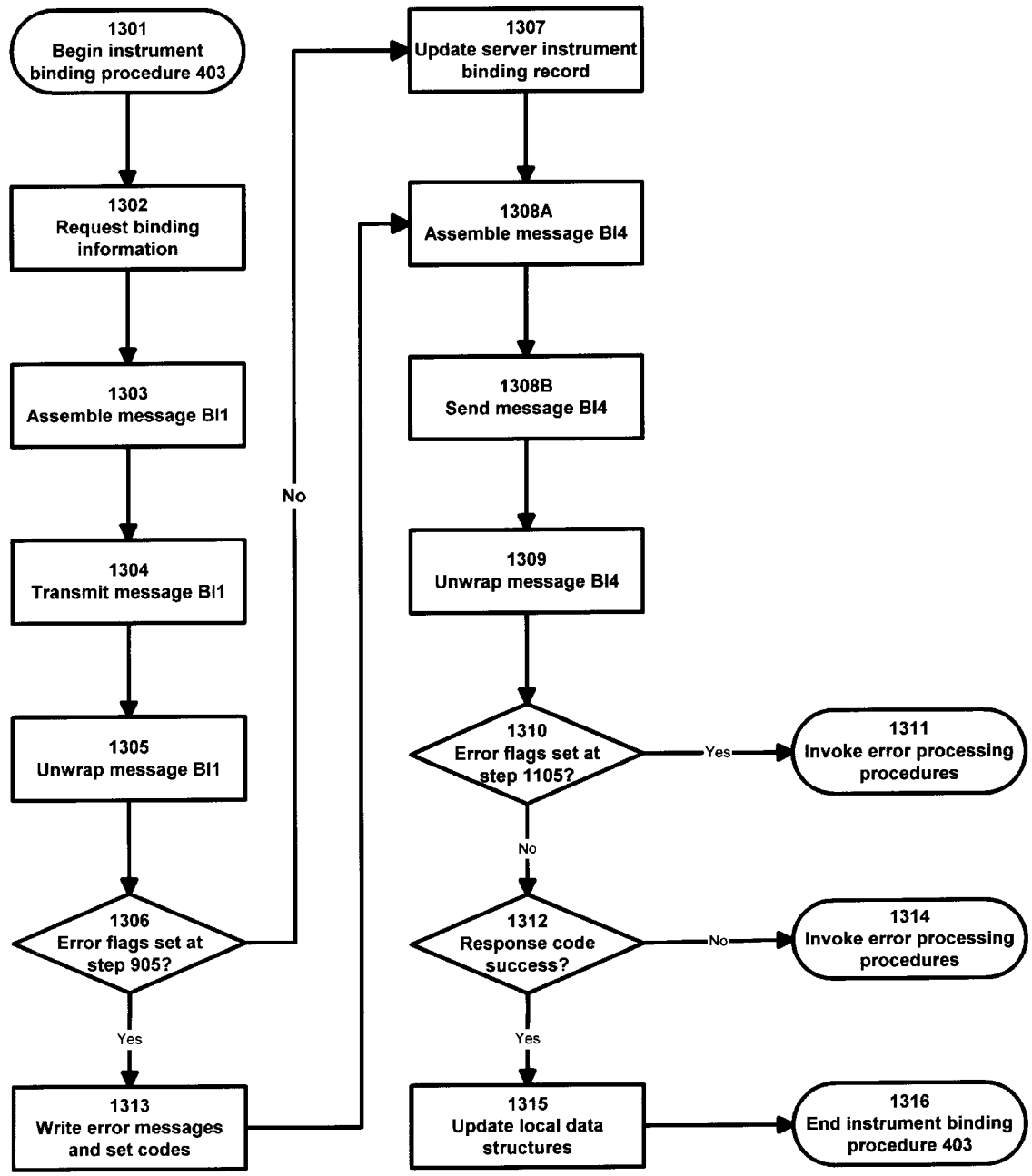
FIG. 15 is a flow diagram illustrating instrument binding process 403.

Instrument binding process 403 is a process by which a customer user 203 binds an instrument to customer persona 120.1. FIG. 15 depicts a flow diagram illustrating instrument binding process 403 which begins at step 1301.

At step 1302, customer application software 210 prompts (request) customer user 203 to enter information relating to an instrument to be bound to customer persona 120.1. This information will be included in message BI1 sent to server computer 100 and will become part of instrument binding data 120H (fields 120H.1–120H.28) for the instrument being bound. In the preferred embodiment, customer user 203 enters the instrument number, the instrument expiration date, the instrument customer identification number, and the name, street address, city, state, postal code, country, country code, and the telephone number (including area code) of the instrument holder. Customer user 203 will also be asked to indicate whether the instrument being bound is the autoclose instrument as previously described. In addition, customer application software 210 will create a random number (referred to as "instrument salt"). Customer user 203 will also be asked for a description of the instrument being bound. This description might be in the form of "Company Credit Card" or "John's Bank Account." For bindings of credit cards, this information is stored in field 252R in customer pending transaction data structure 250. Instrument type, instrument category, and instrument functions are derived by customer application software 210 from the data entered by customer user 203.

While the data acquired at step 1302 is described with reference to a credit card instrument, it is within the knowledge of one skilled in the art to modify the credit card data to accommodate debit cards, DDAs, and other financial instruments.

Message BI1 will be assembled by and transmitted from customer computer 200 server computer 100 to effect instrument binding process 403. The contents of the message BI1 is now described with reference to FIGS. 16A and 16B.

Label-value pair 4413A has the label "id". The value of label-value pair 4413A indicates the persona id for customer user 203. The value of label-value pair 4413A is obtained from field 220A of customer persona data structure 220 (FIG. 5B).

Label-value pair 4413B has the label "transaction". The value of label-value pair 4413B is a transaction number, generated by customer application software 210, which uniquely identifies message BI1. The value associated with label-value pair 4413B is stored in field 252B (FIG. 5H).

Label-value pair 4413C has the label "date". The value of label-value pair 4413B indicates the date and time that message BI1 was assembled and sent to server computer 100, according to the clock of customer computer 200. The value associated with label-value pair 4413C is stored in field 252C of customer pending data structure 250.

Label-value pair 4413D has the label "serverkey". As described later, the DES key/IV pair used by customer computer 200 to encrypt opaque label-value pair 4417 of message BI1 is encrypted using an RSA public key of server computer 100. The value of label-value pair 4413D points to the corresponding RSA private key stored in server private key data structure 160.

Label-value pair 4413E has the label "service-category". The value of label-value pair 4413E is a label which may be used to route message BI1 to a processor within server computer 100 that handles messages of a particular service category.

Label-value pair 4417 has the label "opaque" signifying that the date which follows includes the encrypted opaque section contents of message BI1.

The opaque section contents of message BI1, shown in FIG. 16B, is now described.

Label-value pair 4417A has the label "type". The value of label-value pair 4417A references a record in message data structure 270 (FIG. 5A) which sets forth the labels of the opaque section contents of message BI1. The value of label-value pair 4417A is obtained from customer application software 210 which generates the value when customer user 203 initiates the instrument binding process 403.

Label-value pair 4417B has the label "server-date". Label-value pair 4417B indicates the date and time message BI1 was assembled as measured by customer computer 200's perception of server computer 100's clock.

Label-value pair 4417C has the label "swversion" (software version). The value of label-value pair 4417C indicates the version of customer application software 210 communicating with server computer 100. The value of label-value pair 4417C is obtained from data embedded in customer application software 210. The value associated with label-value pair 4417C is stored in field 252D (FIG. 5H).

Label-value pair 4417D has the label "instrument-number". For security reasons, the actual instrument number is not stored in database 102 of server computer 100. Rather, the instrument number is stored in database 102 as a hash value The hash of the value associated with label-value pair 4417D is stored in field 252F.

Label-value pair 4417E has the label "instrument-type". Label-value pair 4417E indicates a type of instrument, for example, VISA, MasterCard, American Express, etc. The value of label-value pair 4417E is obtained from customer user 203 during instrument binding process 403 at step 1302 or may be derived by customer application software 210 from the instrument number. The value associated with label-value pair 4417E is stored in field 252T.

Label-value pair 4417F has the label "instrument-category". The value of label-value pair 4417F indicates a category of the instrument being bound. Categories may include, for example, credit cards, debit card, DDAs, etc. The value of label-value pair 4417F is derived by customer application software during instrument binding process 403 at step 1302.

Label-value pair 4417I has the label "instrument-functions" and preferably may have any combination of the following values: "charge", "credit", "load" or "unload". The value of label-value pair 4417I indicates one or more functions that may be performed by customer user 203 with the instrument being bound. A charge transaction occurs when a persona 120.1 uses a bound instrument as a credit card to pay for a product. A credit transaction is an operation where a merchant credits customer persona 120.1 in lieu of providing the product originally agreed upon. The load and unload transaction are the same as those described previously. The function(s) of label-value pair 4417I are derived by customer application software 210 during instrument binding process 403 at step 1302.

Label-value pair 4417J has the label "instrument-salt". The value of label-value pair 4417J indicates a cryptographic salt used to reduce the ease by which the value of label-value pair 4417D (relating to the instrument number) can be determined. The value of label-value pair 4417J is generated by customer application software 210 during instrument binding process 403 at step 1302. The value associated with label-value pair 4417J is stored in field 252U (FIG. 5H).

Label-value pair 4417K has the label "instrument-expiration-date". The value of label-value pair 4417H indicates the expiration date of the instrument being bound. The value of label-value pair 4417K is obtained from customer user 203 during instrument binding process 403 at step 1302. The value associated with label-value pair 4417K is stored in field 252I.

Label-value pair 4417L has the label "instrument-name". The value of label-value pair 4417L indicates the name of the holder of the instrument being bound. The value of label-value pair 4417L is obtained from customer user 203 during instrument binding process 403 at step 1302. The value associated with label-value pair 4417L is stored in field 252H.

Label-value pair 4417M has the label "instrument-address". The value of label-value pair 4417K indicates the street address of the holder of the instrument being bound. The value of label-value pair 4417M is obtained from customer user 203 during instrument binding process 403 at step 1302.

Label-value pair 4417N has the label "instrument-city". The value of label-value pair 4417N indicates the city of the holder of the instrument being bound. The value of label-value pair 4417N is obtained from customer user 203 during instrument binding process 403 at step 1302.

Label-value pair 4417O has the label "instrument-state". The value of label-value pair 4417O indicates the state of the holder of the instrument being bound. The value of label-value pair 4417O is obtained from customer user 203 during instrument binding process 403 at step 1302.

Label-value pair 4417P has the label "instrument-postal-code". Label-value pair 4417P indicates the postal code of the holder of the instrument being bound. The value of label-value pair 4417P is obtained from customer user 203 during instrument binding process 403 at step 1302.

Label-value pair 4417Q has the label "instrument-country". The value of label-value pair 4417Q indicates the country of the holder of the instrument being bound. The value of label-value pair 4417Q is obtained from customer user 203 during instrument binding process 403 at step 1302.

The value associated with label-value pairs 4417K–4417Q are stored in fields 252H–252N (FIG. 5H).

Label-value pair 4417R has the label "agreements". Label-value pair 4417R indicates which legal agreements customer user 203 has accepted in order to use the present invention. The value of label-value pair 4417R is generated from agreement accepted by customer user 203 and stored in field 230S (FIG. 5D).

Label-value pair 4417S has the label "autoclose" and may have the value "yes" or "no". The value of label-value pair 4417S indicates whether the instrument being bound will be the autoclose instrument for customer user 203. The value of label-value pair 4417S is obtained from customer user 203 during instrument binding process 403 at step 1302.

Label-value pair 4417T has the label "autoclose-passphrase". The value of label-value pair 4417T indicates the passphrase (preferably six to fifty characters) which, when used, will close customer persona 120.1. Label-value pair 4417T is present only if the value of label-value pair 4417T is "yes". The value of label-value pair 4417T is provided by customer user 203 during registration process 401.

Label-value pair 4417U has the label "key". The value of label-value pair 4417U represents a hash of the modulus part of the RSA public/private key pair for customer persona 120.1. The value of label-value pair 4417U permits server computer 100 to confirm that the RSA public key maintained in field 120B (FIG. 4B) is the same key used to sign message BI1 (label-value pair 4417V).

The digital signature of message BI1, represented by label-value pair 4417V, has the label "signature". The value of label-value pair 4417V represents the digital signature of customer persona 120.1. For message BI1, the value of label-value pair 4417V is preferably a hash of label-value pairs 4413A–4413D, and label-value pairs 4417A–4417U in alphabetical order, encrypted with the RSA private key of customer persona 120.1. The RSA private key of customer persona 120.1 is obtained from field 220H (FIG. 5C).

Referring again to FIG. 15, at step 1303, message BI1 is assembled in accordance with message assembly procedure 800, depicted in FIG. 9. Message assembly procedure 800 was described previously for the assembly of registration message R1, with the following modification noted for message BI1: A copy of message BI1 is preferably saved in field 252W (FIG. 5H) instrument binding process 403 continues at step 1304. There, customer computer 200 transmits message BI1 to server computer 100. Customer computer 200 waits for reply message BI4 from server computer 100.

At step 1305, server computer 100 receives message BI1 from customer computer 200 and unwraps message BI1 by executing server message unwrap procedure 900 (steps 901–917). Server message unwrap procedure 900 (steps 901–917) was previously described with reference to FIG. 11 for message R1.

At step 1306, if any of the tests of steps 909A, 912, 914, 915 or 916 caused an error flag to be set at step 905, error processing procedures are executed by server computer 100 at step 1313.

While the level of error processing at step 1313 is largely an administrative decision, it is preferred that a minimum, failures of the checksum, signature, and form, and a "fatal" return on the software check procedure result in a return message containing a code that can be processed by customer application software 210 and a message that can be read by customer user 203. The error processing procedure in step 1313 entails associating a flag with a specific error code (described in the context of the return message BI4 below) and creating a text message (either from a data structure of messages or a message sent by the system administrator). Server computer 100 then sends a message BI4 similar to that described later to customer computer 200 conveying the error code and any related message.

If the tests of steps 909A, 912, 914, 915 and 916 did not cause an error flag to be set at step 905, processing continues at step 1307. There, information contained in message BI1 is transferred into the instrument binding data 120H (fields 120H.1–120H.28) (FIG. 4D) as follows: The value of label-value pair 4413A is stored in the persona id of field 120H.1. The value of label-value pair 4417A is stored in the instrument type of field 120H.2. The value of label-value pair 4417B is stored in the instrument bind date of field 120H.13. If the instrument being bound is selected by customer user 203 as the autoclose instrument, the value of label-value pair 4417D is stored in the instrument number of field 120H.4. It is preferred that this value be encrypted using an RSA key known only to the system operator. If the instrument being bound is not the autoclose instrument of the persona, the value of label-value pair 4417D is not stored at server data structure 102 but is hashed along with the value in label-value pair 4417J and stored in the instrument hash of field 120H.9 The value of label-value pair 4417E is stored in the instrument sub type of field 120H.3. The value of label-value pair 4417F is stored in the instrument type of field 120H.2. The value of label-value pair 4417R is stored in the legal agreements of field 120H.7. The value of label-value pair 4417S is stored in the autoclose binding of field 120F.

After step 1307, message BI4 will be assembled by and transmitted from server computer 100 to customer computer 200 to complete instrument binding process 403. The contents of the message BI4 is now described with reference to FIGS. 17A and 17B.

Label-value pair 44.113A has the label "id". The value of label-value pair 44.113A indicates the persona id for customer user 203. The value of label-value pair 44.113A is the same as that received in message BI1 in label-value pair 4413A.

Label-value pair 44.113B has the label "transaction". The value of label-value pair 44.113B is a transaction number. The value of label-value pair 44.113B is the same as that received in message BI1 in label-value pair 4413B.

Field 44.113C has the label "date". The value of label-value pair 44.113C is the same as that received in message BI1 in label-value pair 4413C.

Label-value pair 44.113D has the label "service-category". The value of label-value pair 44.113D is the same as that received in message BI1 in label-value pair 4413E.

The opaque section contents of message BI4, shown in FIG. 17B, is now described.

Label-value pair 44.117A has the label "type". The value of label-value pair 44.117A references a record in message data structure 270 (FIG. 5A) which sets forth labels of the opaque section contents of message BI4. The value of label-value pair 44.117A is obtained from server software 110.

Label-value pair 44.117B has the label "server-date". The value of label-value pair 44.117B indicates the date and time message BI4 was assembled according to the clock of server computer 100.

Label-value pair 44.117C has the label "response-code" and preferably the value "success" or "failure". The value of label-value pair 44.117C indicates whether instrument binding process 403 was a success or failure.

Label-value pair 44.117D has the label "swseverity" (software severity) and preferably the value "fatal" or "warning". The value of label-value pair 44.117D indicates whether customer application software 210 needs to be updated, but is still usable ("warning") or is no longer usable ("fatal"). The value of label-value pair 44.117D is null if customer application software 210 is current.

Label-value pair 44.117E has the label "swmessage" (software message). The value of label-value pair 44.117E provides instructions as to what customer user 203 should do in the case of a "fatal" or "warning" software severity. The value of label-value pair 44.117E is only present if the value of label-value pair 44.117D is not null.

Label-value pair 44.117F has the label "instrument-number". The value of label-value pair 44.117F indicates the number of the instrument being bound as described above. The value of label-value pair 44.117F is obtained from label-value pair 4417D of message BI1.

Label-value pair 44.117G has the label "instrument-type". The value of label-value pair 44.117G indicates a type of instrument. The value of label-value pair 44.117G is obtained from label-value pair 4417E of message BI1.

Label-value pair 44.117H has the label "instrument-salt". The value of label-value pair 44.117H from label-value pair 4417J of message BI1.

Label-value pair 44.117J has the label "instrument-functions" and may have any combination of the following values: "sale", "credit", "load" or "unload" as previously described. Label-value pair 44.117J indicates one or more functions that may be performed by customer user 203 with the instrument being bound. The value of label-value pair 44.117J is obtained from label-value pair 4417I of message BI1.

Label-value pair 44.117K has the label "instrument*" and represents any number of label-value pairs whose labels start with "instrument" that are provided to customer user 203 in message BI4 (as previously described) and returned to server computer 100 in message LU1 when the instrument is used to load or unload funds. In this way, server computer 100 may receive information regarding the instrument when necessary without storing that information in its data structures. The particular data-value pairs that are contained in label-value pair 44.117K depend on the type of the bound instrument and the requirements of the issuer of the instrument. For example, a credit card might require the card number, the card expiration date, and the name and address of the card holder to be returned to the server each time the card is used to load funds into person 120.1.

Label-value pair 44.117L has the label "message". The value of label-value pair 44.117L is a free text message associated with an error or success condition returned in label-value pair 44.117C and displayed to customer user 203. The value of label-value pair 44.117L may include a message indicating a bad digital signature or an ill formed registration message BI1I and instructions as to how customer user 203 should proceed (e.g., "call system administrator").

Referring again to FIG. 15, at step 1308A, message BI4 is assembled in accordance with server message assembly procedure 1000, depicted in FIG. 12. Server message assembly procedure 1000 was described previously for the assembly of registration message R2. At step 1308B, message BI4 is sent to sever computer 100.

At step 1309, customer computer 200 receives message BI4 from server computer 100 and unwraps message BI4 by executing message unwrap procedure 1100 (step 1101–1121). Message unwrap procedure 1100 was previously described with reference to FIG. 14 for message R2.

At step 1310, (1) if an error flag was set at step 1105, the flag will be detected at step 1310 and processing of message BI4 will terminate at step 1311. From the perspective of customer user 203, no further action is taken with respect to message BI4. In the present invention, a mechanism is provided within customer application software 210 to create and send to server computer 100 a message. This message includes the BI4 message as received by customer computer 200 and any diagnosis of what caused the message to fail. No response to this message is sent by server computer 100 to customer computer 200. Rather, the information is used to ascertain whether a problem exists within the system and if appropriate corrective measures need to be taken.

(2) if no error flag was set at step 1105 but an error in message BI1 was detected at step 905, processing will continue at step 1312 where the content of label-value 44.117C is checked. If the value of label-value 44.117C is other than "success", error processing routines are performed at step 1314 causing customer application software 210 to display the message contained in label-value 44.117L associated with the content of label-value 44.117C and the interpret the value of label-value 44.117C and take whatever action may be associated with that value; or (3) if message BI1 passed the check at step 905 and no error flags were set at step 1105, processing continues at step 1315 where customer application software 210 updates customer database 202 as follows: The instrument number from label-value pair 44.117F is stored in field 230A (FIG. 5D). The content of label-value pair 44.117J is used to set flags in fields 230L–230O. The result code contained in label-value pair 44.117C is saved in field 230P. The content of label-value pair 44.117K is stored in field 230R. In addition, a new record 262 (FIG. 5O) of customer log data structure 260 is created as follows: The transaction number from label-value pair 44.113B is stored in field 262B. The date from label-value pair 44.117B is stored in field 262C. The response-code from label-value pair 44.117C is stored in field 262F. The software severity code from label-value pair 44.117D is stored in field 262D. The software-message from label-value pair 44.117E is stored in field 262E. The instrument-number from label-value pair 44.117F is stored in field 262I. The instrument-type from label-value pair 44.117G is stored in field 262J. The response message associated with the response code from field 44.117L is stored in field 262G.

Processing continues at step 1316 where instrument binding process 403 ends.

D. Load/Unload Funds Process 405

Figure 18:
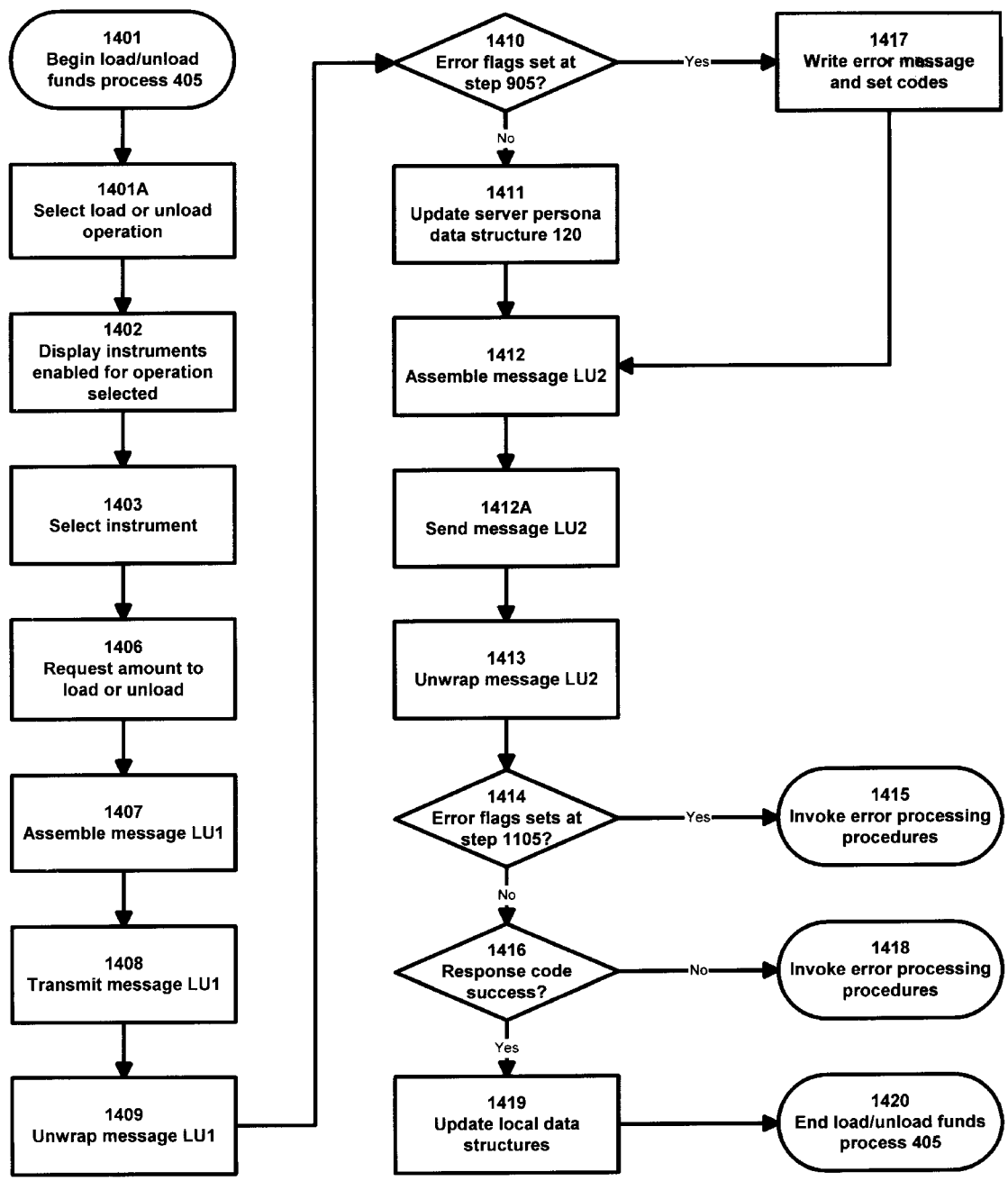
FIG. 18 is a flow diagram illustrating the load/unload funds process 405.

FIG. 18 depicts a flow diagram illustrating load/unload process 405 which begins at step 1401.

At step 1401A, customer user 203 selects whether customer user 203 desires to load or unload (operation) funds. For the purposes of this description, it is assumed that customer user 203 selects to load funds. Unloading funds follows the same process with the exception that funds to be unloaded are specified as a negative quantity.

At step 1402, customer application software 210 accesses field 230O of record 230.1 for all instruments bound to persona 120.1 and displays a list of all instruments enabled for load operations. At step 1403, customer user 203 is prompted select an instrument from the displayed list from which to load funds into cash container represented by cash container data field 120G and 220I.

At step 1406, customer user 203 is prompted (requested) to enter an amount of funds in a specified currency to load from the instrument selected at step 1402 into cash container 120G.

Message LU1 will be assembled by and transmitted from customer computer 200 to server computer 100 to effect load/unload funds process 405. The contents of the message LU1 is now described with reference to FIGS. 19A and 19B.

Label-value pair 4513A has the label "id". Label-value pair 4513A indicates the persona id for customer user 203. The value of label-value pair 4513A is obtained from field 220A (FIG. 5C). The value associated with label-value pair 4513A is stored in field 255E (FIG. 5K).

Label-value pair 4513B has the label "transaction". The value of label-value pair 4513B is a transaction number, generated by customer application software 210, which uniquely identifies message LU1. The value of label-value pair 4513B allows server computer 100, upon receipt of message LU1, (1) to send an associated reply message LU2, described later, and (2) to determine if message LU1 is a duplicate message (i.e., already received by server computer 100). The value associated with label-value pair 4513B is stored in field 255B.

Label-value pair 4513C has the label "date". The value of label-value pair 4513C indicates the date and time that message LU1 was assembled and sent to server computer 100, according to the clock of customer computer 200. The value associated with label-value pair 4513C is stored in field 255E.

Label-value pair 4513D has the label "serverkey". As described below, the DES key/IV pair used by customer computer 200 to encrypt the opaque label-value pair 4517 of message LU1 is encrypted using an RSA public key of server computer 100. The value of label-value pair 4513D points to the corresponding RSA private key stored in server private key data structure 160.

Label-value pair 4513E has the label "service-category". The value of label-value pair 4513E is a label which may be used to route message LU1 to a processor within server computer 100 that handles messages of a particular service category.

Label-value pair 4517 has the label "opaque" signifying that the data which follows includes the encrypted opaque section contents of message LU1. The opaque section contents of message LU1, shown in FIG. 19B, is now described.

Label-value pair 4517A has the label "type". The value of label-value pair 4517A references a record in message data structure 150 (FIG. 4A) which sets forth the labels of the opaque section contents of message LU1. The value of label-value pair 4517A is obtained from customer application software 210 which generates the label when customer user 203 initiates the load/unload process 405.

Label-value pair 4517B has the label "server-date". The value of label-value pair 4517B indicates the date and time message LU1 was assembled as measured by customer computer 200's perception of server computer 100's clock.

Label-value pair 4517C has the label "swversion" (software version). The value of label-value pair 4517C indicates the version of customer application software 210 communicating with server computer 100. The value of label-value pair 4517C is obtained from data embedded in customer application software 210. The value associated with label-value pair 4517C is stored in field 255D (FIG. 5K).

Label-value pair 4517D has the label "amount". The value of label-value pair 4517D represents the currency type and the amount of funds to be transferred from the bound instrument selected at step 1402 to the cash container 120G for customer user 203. For unload operations, the amount of funds is a negative quantity. Thus, for unloads, the value of label-value pair 4517D represents the currency type and the amount of funds to be transferred from cash container 120G to the bound instrument selected at step 1402. The value associated with label-value pair 4517D is stored in field 255G.

Label-value pair 4517E has the label "instrument" and represents all of the label-value pairs returned by server computer 100 in message BI4 in label-value pair 44.117K (FIG. 17A) whose labels start with "instrument". The value of label-value pair 4517E is unique to the instrument from which the load operation is to be performed and identifies that instrument to server computer 100.

Label-value pair 4517F has the label "key". The value of label-value pair 4517K represents a hash of the modulus part of the RSA public/private key pair used by customer persona 120.1. The value of label-value pair 4517F permits server computer 100 to confirm that the RSA public key maintained in field 120B (FIG. 4B) is the same key used to sign message LU1 (label-value pair 4517F).

Referring again to FIG. 18, at step 1407, message LU1 is assembled in accordance with message assembly procedure 800 (FIG. 9). Message assembly procedure 800 was described previously for the assembly of registration message R1, with the following modification noted for message LU1. A copy of message LU1 is preferably saved in field 140E (FIG. 4L).

Load/unload process 405 continues at step 1408. There, customer computer 200 transmits message LU1 to server computer 100. Customer computer 200 waits for a reply message LU2 from server computer 100.

At step 1409, server computer 100 receives message LU1 from customer computer 200 and unwraps message LU1 by executing server message unwrap procedure 900 (steps 901–917). Server message unwrap procedure 900 was previously described with reference to FIG. 11 for message R1.

Referring again to FIGS. 11A and 11B, processing continues at step 1410, if any of the tests of steps 909A, 912, 914, 915 or 916 caused an error flag to be set at step 905, error processing procedures are executed by server computer 100 at step 1417. While the level of error processing at step 1417 is largely an administrative decision, it is preferred that a minimum, failures of the checksum, signature, and form, and a "fatal" return on the software check procedure result in a return message containing a code that can be processed by customer application software 210 and a message that can be read by customer user 203. The error processing procedure in step 1417 entails associating a flag with a specific error code (described in the context of the return message LU2 below) and creating a text message (either from a data structure of messages or a message sent by the system administrator). Server computer 100 then generates a message LU2 similar to that described below to customer computer 200 conveying the error code and any related message.

If the tests of steps 909A, 912, 914, 915 and 916 did not cause an error flag to be set at step 905, processing continues at step 1411. There, information contained in message LU1, that is, the amount represented by label-value pair 4517D, is updated to the amount in the cash container of field 120G.2 of persona 120.1 for customer user 203 in server persona data structure 120. At this point, server computer 100 will cause funds from the instrument referenced in the message LU1 to be transferred the agency account identified in cash container field 120G.4. Funds requested in message LU1 may be placed "on-hold" in such a way that they are not available until some additional conditions have been met, such as twenty-four hours having elapsed.

After step 1411, message LU2 will be assembled by and transmitted from server computer 100 to customer computer 200 to complete load/unload funds process 405. The contents of the message LU2 is now described with reference to FIGS. 20A and 20B.

Label-value pair 45.113A has the label "id". The value of label-value pair 45.113A indicates the persona id for customer user 203. The value of label-value pair 45.113A is the same as that received in message LU1 in label-value pair 4513A.

Label-value pair 45.113B has the label "transaction". The value of label-value pair 45.113B is a transaction number. The value of label-value pair 45.113B is the same as that received in message LU1 in label-value pair 4513B.

Label-value pair 45.113C has the label "date". The value of label-value pair 45.113C is the same as that received in message LU1 in label-value pair 4513C.

Label-value pair 45.113D has the label "service-category". The value of label-value pair 45.113D is the same as that received in message LU1 in label-value pair 4513E.

The opaque section contents of the reply message LU2, shown in FIG. 20B, is as follows:

Label-value pair 45.117A has the label "type". Label-value of label-value pair 45.117A references a record in message data structure 270 (FIG. 5A) which sets forth the labels of the opaque section contents of message LU2. The value of label-value pair 45.117A is obtained from server software 110.

Label-value pair 45.117B has the label "server-date". Label-value pair 45.117B indicates the date and time message LU2 was assembled according to the clock of server computer 100.

Label-value pair 45.117C has the label "amount". The value of label-value pair 45.117C is the amount transferred from the bound instrument identified by label-value pair 4517E to cash container field 120G.2 for customer user 203.

Label-value pair 45.117D has the label "response-code" and the value "success" or "failure" as previously described. Label-value pair 45.117D indicates whether load/unload process 405 was a success or failure.

Label-value pair 45.117E has the label "message". The value of label-value pair 45.117E is a free text message explaining the "response-code" value of label-value pair 45.117D.

Label-value pair 45.117F has the label "swseverity" (software severity) and the value "fatal" or "warning". The value of label-value pair 45.117F indicates whether customer application software 210 needs to be updated, but is still usable ("warning") or is no longer usable ("fatal"). The value of label-value pair 45.117F is null if customer application software 210 is current.

Label-value pair 45.117G has the label "swmessage" (software message). The value of label-value pair 45.117G indicates instructions as to what customer user 203 should do in the case of a "fatal" or "warning" software severity. The value of label-value pair 45.117G is only present if the value of label-value pair 45.117D is not null.

Label-value pair 45.117H has the label "fee". The value of label-value pair 45.117H indicates a fee charged to customer user 203, if any, associated with server computer 100 processing message LU1. The fee, if any, will be deducted from cash container field 120G.2.

Label-value pair 45.117I has the label "balance". The value of label-value pair 45.117I indicates the available balance in cash container field 120G.2 for customer user 203. This balance reflects the previous balance of the cash container adjusted by the amount value of label-value pair 45.117C loaded via message LU1 and the fee value of label-value pair 45.117H.

Label-value pair 45.117J has the label "session-funds". The value of label-value pair 45.117J indicates the amount transferred from cash container field 120G.2 to the opening amount field 130E of server session data structure 130 for all open sessions.

Label-value pair 45.117K has the label "on-hold". The value of label-value pair 45.117K is obtained from cash container field 120G.3 and indicates the amount of funds pending transfer from the bound instrument identified by label-value pair 4517E of message LU1 to cash container field 120G.2 for customer user 203. This value represents funds which are awaiting approval or processing by the issuer of the instrument from which funds are being loaded or to which funds are being unloaded.

At step 1412 of FIG. 18, server software 110 assembles reply message LU2 according to the flow diagram of FIG. 12. Server message assembly procedure 1000 was described previously for the assembly of registration message R2.

Referring again to FIG. 14 message LU2 is sent from server computer 100 to customer computer 200 at step 1412A.

At step 1413, customer computer 200 receives message LU2 from server computer 100 and unwraps message LU2 by executing message unwrap procedure 1100 (steps 1101–1121). Message unwrap procedure 1100 was described previously with reference to FIG. 14 for message R2.

At step 1414, (1) if an error flag was set at step 1105, the flag will be detected at step 1414 and processing of message LU2 will terminate at step 1415. From the perspective of customer user 203, no further action is taken with respect to message LU2. In the present invention, a mechanism is provided within customer application software 210 to create and send to server computer 100 a message. This message includes the LU2 message as received by customer computer 200 and any diagnosis of what caused the message to fail. No response to this message is sent by server computer 100 to customer computer 200. Rather, the information is used to ascertain whether a problem exists within the system and if appropriate corrective measures need to be taken.

(2) if no error flag was set at step 1105 but an error in message LU1 was detected at step 905, processing will continue at step 1416 where the content of label-value 45.117D is checked. If the value of label-value 45.117D is other than "success", error processing routines are performed at step 1418 causing customer application software 210 to display the message contained in label-value 45.117E associated with the content of label-value 45.117D and to interpret the value of label-value 45.117D and take whatever action may be associated with that value; or (3) if message LU1 passed the check at step 905 and no flags were set at step 1105, processing continues at step 1419 where customer application software 210 updates customer database 202 by storing the content of cash container field 220J of customer persona data structure 220.

In addition, a new record 264 of customer log data structure 260 is created as follows: The persona id from label-value pair 45.113A is stored in field 264H. The transaction number from label-value pair 45.113B is stored in field 264B. The date from label-value pair 45.117B is stored in field 264C. The amount from label-value pair 45.117C is stored in field 264J. The response-code from label-value pair 45.117D is stored in field 264F. The response message associated with the response code from field 45.117E is stored in field 264G. The software severity code from label-value pair 45.117F is stored in field 264D. The software-message from label-value pair 45.117G is stored in field 264E. The fee from label-value pair 45.117H is stored in field 264K. The balance from label-value pair 45.117I is stored in field 264L.

Processing continues at step 1420 where load/unload process 405 ends.

E. Open Session Process 407

Figure 21:
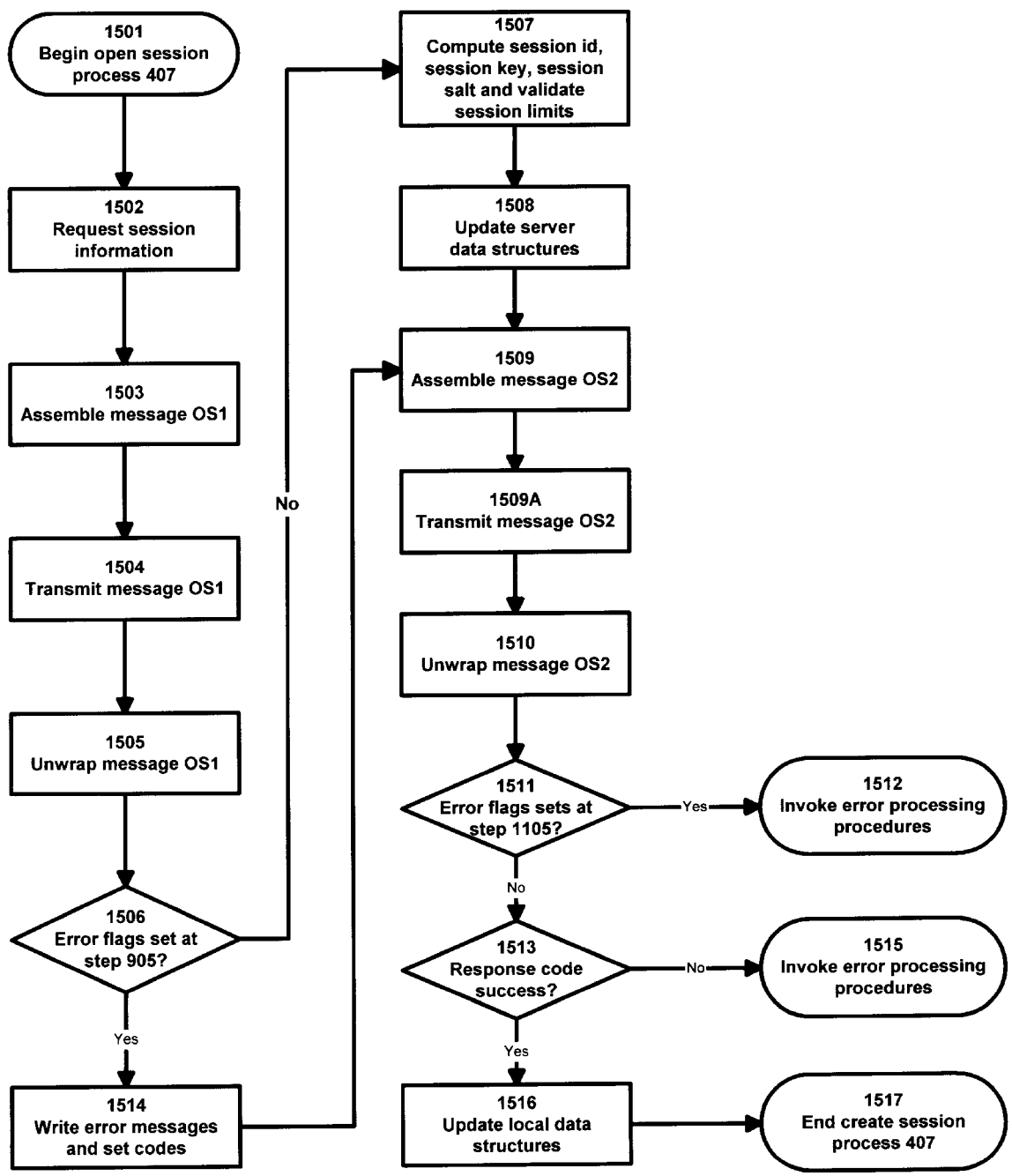
FIG. 21 is a flow diagram illustrating open session process 407.

FIG. 21 depicts a flow diagram illustrating open session process 407 which begins at step 1501.

At step 1502, customer application software 210 prompts (requests) customer user 203 to enter information relating to the session to be created. This information will be included in message OS1 sent to server computer 100 and will become part of session data structure 130 (FIG. 4H). In the preferred embodiment, customer user 203 enters the maximum length of time the session will last, the maximum number of transactions which may occur during the session and the amount and currency of electronic cash available to customer user 203 during the session. Customer user 203 may also enter an optional description of the session.

Message OS1 will be assembled by and transmitted from customer computer 200 to server computer 100 to effect open session process 407. The content of message OS1 is now described with reference to FIGS. 22A and 22B.

Label-value pair 4613A has the label "id". The value of label-value pair 4613A indicates the persona id for customer user 203. The value of label-value pair 4613A is obtained from field 220A (FIG. 5C).

Label-value pair 4613B has the label "transaction". The value of label-value pair 4613B is a transaction number, generated by customer application software 210, which uniquely identifies message OS1. The value of label-value pair 4613B allows server computer 100, upon receipt of message OS1, (1) to send an associated reply message OS2, described below, and (2) to determine if message OS1 is a duplicate message (i.e., already received by server computer 100). The value associated with label-value pair 4613B is stored in field 256B (FIG. 5L).

Label-value pair 4613C has the label "date". The value of label-value pair 4613B indicates the date and time that message OS1 was assembled and sent to server computer 100, according to the clock of customer computer 200. The value associated with label-value pair 4613C is stored in field 256C.

Label-value pair 4613D has the label "serverkey". As described below, the DES key/IV pair used by customer computer 200 to encrypt the opaque label-value pair 4617 of message OS1 is encrypted using an RSA public key of server computer 100. Label-value pair 4613D points the corresponding RSA private key stored in server private key data structure 160.

Label-value pair 4613E has the label "service-category". The value of label-value pair 4613E is a label which may be used to route message OS1 to a processor within server computer 100 that handles messages of a particular service category.

Label-value pair 4617 has the label "opaque". The value of label-value pair 4617 includes the opaque section contents (in encrypted form) of message OS1. We now describe the opaque section contents of message OS1, shown in FIG. 22B.

Label-value pair 4617A has the label "type". The value of label-value pair 4617A references a record in message data structure 150 which sets forth the labels of the opaque section contents message OS1. The value of label-value pair 4617A is obtained from customer application software 210 which generates the label when customer user 203 initiates the open session process 407.

Label-value pair 4617B has the label "server-date". The value of label-value pair 4617B indicates the date and time message OS1 was assembled as measured by customer computer 200's perception of server computer 100's clock.

Label-value pair 4617C has the label "swversion" (software version). The value of label-value pair 4617C indicates the version of customer application software 210 communicating with server computer 100. The value of label-value pair 4617C is obtained from data embedded in customer application software 210. The value associated with label-value pair 4617C is stored in field 256D.

Label-value pair 4617D has the label "record-note". The value of label-value pair 4617D is an optional short text note to be stored in field 130M (FIG. 4H). For example, the note may state "Christmas Shopping" or "ski equipment". The value of label-value pair 4617D is obtained from customer user 203's response to a prompt from customer application software 210 and is preferably limited to sixty characters to simplify the display produced by customer application software 210.

Label-value pair 4617E has the label "amount" and the value entered at step 1502 indicating the maximum amount of electronic cash available to customer user 203 during the session. The value associated with label-value pair 4617E is stored in field 256F.

Label-value pair 4617F has the label "key-lifetime" and the value entered at step 502 indicating the maximum length of time the session will last as requested by customer user 203. The value associated with label-value pair 4617F is stored in field 256H.

Label-value pair 4617G has the label "key-use-limit" and the value entered at step 1502 indicating the maximum number of transactions which may occur during the session as requested by customer user 203. The value associated with label-value pair 4617G is stored in field 256G.

Label-value pair 4617H has the label "key". The value of label-value pair 4617H represents a hash of the modulus of the RSA public/private key pair of customer persona 120.1. The value of label-value pair 4617H permits server computer 100 to confirm that the RSA public key maintained in field 120B (FIG. 4B) is the same key used to sign message OS1 (label-value pair 4617I).

Label-value pair 4617I has the label "signature". The value of label-value pair 4617I represents the digital signature for customer persona 120.1. For message OS1, the value of label-value pair 4617I is a hash of label-value pairs 4613A–4613D and label-value pairs 4617A–4617H in alphabetical order, encrypted with the RSA private key for customer persona 120.1. The RSA private key for customer persona 120.1 is obtained from field 220H (FIG. 5C).

Message OS1 is assembled using message assembly procedure 800 (FIG. 9) described previously for the assembly of registration message R1. The following modification is noted for message OS1: A copy of message OS1 is preferably saved in field 256I.

In the case of assembly of message OS1 by merchant computer 300, a new record 370.1 (FIG. 7C) is created as follows:

The value of label-value pair 4613B is stored in field 370P. The value of label-value pair 4617F is stored in field 370Q. The value of label-value pair 4617G is stored in field 370R. The value of status field 370O is set to "attempt" by merchant application software 310.

Referring again to FIG. 15, open session process 407 continues at step 1504. There, customer computer 200 transmits message OS1 to server computer 100. Customer computer 200 waits for a reply message OS2 from server computer 100.

At step 1505, server computer 100 receives message OS1 from customer computer 200 and unwraps message OS1 by executing server message unwrap procedure 900. Server message unwrap procedure 900 (steps 901–917) was described previously for message R1 with reference to FIG. 11. The following modification is noted: A copy of message OS1 is stored in field 140E (FIG. 4L).

At step 1506, if any of the tests of steps 909A, 912, 914, 915 or 916 caused an error flag to be set at step 905, error processing procedures are executed by server computer 100 at step 1514. While the level of error processing at step 1514 is largely an administrative decision, it is preferred that a minimum, failures of the checksum, signature, and form, and a "fatal" return on the software check procedure result in a return message containing a code that can be processed by customer application software 210 and a message that can be read by customer user 203. The error processing procedure in step 1514 entails associating a flag with a specific error code (described in the context of the return message OS2 below) and creating a text message (either from a data structure of messages or a message sent by the system administrator). Server computer 100 then generates a message OS2 similar to that described below to customer computer 200 conveying the error code and any related message.

If the tests of steps 909A, 912, 914, 915 and 916 did not cause an error flag to be set at step 905, processing continues at step 1507. There, server computer 100 calculates (computes) a session identification number ("session id"), a session encryption/decryption key ("session key") and a session salt and validates the session limits requested by customer user 203 as reflected in message OS1.

The session id is a 64-bit quantity that uniquely identifies the session being created. Uniqueness is ensured because the session ids are sequentially generated by server computer 100.

The session-key is a 128-bit quantity containing a 56 bit DES key (64-bits with the least significant bit of each eight bit byte ignored) and a 64-bit initialization vector.

The session-salt is an 8-byte cryptographic salt used to strengthen the authentication of messages CA1–CA4 which are exchanged during a session. Messages CA1–CA4 are described later.

The session limits requested by customer user 203 are the amount value of label-value pair 4617E, the key-lifetime value of label-value pair 4617F, and the key-uselimit value of label-value pair 4617G. With respect to the key-lifetime and key-uselimit, it is preferred that these values be subject to a fixed range established by server computer 100 to improve system efficiency and maximize the security of transactions performed during a session. Server computer 100 verifies that the requested values are within any such limits. Any requested limit that exceeds a permitted value are ignored and the maximum permitted value imposed by server computer 100.

The value of Label-value pair 4617E represents the amount of electronic funds that customer user 203 desires to spend during the session. The actual amount of such funds made available to customer user 203 during a session may be less than or equal to the amount requested by customer user 203 at step 1502. For example, customer user may request more electronic cash than is available in cash container field 120G.2 for customer user 203. In this case, the amount granted, as indicated by label-value pair 4717I described below, is limited to the amount stored in cash container field 120G.2 for customer user 203.

At step 1508, server session data structure 130 (FIG. 4H) is updated. The session id is stored in the session id field 130A. The session key is stored in the session key field 130B. The session salt is stored in the session salt field 130C. The amount of electronic cash made available to customer user 203 during the session is stored in opening amount field 130E and the currency designator associated with the value stored in field 130E is stored in field 130D. Initially, field 130F reflects the value of the opening amount in field 130E. As electronic cash is spent, the value in field 130F reflects the difference between the opening amount and the amount spent. The key-lifetime actually granted by server computer 100 is stored in key-lifetime field 130J. The key-uselimit actually granted by server computer 100 is stored in key-use-limit field 130I. The value of label-value pair 4613A is stored in persona id field 130K. The date that the session was created is obtained from server application software 110 and stored in opening date field 130G. The value of label-pair 4617D is saved in the record note field 130M. The remaining fields of server session data structure 130 are discussed in the context of the CA-type messages below.

After step 1509, message OS2 is assembled by and transmitted from server computer 100 to customer computer 200 to complete credit session process 407. The contents of message OS2 is now described with reference to FIGS. 23A and 23B.

Label-value pair 4713A has the label "id". The value of label-value pair 4713A indicates the persona id for customer user 203. The value of label-value pair 4713A is the same as that received in message OS1 in label-value pair 4613A.

Label-value pair 4713B has the label "transaction". The value of label-value pair 4713B is a transaction number. The value of label-value pair 4713B is the same as that received in message OS1 in label-value pair 4613B.

Label-value pair 4713C has the label "date". The value of label-value pair 4713C is the same as that received in message OS1 in label-value pair 4613C.

Label-value pair 4713D has the label "service-category". The value of label-value pair 4713D is the same as that received in label-value pair 4613E of message OS1.

Label-value pair 4717 has the label "opaque". The value of label-value pair 4717 includes the opaque section contents (in encrypted form) of message OS2. We now describe the opaque section contents of message OS2, shown in FIG. 23B.

Label-value pair 4717A has the label "type". The value of label-value pair 4717A references a record in message data structure 270 (FIG. 5A) which sets forth the labels of the opaque section content of message 0S2. The value of label-value pair 4717A is obtained from server software 110.

Label-value pair 4717B has the label "server-date". The value of label-value pair 4717B indicates the date and time message OS2 was assembled according to the clock of server computer 100.

Label-value pair 4717C has the label "response-code" and the value "success" or "failure" as previously described. Label-value pair 4717C indicates whether open session process 407 was a success or failure.

Label-value pair 4717D has the label "swseverity" (software severity) and the value "fatal" or "warning". The value of label-value pair 4717D indicates whether customer application software 210 needs to be updated, but is still usable ("warning") or is no longer usable ("fatal"). The value of label-value pair 4717D is null if customer application software 210 is current.

Label-value pair 4717E has the label "swmessage" (software message). The label-value pair 4717E indicates instructions as to what customer user 203 should do in the case of a "fatal" or "warning" software severity. The value of label-value pair 4717E is only present if the value of label-value pair 4717D is not null.

Label-value pair 4717F has the label "message". The value of label-value pair 4717F is a free text message associated with an error or success condition returned in label-value pair 4717C and displayed to customer user 203. The value of label-value pair 4317F may include a message indicating a duplicate requested persona id, a bad digital signature or an ill formed message OS1 and instructions as to how customer user 203 should proceed (e.g., "call system administrator").

Label-value pair 4717G has the label "key-lifetime" and the value obtained from the key-lifetime of field 130J (FIG. 4L) indicating the maximum length of time the session will last.

Label-value pair 4717H has the label "key-use-limit" and the value obtained from the key-use-limit of field 130I indicating the maximum number of transactions which may occur during the session.

Label-value pair 4717I has the label "amount" and indicated the maximum amount of electronic cash available to customer user 203 during the session. The amount value of label-value pair 4717I may be less than or equal to the amount requested by customer user 203 at step 1502.

Label-value pair 4717J has the label "foreign-exchange" and a value indicating a conversion rate from the currency denomination included in the value of label-value pair 4217I into other currencies, for example, U.S. dollars into Canadian dollars. Preferably, the indicated conversion rate is in the number of minor units (or major units if there is no minor unit) of the destination currency for hundred major units of source currency.

Label-value pair 4717K has the label "session-funds". The value of label-value pair 4717K indicates an amount of electronic cash sent to all open sessions including the amount value of label-value pair 4417I. A customer persona 120.1 may have any number of sessions open. Label-value pair 4717K provides customer user 203 information regarding the amount of funds initially allocated to all open sessions, including the session just opened.

Label-value pair 4717L has the label "balance". The value of label-value pair 4717L indicates the amount of electronic cash stored in cash container field 120G.2 of server persona data structure 120 for customer user 203 after the transfer of electronic cash funds to opening amount field 130E of server session data structure 130.

Label-value pair 4717M has the label "on-hold". The value of label-value pair 4717M is obtained from cash container field 120G.3 and indicates the amount of uncollected electronic cash still being cleared in persona 120.1 for customer user 203. This value represents electronic cash which are awaiting approval or processing by the issuer of the instrument from which funds are being load or to which funds are being unloaded.

Label-value pair 4717N has the label "fee". The value of label-value pair 4717N indicates a fee charged to customer user 203, if any, associated with processing message OS1.

Label-value pair 4717O has the label "session-id". The value of label-value pair 4717O is obtained from the session id of field 130A.

Label-value pair 4717P has the label "session-key". The value of label-value pair 4717P is obtained from the session key of field 130B.

Label-value pair 4717Q has the label "session-salt". The value of label-value pair 4717Q is obtained from the session salt of field 130C.

At step 1509 of FIG. 21, server software 100 assembles message OS2 according to the flow diagram of FIG. 12. Server message assembly procedure 1000 was described previously for the assembly of message R2.

At step 1509A, message OS2 is sent (transmitted) from server computer 100 to customer computer 200.

At step 1510, customer computer 200 receives message OS2 from server computer 100 and unwraps message OS2 by executing message unwrap procedure 1100 for message OS2. Message unwrap procedure 1100 (steps 1101–1121) was previously described for message R2 with reference to FIG. 14.

At step 1511,
(1) if an error flag was set at step 1105, the flag will be detected at step 1511 and processing of message OS2 terminates at step 1512. From the perspective of customer user 203, no further action is taken with respect to message OS2. In the present invention, a mechanism is provided within customer application software 210 to create and send to server computer 100 a message. This message includes the OS2 message as received by customer computer 200 and any diagnosis of what caused the message to fail. No response to this message is sent by server computer 100 to customer computer 200. Rather, the information is used to ascertain whether a problem exists within the system and if appropriate corrective measures need to be taken.
(2) if no error flag was set at step 1105 but an error in message OS1 was detected at step 905, processing continues at step 1513 where the content of label-value 4717C is checked. If the value of label-value 4717C is other than "success", error processing routines are performed at step 1515 causing customer application software 210 to display the message contained in label-value 4717F associated with the content of label-value 4717C and to interpret the value of label-value 4717C and take whatever action may be associated with that value; or
(3) if message OS1 passed the check at step 905 and no flags were set at step 1105, processing continues at step 1516 where customer application software 210 updates customer database 202.

Customer session data structure 240 is updated as follows: The session id is stored in the session id field 240A. The session key is stored in the session key field 240B. The session salt is stored in the session salt field 240C. The value of label-value pair 4717I includes a currency designator and a quantity. The quantity value is stored in opening amount field 130E and the currency designator associated with the value stored in field 130E is stored in field 130D. The value of label-value pair 4717G is stored in key-lifetime field 240K. The value of label-value pair 4717G is stored in key-use-limit field 240J.

It is noted that field 240F initially will reflect the value of the opening amount in field 240E. As electronic cash is spent, the value in field 240F will reflect the difference between the opening amount and the amount spent. The remaining fields of customer session data structure 240 are discussed in the context of the CA-type messages below.

In addition to the values recorded in customer session data structure 240, record 265 of customer log data structure 260 is updated as follows: The persona id from label-value pair 4713A is stored in field 265H. The transaction number from label-value pair 4713B is stored in field 265B. The date from label-value pair 4717B is stored in field 265C. The response-code from label-value pair 4717C is stored in field 265F. The software severity code from label-value pair 4717D is stored in field 265D. The software-message from label-value pair 4717E is stored in field 265E. The response message associated with the response code from field 4717F is stored in field 265G. The key-lifetime from label-value pair 4717G is stored in field 265K. The key-use limit from label-value pair 4717H is store in field 265J. The amount from label-value pair 4717I is stored in filed 265I. The balance from label-value pair 4717L is stored in field 265P. The fee from label-value pair 4717N is stored in field 265O. The session-id from label-value pair 4717O is stored in field 265L.

If the open session process is initiated by merchant user 303, record 370.1 of merchant cash log data structure 370 is updated as follows:

The response code from label-value pair 4717C is stored in field 370O. The message from label-value pair 4717F associated with the response code from label-value pair 4717C is saved in field 370T. The session-id from label-value pair 4717O is stored in field 370S.

Processing continues at step 1517 where open session process 407 ends.

F. Transaction/Payment Process 409

When customer user 203 and merchant user 303 have open sessions, secure cash transactions can occur over the Internet 50. Security in this context means that customer user 203 and merchant user 303 can each be confident that its electronic funds are not at risk of being accessed by an unauthorized third party and that no electronic cash will be transferred until both parties have assented to a transaction which has been validated by server computer 100.

A transaction includes a customer user 203 shopping among Internet 50 merchant users 303 who have merchant personas 120.2. Using well known techniques, customer user 203 and a merchant user 303 agree on a price that customer user 203 is willing to pay for a product to be provided by merchant user 303. When merchant user 303 requests payment, customer user 203 elects to pay with electronic cash. This election drives an exchange of messages resulting in the ultimate payment to merchant user 303 for the product purchased by customer user 203.

Figure 24A:
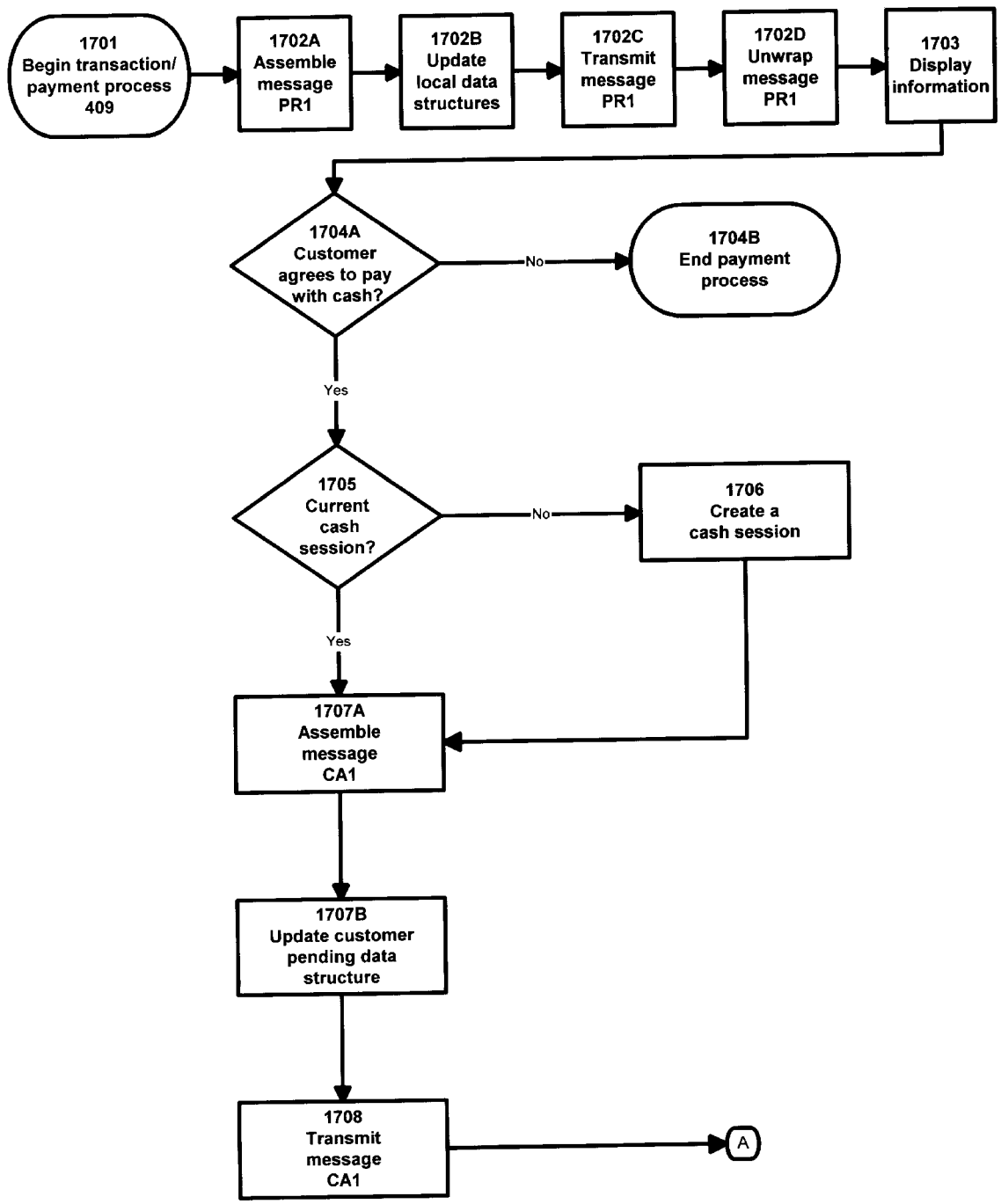
FIGS. 24A, 24B and 24C depict a flow diagram illustrating transaction/payment process 409.
Figure 24B:
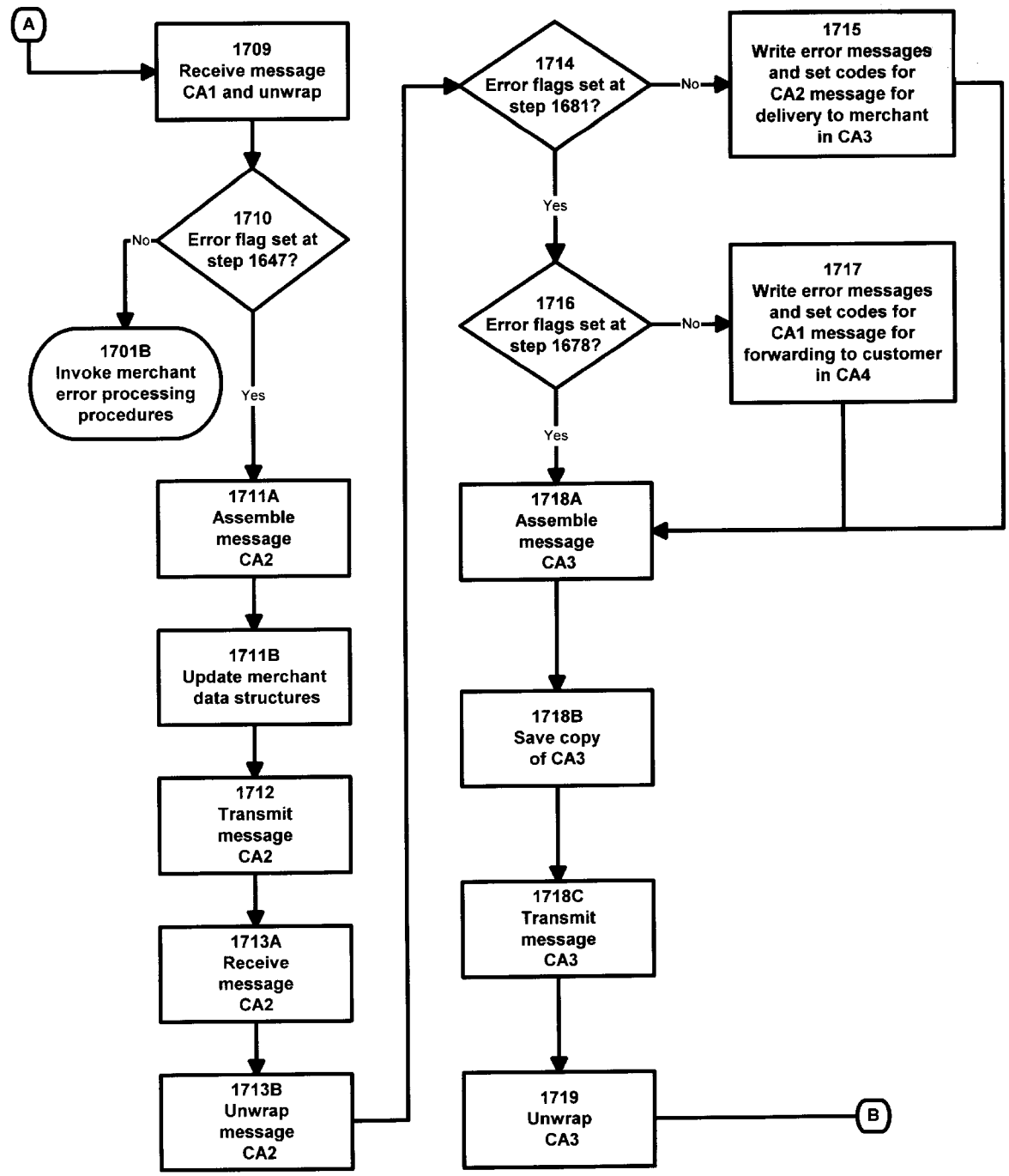
Figure 24C:
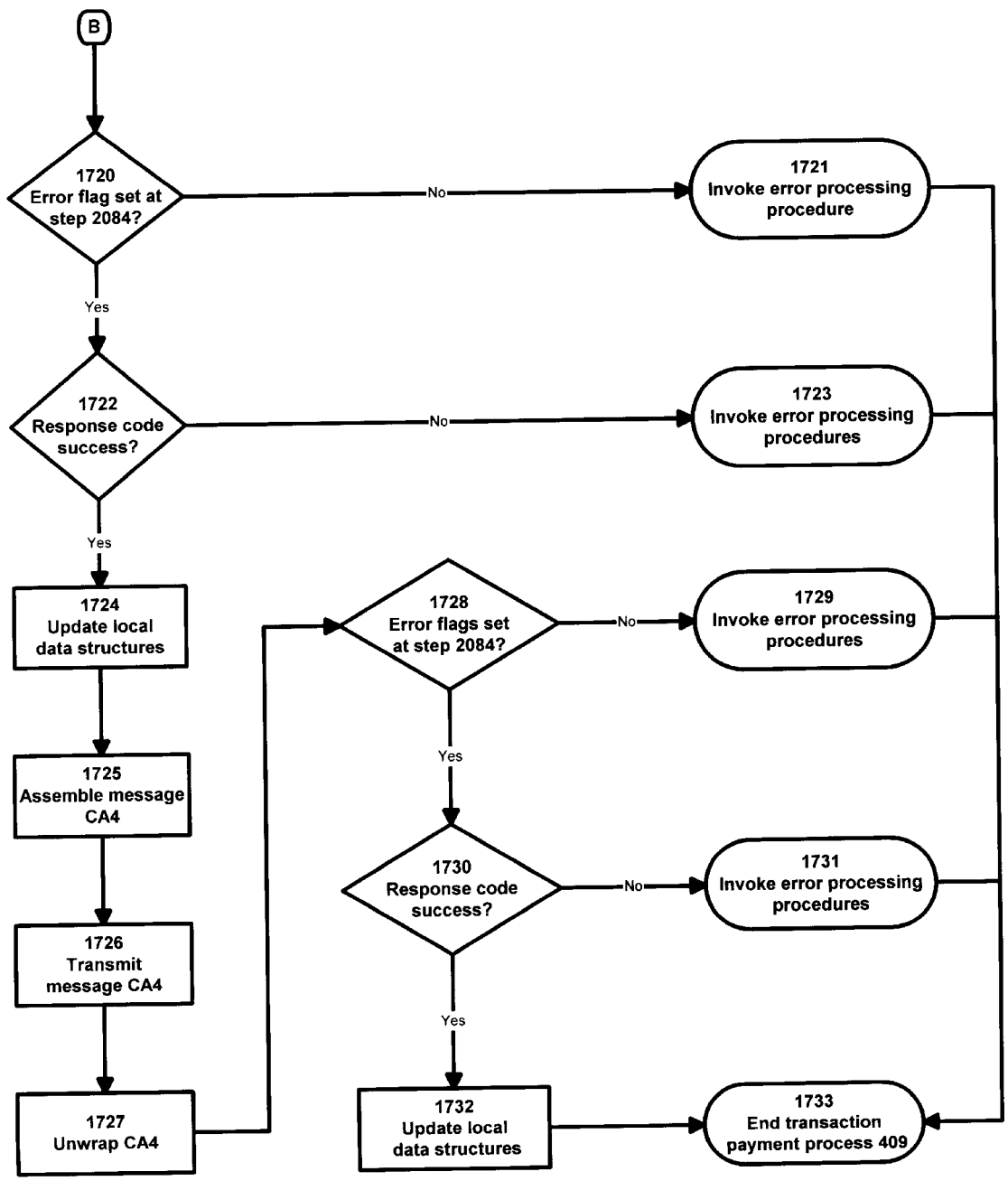
Figure 26:
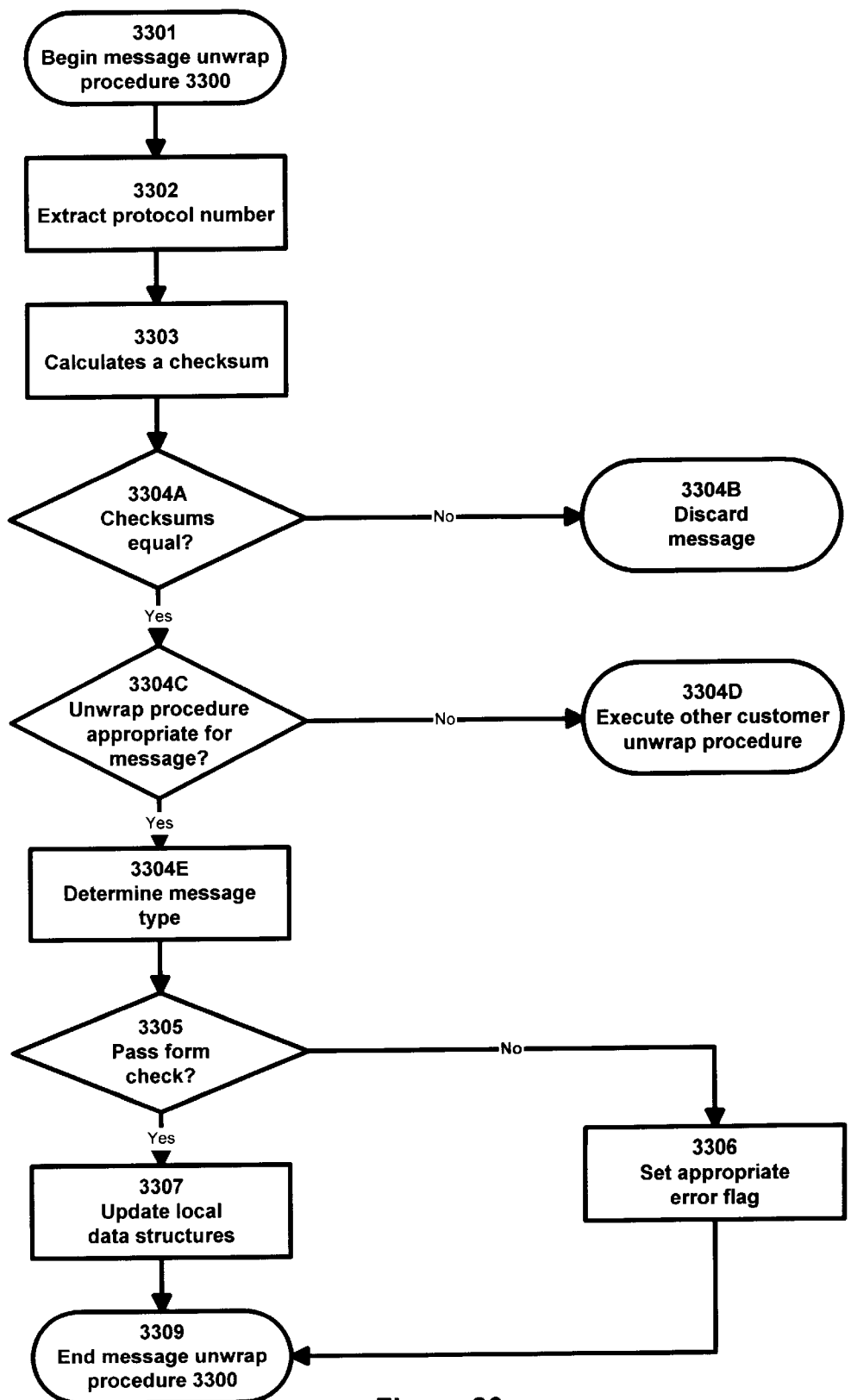
FIG. 26 depicts a flow diagram illustrating message unwrap procedure 3300.

FIGS. 24A–24C is a flow diagram depicting transaction/payment process 409 which begins at step 1701.

At step 1702A merchant computer 300 assembles message PR1. Message PR1 preferably does not include encrypted data. Thus, only steps 814–817 of message assembly procedure 800 (FIG. 9) are needed to assemble message PR1. The content of message PR1 is now described with reference to FIG. 25.

Label-value pair 5013A has the label "type". The value of label-value pair 5013A references a record in message data structure 270 (FIG. 5A) which sets forth labels comprising PR1. The value of label-value pair 5013A is obtained from merchant application software 310.

Label-value pair 5013B has the label "merchant-id". The value of label-value pair 5013B indicates the persona id for merchant user 303. The value of label-value pair 5013B is obtained from field 320A (FIG. 6C).

Label-value pair 5013C has the label "merchant-order-id". The value of label-value pair 5013C indicates an order identification number ("order id") generated by merchant computer 300 to identify a particular order. The value of label-value pair 5013C is stored in field 370C (FIG. 7C).

Label-value pair 5013D has the label "merchant-date". The value of label-value pair 5013D indicates the date and time message PR1 was assembled according to the clock of merchant computer 300.

Label-value pair 5013E has the label "merchant-swversion" (merchant software version). The value of label-value pair 5013E indicates the version of merchant application software 310 communicating with customer computer 200. The value of label-value pair 5013E is obtained from merchant application software 310.

Label-value pair 5013F has the label "note". The value of label-value pair 5013F describes the product being provided by merchant user 303 to customer user 203. The value of label-value pair 5013F is obtained by merchant application software 310 from software provided by merchant 303 or a third-party.

Label-value pair 5013G has the label "merchant-amount". The value of label-value pair 5013G describes the currency and the price for the product described in label-value pair 5013F.

Label-value pair 5013H has the label "accepts". The value of label-value pair 5013H identifies credit cards accepted by merchant user 303 (if any). The values of label-value pair 5013H are obtained from merchant user 303.

Label-value pair 5913I has the label "url-pay-to". The value of label-value pair 5913I is an Internet 50 uniform resource locator. The Internet 50 uniform resource locator of label-value pair 5913I is the address on the Internet 50 to which customer computer 200 is to sends message CA4, described later.

Label-value pair 5013J has the label "url-cancel". The value of label-value pair 5013J is an Internet 50 uniform resource locator. The Internet 50 uniform resource locator of label-value pair 5013J is used by customer computer 200 should customer user 203 decide to cancel a transaction.

Label-value pair 5013K has the label "url-success". The value of label-value pair 5013K is an Internet 50 uniform resource locator which directs customer computer 200 to an address on the world wide web if a transaction is successful. The success of a transaction is reported in message CA4, described later. For example, if the transaction is validated by server computer 100, the value of label-value pair 5013K may direct customer computer 200 to a web page that congratulates customer user 203 for his or her purchase.

Label-value pair 5013L has the label "url-failure". The value of label-value pair 5013L is an Internet 50 uniform resource locator which directs customer computer 200 to an address on the world wide web if a transaction is unsuccessful. The failure of a transaction is reported in message CA4, described later. For example, if the transaction is not validated by server computer 100, the value of label-value pair 5013L may direct customer computer 200 to a web page which requests customer user 203 to try his or her purchase again.

Label-value pair 5013M has the label "merchant-signed-hash-key". The value of label-value pair 5013M represents a hash of the modulus part of the RSA public/private key pair used by merchant computer 300 to sign the hash of merchant-signed hash label-value pair 5013N described below. The value of label-value pair 5013M permits server computer 100 to confirm that the RSA public key maintained in field 120CC (FIG. 4E) for merchant persona 120.2 is the same key used to sign "merchant-signed-hash" label-value pair 5013N, or if the decryption of label-value pair 5013N fails, the reason for such failure.

Label-value pair 5013N has the label "merchant-signed-hash". For message PR1, the value of label-value pair 5013N is a hash of label-value pairs 5013A–5013M in that order. This hash is signed, meaning that the hash is hashed again, then encrypted with the RSA private key for merchant persona 120.2. The RSA private key merchant persona 120.2 is obtained from field 320H (FIG. 6C).

Label-value pair 50130 has the label "merchant-amount2". The value of label-value pair 50130 describes the price in currencies other than that associated with the price specified in label-value pair 5013G.

Customer user 203 cannot authenticate the signature of label-value pair 5013N because it does not have the public key for merchant persona 120.2. The value of label-value pair 5013N may be stored by customer application software in the event that a dispute arises over the transaction. In such event, server computer 100 can use the value of label-value pair 5013N to determine if message PR1 was actually sent by merchant computer 300.

Referring again to FIG. 24A, step 1702A, a new record 350.1 (FIG. 7A) is added (assembled) as follows:

The value of label-value pair 5013C (relating to the merchant-order-id) is stored in order-id field 350A.

The value of label-value pair 5013G (relating to the amount that merchant user 303 intends to receive in exchange for products) is stored in amount field 350B.

Transaction/payment process 409 continues at step 1702C. There, merchant computer 300 transmits message PR1 to customer computer 200. Merchant computer 300 waits for message CA1 from customer computer 200.

At step 1702D, customer computer 200 receives message PR1 from merchant computer 300 and unwraps message PR1 by executing message unwrap procedure 3300. Message unwrap procedure 3300 is now described with reference to FIG. 26, where it begins at step 3301.

At step 3302, customer application software 210 extracts the protocol (version) number of header 5005 of message PR1. Next, based upon the extracted protocol number, message template data structure 270 (FIG. 5A) is accessed to determine the expected format of message PR1. The expected format may include message syntax (e.g., permitted end-of-line characters) and message coding (e.g., ASCII or hex). Message PR1 is parsed in accordance with the expected format as follows.

At step 3303, customer computer 200 calculates a checksum using the same data used by merchant computer 300. At step 3304A, the checksum calculated at step 3303 is compared to the checksum of trailer 5050 of message PR1. If the checksums are not equal, message PR1 is discarded at step 3304B where message unwrap procedure 3300 also terminates.

If the checksums are equal at step 3304A, processing continues at step 3304C where the message is checked to determine if it is appropriate for message unwrap procedure 3300. If a message includes the label "type" in the transparent part of the message and the value PR1, it is appropriate. If a message does not have this label-value pair, it is not appropriate for a message unwrap procedure 3300 in which case processing continues at step 3304D where the message is diverted to another unwrap procedure, described elsewhere. Message PR1 is appropriate; therefore, processing continues at stby refer where the message type is determined by reference to the value of label-value pair 5013A. In this case, the value of label-value pair is "payment-request."

At step 3305 a form check of message PR1 is performed. The form check procedure of step 3305 is software version dependent. That is, the expected form of the message, and the criteria that determine whether it is acceptable, depend on the message and any variations of the message that are valid at a given time. At a minimum, the form check procedure will ascertain whether an incoming message contains all the labels that are prescribed for that message, whether there are values for each label that requires a value, and whether the values are of the type (e.g., text, signed numbers), syntax and within any specified limits as required. If there are additional labels, customer computer 200 will ignore them. If a message cannot be parsed, or if it can be parsed but does not meet a form criteria, an error flag will be set at step 3306. In this case, message unwrap procedure 3300 ends at step 3309.

If message PR1 has proper form, processing continues at step 3307. There, customer application software 210 adds (updates) a new record 266 as follows:

The merchant-id value of label-value pair 5013B is stored in field 266A. The merchant-order-id value of label-value pair 5013C is stored in field 266B. The amount value of label-value pair 5013G is stored in field 266C. The merchant-note value of label-value pair 5013F is stored in field 266D. The pay-to-value of 50131 is stored in field 266F.

Message unwrap procedure 3300 ends at step 3309.

Referring again to FIG. 24, at step 1703 customer computer 200 displays the offer of merchant user 303 to customer user 203. The values of label-value pair 5013F and 5013G (describing the product being sold to customer user 203 and the offer price) are displayed.

At step 1704A, customer user 203 accepts the offer of merchant user 303. It is foreseeable that at this juncture, customer user 203 will also be given a variety of payment options (e.g., credit card or electronic cash). If customer user 203 selects credit, other processes will take place which are not described herein. If customer user 203 indicates a desire to pay for the product with electronic cash, processing continues at step 1705.

At step 1705, customer application software 210 determines whether customer user 203 has an open session by searching records 240 (FIG. 5E).

If customer user 203 does not have an open session, processing proceeds to step 1706. There, a session is created using open session process 405 as described above.

If customer user 203 has an open session, or after open session process 405 has been executed, processing continues at step 1707A. There, customer computer 200 assembles message CA1 as follows.

Figure 27:
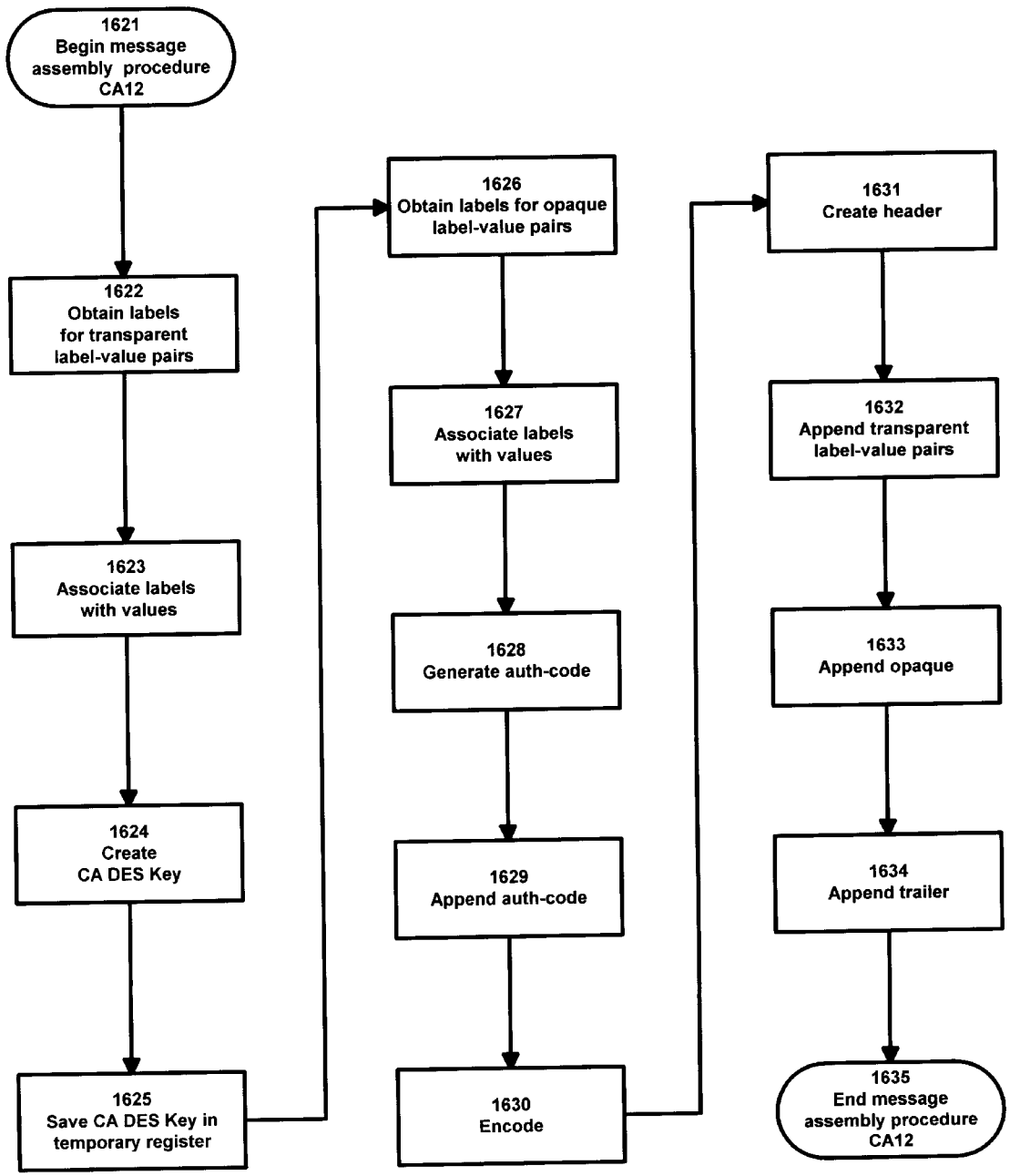
FIG. 27 depicts a flow diagram illustrating message assembly procedure CA12.

Referring to FIG. 27, message assembly procedure CA12 is depicted. ("CA12" references that this message assembly procedure is executed to assemble messages CA1 and CA2.)

Message assembly procedure CA12 for message CA1 begins at step 1621. Message CA1 is shown in FIGS. 28A and 28B.

At step 1622, customer application software 210 accesses message template data structure 270 (FIG. 5A) to obtain a list of labels, which, when matched up with associated values, make up the transparent label-value pairs 5113A–5113I of message CA1. At step 1623, values are associated with each label. These label-value pairs are now described.

Label-value pair 5113A has the label "type". The value of label-value pair 5113A references a record in message data structure 150 (FIG. 4A) which sets forth the labels comprising message CA1. The value of label-value pair 5113A is obtained from customer application software 210.

Label-value pair 5113B has the label "version". The value of label-value pair 5113B is a code maintained in message data structure 270 (FIG. 5A) which references a record within the type record indicated by label-value pair 5113A. The value of label-value pair 5113B is retrieved by customer application software 210 from message data structure 270.

Label-value pair 5113C has the label "session-id". The value of label-value pair 5113C is obtained from the session-id of field 240A (FIG. 5E).

Label-value pair 5113D has the label "index". The value of label-value pair 5113D is an integer assigned by customer application software 210 to a transaction within a session and represents a use of the session key stored in field 240B. The range of values is bounded by 1 and the key-use-limit stored in field 240J. Label-value pair 5113E has the label "payee-currency" and the value indicated by the currency portion of label-value pair 5013G of message PR1. The value of label-value pair 5113E describes the currency in which merchant user 303 intends to be paid for the transaction.

Label-value pair 5113F has the label "note-hash". The value of label-value pair 5113F is a hash of label-value pair 5013F of message PR1.

Label-value pair 5113G has the label "payee-id". The value of label-value pair 5113G is the merchant persona id obtained from the value of label-value pair 5113B of message PR1.

Label-value pair 5113H has the label "order-id". The value of label-value pair 5113H is the order id obtained from the value of label-value pair 5113C of message PR1.

Label-value pair 5113I has the label "service-category". The value of label-value pair 5113I is a label which may be used by merchant computer 300 to route message CA1 to a processor within merchant computer 300 that handles messages of a particular service category.

Figure 29:
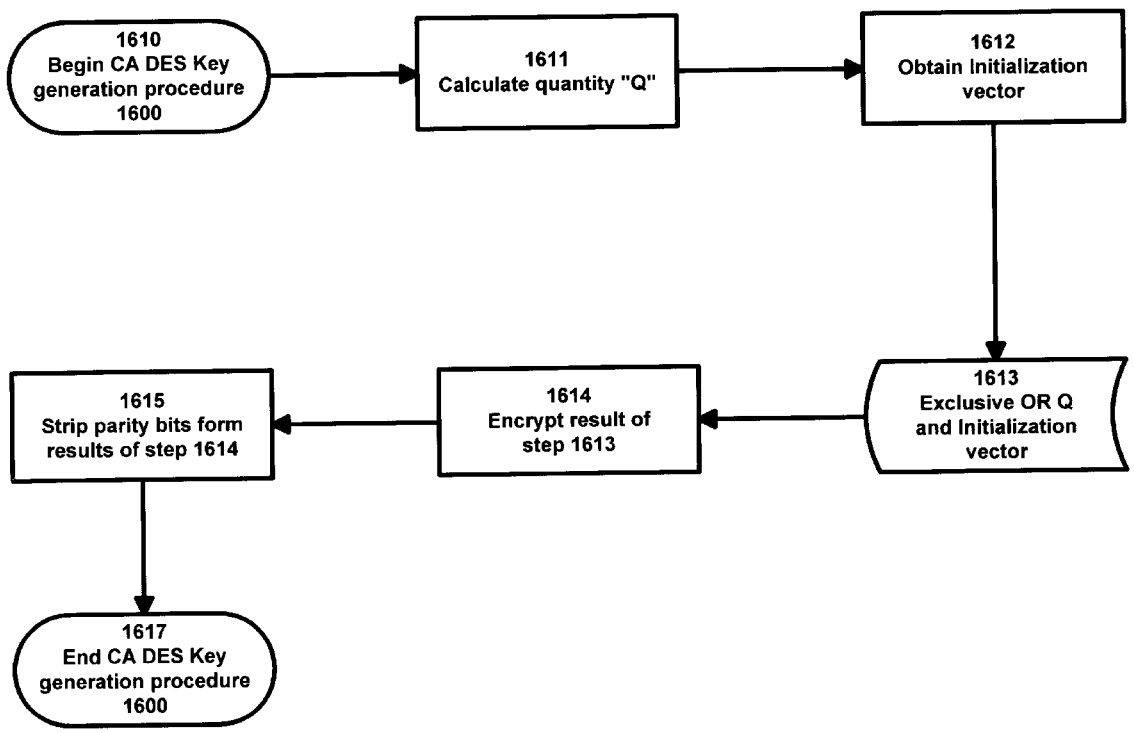
FIG. 29 depicts a flow diagram illustrating CA-DES-key generation process 1600.
Figure 30:
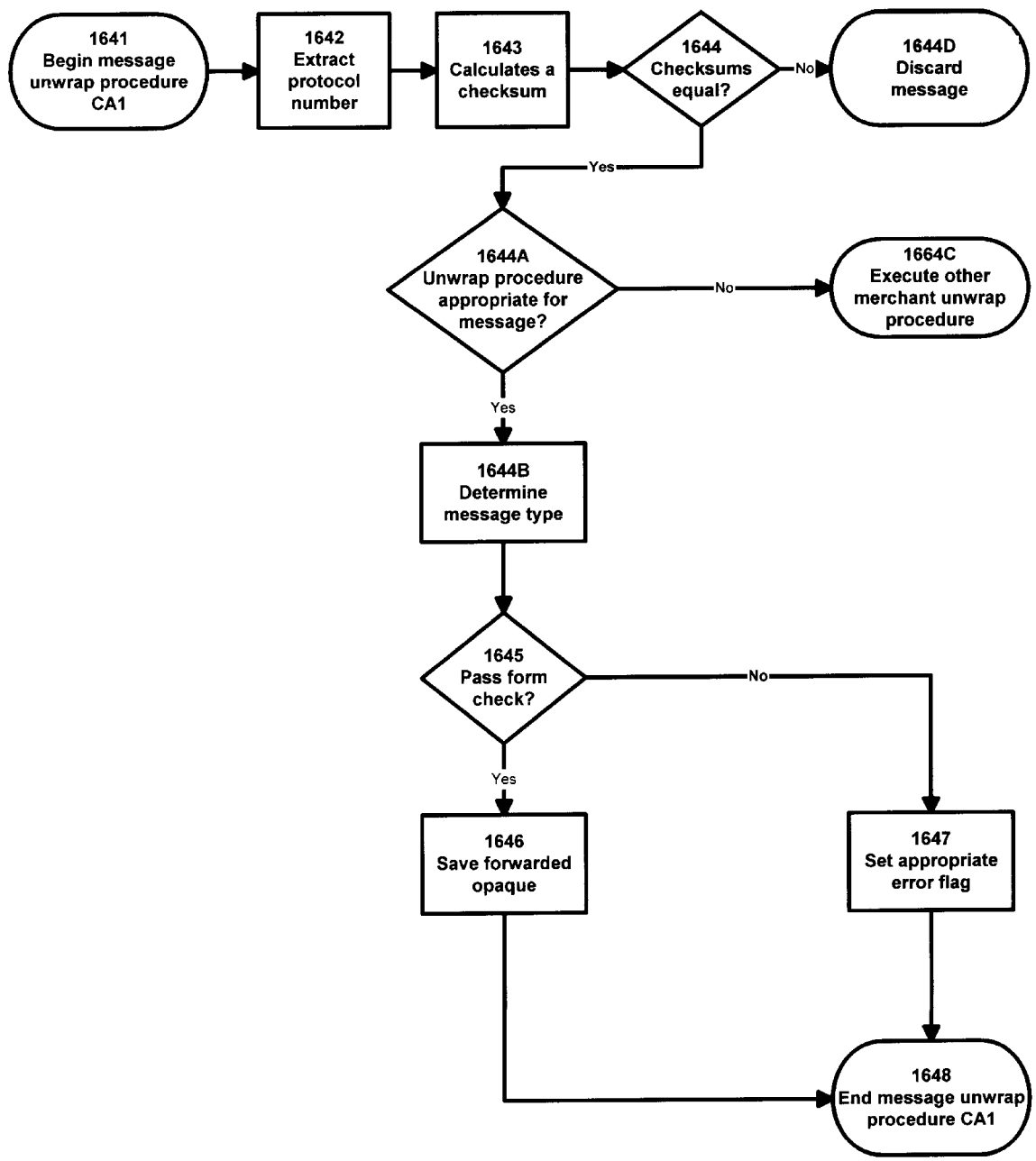
FIG. 30 depicts a flow diagram illustrating message unwrap procedure CA1.
Figure 32A:
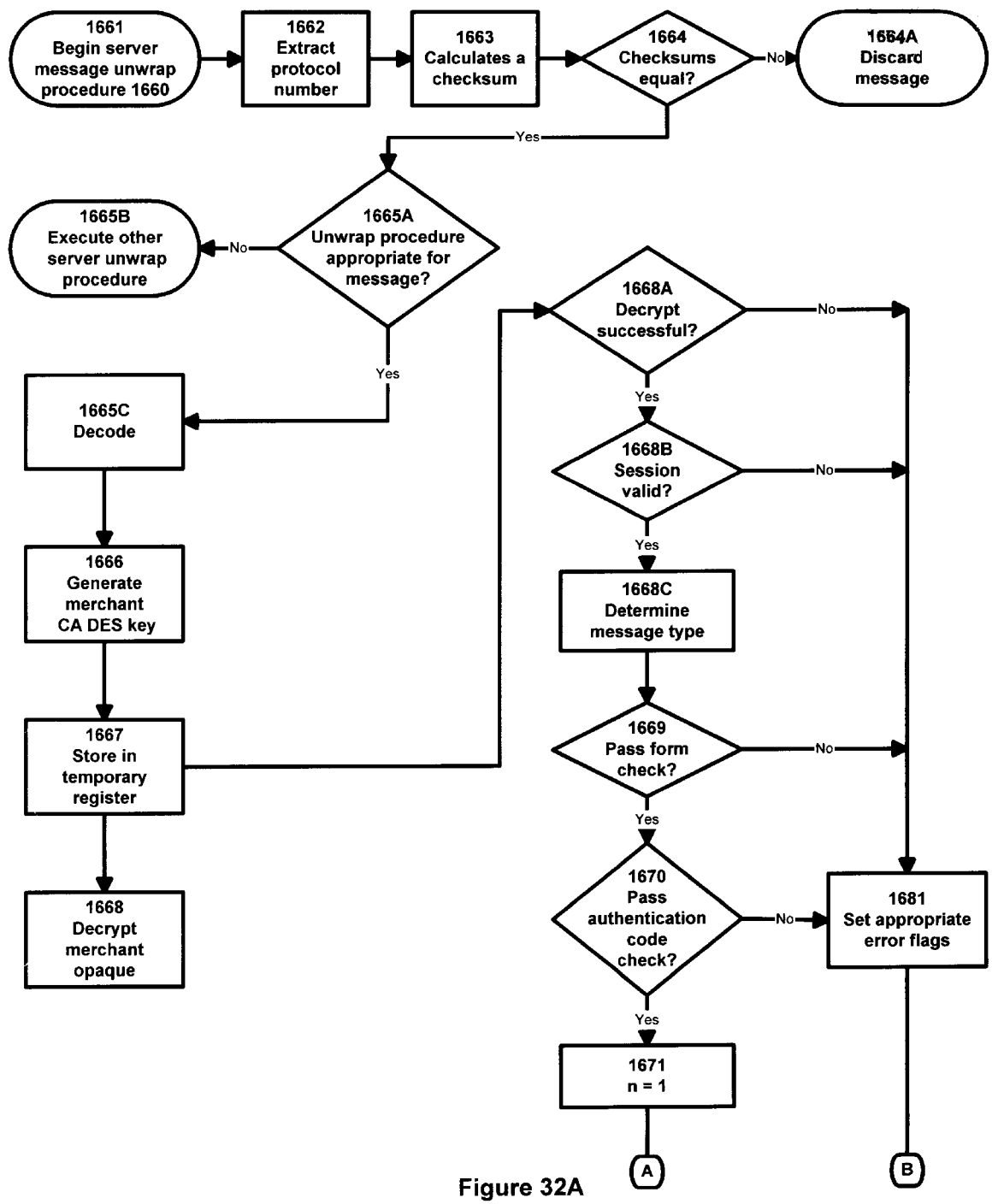
FIGS. 32A and 32B depict a flow diagram illustrating server message unwrap procedure 1660.
Figure 32B:
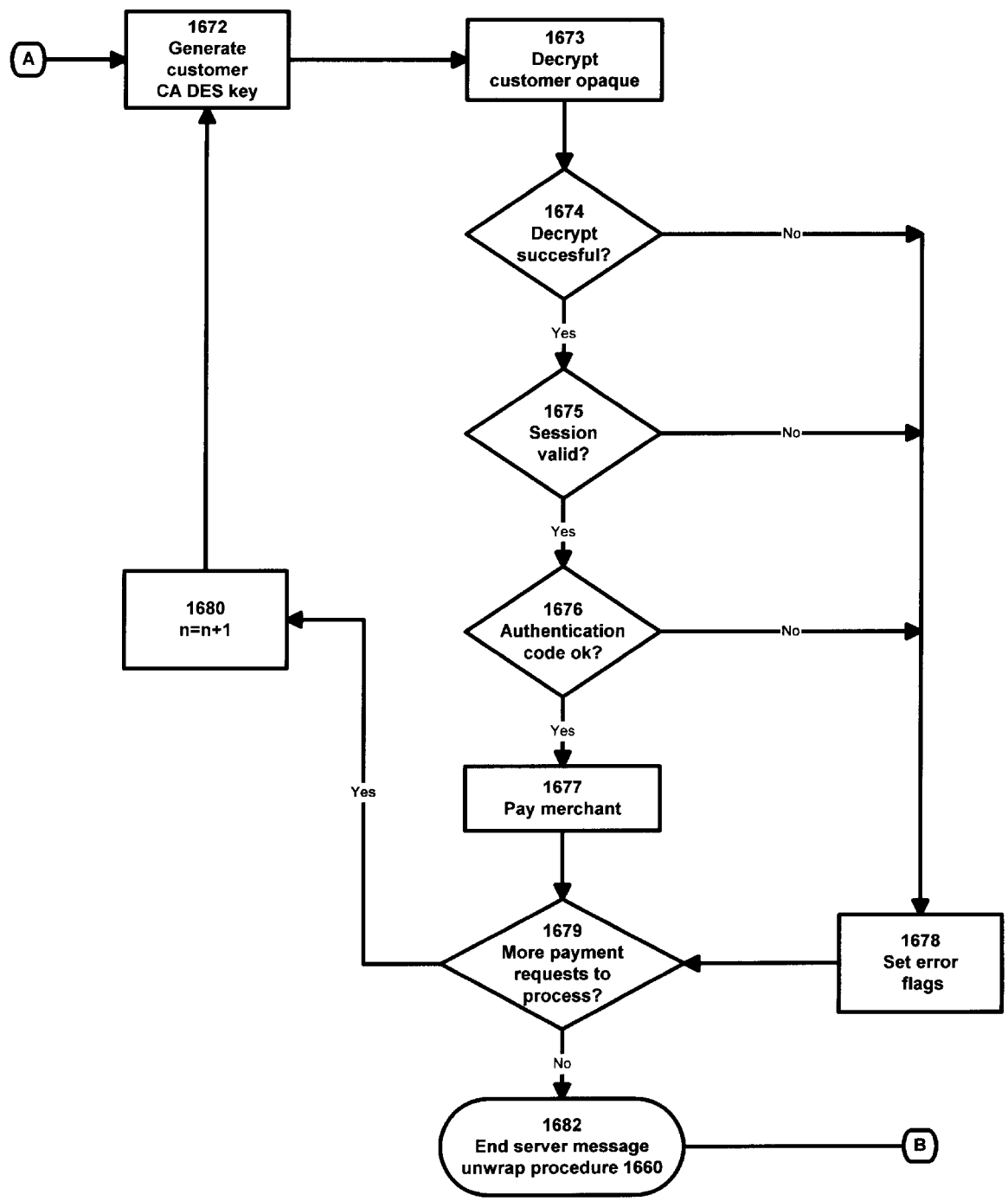

At step 1624, customer application software 210 generates a 56-bit DES key DES-CA1 according to CA-DES-key generation process 1600, shown in the flow chart of FIG. 29.

Generation of DES key DES-CA1 begins at step 1610.

At step 1611, customer application software 210 constructs (calculates) a quantity Q, an eight byte quantity. Quantity Q is a concatenation of the values of label-value pairs 5113A, 5113B and 5113D of message CA1. It is preferred that the resulting DES Key change with each message so as to increase the likelihood that each DES key generated by CA-DES-key generation process 1600 will be unique. In the present invention, the value of session key field 240B and label-value pair 5113D ("index"), when taken together, will normally be different for every request message (that is, message CA1 and message CA2) and every response message (that is, message CA3 and message CA4). In addition, the value of label-value pair 5113A ("type") will differentiate the request from the response, resulting a low probability that any two messages will be encrypted with the same DES key. Additional variability is obtained by using label-value pair 5113B ("version").

In the present invention, the concatenation of the value of label-value pairs 5113A, 5113B and 5113D of message CA1 results in a four-byte quantity. To reach the desired value of eight-bytes, the resulting concatenation is padded on the left side with four bytes of zeros.

At step 1612, a 64-bit initialization vector is obtained. The initialization vector is the lower 64-bits of the session-key of field 240B (FIG. 5E). This initialization vector was generated during open session process 407.

At step 1613, a logical "exclusive or" (XOR) operation is performed on quantity Q calculated at step 1611 and the initialization vector obtained at step 1612.

At step 1614, the result of the XOR operation at step 1613 (a 64-bit value) is encrypted using the 56-bit DES key stored in the upper 64-bits of the session-key of field 240B. The 56-bit DES key was generated during open session process 407.

At step 1615, the parity bits of the encrypted XOR result of step 1614 are stripped. In this manner, the 56-bit DES key DES-CA1 is created.

CA-DES-key generation process 1600 for message CA1 ends at step 1617.

Referring again to FIG. 27, message assembly procedure CA12 for message CA1 continues at step 1625. There, the DES key DES-CA1 is stored (saved) in a temporary register.

At step 1626, customer application software 210 accesses message template data structure 270 (FIG. 5A) to obtain a list of labels, which, when matched up with associated values, make up the opaque section contents of message CA1.

The opaque section contents of message CA1 are shown in FIG. 28B where label-value pair 5117A has the label "amount". The value of label-value pair 5117A describes the currency and the amount that customer user 203 intends to pay for the product.

Label-value pair 5117B has the label "auth-code" and is created at step 1628. For message CA1, the value of label-value pair 5117B is a hash of the concatenation of the following: 8-byte salt of field 240C, the values of label-value pairs 5113A, 5113C–5113H, and 5117A and the 8-byte salt of field 240C. Prior to hashing, all white space embedded in the values of label-value pairs 5113A, 5113C–5113H, and 5117A is removed and a vertical bar separator character inserted between each adjacent pair of values.

This authentication code is not a digital signature. While a digital signature could be used instead of the auth-code reflected in label-value pair 5117B, the cost of such use in terms of processing time is substantial when compared to processing a hash. Given the safeguards provided by the use of independent sessions having limited duration for customer user 203 and a merchant user 303, the benefit of encryption-based non-repudiation is not sufficient to outweigh the cost in processor time.

At step 1629, label-value pair 5117B, created at step 1628, is appended to label-value pair 5117A. Label-value pairs 5117A and 5117B are encrypted using DES-key DES-CA1 stored in the temporary register at step 1625.

At step 1630, the data encrypted at step 1629 is encoded using well known techniques.

Message CA1 is assembled at steps 1631–1634. At step 1631, header 5105 is created using the message template found at customer message template data structure 270 (FIG. 5A) and the protocol number as embedded in customer application software 210.

At step 1632, the transparent label-value pairs 5113A–5113H are appended.

At step 1633, opaque label-value pair 5117 is appended. Label-value pair 5117 has the label "opaque" signifying that the value which follows is encrypted data. The value of label-value pair 5117 represents the data which was encoded at step 1630.

Trailer 5150 is assembled at step 1634. The checksum of trailer 5150 is calculated as described above with respect to sample message 4000. Trailer 5150 is added to the remainder of message CA1.

The assembly of message CA1 is now complete. Message assembly procedure CA12 for message CA1 ends at step 1635.

Referring again to FIG. 24, processing continues at step 1707A. There, customer computer 200 adds a new record 253 (FIG. 5I) as follows.

Customer application software 210 creates a value, preferably, "cash-payment", and saves it at type field 253A.

Customer application software also creates a transaction number and date and stores them in transaction number field 253B and date/time field 253C.

The software version of the customer application software 210 used to create message CA1 is obtained from customer application software 210 and saved in software version field 253D.

The persona id for customer persona 120.1 is obtained from field 220A and stored in field 253E.

The value of label-value pair 5013C from message PR1 is saved in order id field 253F.

The value of label-value pair 5013B is saved in merchant id field 253G.

The value associated with label-value pair 5117A is saved in amount field 253H and deducted from current value field 240F of customer session data structure 240.

User memo field 253I stores an optional note (memo) from customer describing the transaction. The value of field 253I is obtained from customer user 203 in response to a prompt from customer application software 210 at the time customer user 203 agrees to make payment.

The value of label-value pair 5013I from message PR1 is saved in field 253J.

A copy of message CA1 is preferably saved in field 253K.

Referring again to FIG. 24A, processing continues at step 1708. There, customer computer 200 transmits message CA1 to merchant computer 300. Customer computer 200 waits for a reply message CA4 from merchant computer 300.

At step 1709, merchant computer 300 receives message CA1 from customer computer 200 and unwraps message CA1 by executing message unwrap procedure CA1. Message unwrap procedure CA1 for message CA1 is now described with reference to FIG. 30 where it begins at step 1641.

At step 1642, merchant software 310 extracts the protocol number of header 5105 of message CA1. Next, based on the extracted protocol number of field 5105C, message data structure 380 is accessed to determine the expected format of message CA1. The expected format may include message syntax (e.g., permitted end-of-line characters) and message coding (e.g., ASCII or hex). Message CA1 is parsed in accordance with the expected format as follows.

At step 1643, merchant computer 300 calculates a checksum using the same data used by customer computer 200 at step 1633 of message assembly procedure CA12 (FIG. 27) for message CA1. At step 1644, the checksum calculated at step 1643 is compared to the checksum of trailer 5150 of message CA1. If the checksums are not equal, message CA1 is discarded at step 1644D where CA1 message unwrap procedure terminates.

If the checksums are equal at step 1644, processing continues at step 1644B where the message is checked to determine if it is appropriate for message unwrap procedure CA1. A message is appropriate if it includes the label "type" in the transparent part of the message and the value indicating a message CA1. If a message does not include that label-value pair, it is not appropriate. If a message is inappropriate, processing continues at step 1664C where the message is diverted to another merchant unwrap procedure. Message CA1 is appropriate; therefore processing continues at step 1644B where the message type is determined by reference to label-value pair 5113A.

At step 1645, a form check of message CA1 is performed. The form check procedure of step 1645 is software version dependent. That is, the expected form of the message, and the criteria that determine whether it is acceptable, depend on the message and any variations of the message that are valid at a given time as determined by reference to message type and version information provided in message CA1 and message data structure 380 as previously described. At a minimum, the form check procedure will ascertain whether an incoming message contains all the labels that are prescribed for that message, whether there are values for each label that requires a value, and whether the values are of the type (e.g., text, signed numbers), syntax and within any specified limits as required. If a message cannot be parsed, or if it can be parsed but does not meet a form criteria, an error flag will be set at step 1647. In this case, message unwrap procedure CA1 ends at step 1648. If message CA1 passes the form check at step 1645, processing continues at step 1646 where the value of label-value pair 5117 is saved in a temporary register. Message unwrap procedure CA1 is complete at step 1648.

Referring again to FIG. 24, processing resumes at step 1710A. If error flags were set at step 1647, processing continues at step 1710B where merchant error processing procedures are invoked.

If no flags were set at step 1647, processing continues at step 1711A. There, merchant computer 300 assembles message CA2 (FIG. 31A) according to message assembly procedure CA12, shown in FIG. 27. Message assembly procedure CA12 was previously described for message CA1 with the following noted exception: DES-key DES-CA2 is generated (rather than DES key DES-CA1) using CA-DES-key procedure 1600. The content of message CA2, as shown in FIG. 31A is as follows:

Label-value pair 5213A has the label "type". The value of label-value pair 5213A references a record in server message data structure 150 which sets forth the labels comprising message CA2. The value of label-value pair 5213A is obtained from merchant application software 310.

Label-value pair 5213B has the label "version" and references a record relating to the type record as described above. The value of label-value pair 5213B contains information regarding the form and content of label-value pairs 5213A, 5213C, 5213D, and 5213E and information to decrypt and parse label-value pairs 5217.1 and 5217.2. As will be discussed later, additional information regarding the form and content of label-value pairs 5217.1 and 5217.2 is provided in label-value pair 5217.1B. The value of label-value pair 5213B is retrieved by merchant application software 310 from message data structure 380 (FIG. 6A).

Label-value pair 5213C has the label "session-id". The value of label-value pair 5213C is obtained from the session-id of field 340A (FIG. 6E).

Label-value pair 5213D has the label "index". The value of label-value pair 5213D is an integer assigned by merchant application software 310 to a transaction within a session and represents a use of the session key stored in field 240B.

Label-value pair 5213E has the label "service-category". The value of label-value pair 5213E is a label which may be used to route message CA2 to a processor within server computer 100 that handles messages of a particular service category.

Message CA2 includes merchant-opaque label-value pair 5217.1 and customer-opaque label-value pair 5217.2. Label-value pairs 5217.1 and 5217.2 have the labels "merchant-opaque" and "customer-opaque", respectively, signifying that the values which follow are encrypted data. The value of label-value pair 5217.1 represents the data which was base-64 encoded at step 1630. The value of label-value pair 5217.2 is the value of label-value pair 5117 (forwarded by customer computer 200 in message CA1) and saved in the temporary register at step 1646.

The opaque section contents of message CA2 are shown in FIG. 31B where label-value pair 5217.1A has the label "type". The value of label-value pair 5217.1A references a record in message data structure 150 which sets forth the labels of the opaque section contents of message CA2. The value of label-value pair 5217.1A is obtained from merchant application software 310.

Label-value pair 5217.1B has the label "version" and references a record within the type record referenced by label-value pair 5217.1A. As previously discussed, label-value pair 5217.1B permits the sender of a message to advise the recipient of the message what version of that message was sent and to instruct the recipient how to parse and process that version. Label-value pair 5217.1B advises server computer 100 of the form and content of the opaque label-value pair 5217.1. The value of label-value pair 5217.1B is obtained from merchant application software 310.

The present invention preferably allows merchant computer 300 to submit "n" CA1 messages received from one or more customer computers 200 to server computer 100 in a single message CA2. In the current invention, the variable "n" is an integer ranging from 1 through 255. A different range could be established depending on system capacity and other factors. Message CA2 is structured such that transparent label-value pairs 5113A–5113D and 5113F–5113H of a received message CA1 are included in opaque label-value pair 5217.1. For each message CA2 submitted by merchant computer 300 to server computer 100, message CA2 includes label-value pairs 5217.1C–5217.1I (corresponding to label-value pairs 5113A–5113D and 5113F–5113H) and 5217.1J. More specifically:

Label-value pair 5217.1C has the label "type$_n$" and the value of label-value pair 5117A.

Label-value pair 5217.1D has the label "subversion$_n$" and the value of label-value pair 5117B.

Label-value pair 5217.1E has the label "payer-session-id$_n$" and the value of label-value pair 5117C.

Label-value pair 5217.1F has the label "payer-index$_n$" and the value of label-value pair 5117D.

Label-value pair 5217.1G has the label "note-hash$_n$" and the value of label-value pair 5117F.

Label-value pair 5217.1H has the label "payee-id$_n$" and the value of label-value pair 5117G.

Label-value pair 5217.1I has the label "order-id$_n$" and the value of label-value pair 5117H.

Label-value pair 5217.1J has the label "merchant-amount$_n$". The value of label-value pair 5217.1J is provided by merchant application software 310 and describes the currency and the amount that merchant user 303 intends to receive for the product.

Referring again to FIG. 24, processing continues at step 1711B where merchant computer 330 updates its local data structures as follows.

A new record 350.1 is created in merchant amount data structure 350 for the "n" CA1 messages included in message CA2. The order id from label-value pair order-id-n is stored in field 350A. The merchant-amount from label-value pair merchant-amount-n is stored in field 350B.

Record 370.1 (FIG. 7C) is updated as follows.

Status field 370B is set to "attempt" by merchant application software 310. Merchant user 303's session-id from label-value pair 5213C is stored in field 370G. The merchant user 303's index from label-value pair 5213D is stored in field 370H. The session-id of customer user 203 from label-value pair 5217.1E is stored in field 370D. The index of customer user 203 from label-value pair 5217.1F is stored in field 370E. The merchant currency is taken from the currency symbol value in label-value pair 5217.1J and saved in field 370I. The amount merchant expects to be paid is taken from the amount value in label-value pair 5217.1K and stored in field 370J.

Referring again to FIG. 24, processing continues at step 1712. There, merchant computer 300 transmits message CA2 to server computer 100. Merchant computer 300 waits for a reply message CA3 from server computer 100.

At step 1713A, server computer 100 receives message CA2 from merchant computer 300 and saves a copy of the value of label-value pair 5213D of message CA2 in index field 130LL.1 (FIG. 4J) and a copy of message CA2 in field 130LL.2. At step 1713B, server unwraps message CA2 by executing server message unwrap procedure 1660. Server message unwrap procedure 1660 for message CA2 is now described with reference to FIGS. 32A and 32B, where it begins at step 1661.

At step 1662, server software 110 extracts the protocol number from field 5205C of header 5205 of message CA2. Next, based upon the extracted protocol number, message data structure 150 is accessed to determine the expected format of message CA2. The expected format may include message syntax (e.g.,, permitted end-of-line characters) and message coding (e.g., ASCII or hex). Message CA2 is parsed in accordance with the expected format as follows.

At step 1663, server computer 100 calculates a checksum using the same data used by merchant computer 300 at step 1633 of message assembly procedure CA12 for message CA2. At step 1664, the checksum calculated at step 1663 is compared to the checksum of trailer 5250 of message CA2. If the checksums are not equal, message CA2 is discarded at step 1664A where server message unwrap procedure 1660 terminates.

If the checksums are equal at step 1664, processing continues at step 1665A where the message is checked to determine if it is appropriate for message unwrap procedure 1600. A message is appropriate if it includes the label "type" in the transparent part of the message and the value indicating a message CA2. If the message does not include this label-value pair, it is not appropriate and processing continues at step 1665B where the message is diverted to another unwrap procedure described elsewhere. Message CA2 is appropriate; therefore, processing continues at step 1665C. There, the value of merchant-opaque label-value pair 5217.1 is decoded.

At step 1666, server software 110 independently generates DES key DES-CA2 independently from merchant computer 300, according to CA-DES-key generation process 1600, described previously.

At step 1667, the 56-bit DES key DES-CA2 generated by server computer 100 is stored in a temporary register.

Processing continues at step 1668. There, merchant-opaque label-value pair 5217.1 is decrypted using DES key DES-CA2.

At step 1668A, the success or failure of the decryption of label-value pair 5217.1 is determined. If the decryption fails for any reason, an error flag is set at step 1681 and server message unwrap procedure 1660 terminates at step 1682.

If the decryption is successful, processing continues at step 1668B. There, server computer 100 determines whether merchant user 303 has a valid session open. Server computer 100 obtains the session id number of merchant from label-value pair 5213C. The session id is used to obtain merchant record 130.2 for the session identified in label-value pair 5213C. The opening date stored in field 130GG is then compared with the date as determined by reference to server computer 100's clock and the time that has elapsed since the creation of the session calculated. If the amount of time that has elapsed since the creation of the session exceeds the value in key-lifetime field 130JJ, the session is invalid. In addition, if the value in index label-value pair 5213D exceeds the value of the key-use limit stored in field 130II, the session use is invalid. If the session is invalid, a session-closed flag is set at step 1681 and CA2 unwrap procedure terminates at step 1682 and payment process 1700 continues at step 1714.

If the session is valid, at step 1668C, the message type is determined by reference to label-value pair 5217.1A. For example, value of label-value pair 5217.1A for message CA2 may be "cash-collection."

Processing continues at step 1669. There, server computer 100 performs a check of the form of message CA2. The form check procedure of step 1669 is software version dependent. That is, the expected form of the message, and the criteria that determine whether it is acceptable, depend on the message and any variations of the message that are valid at a given time as determined by reference to message type and version data structure 150 as previously described. At a minimum, the form check procedure will ascertain whether an incoming message contains all the labels that are prescribed for that message, whether there are values for each label that requires a value, and whether the values are of the type (e.g., text, signed numbers), syntax and within any specified limits as required. If a message can be parsed but does not meet a form criteria, server computer 100 will set an error flag at step 1681 and return an error code in message CA3 (described below). In this case, server message unwrap procedure 1660 for message CA2 terminates at step 1682.

If message CA2 passes the form check at step 1669, processing continues at step 1670.

At step 1670, the authentication code of merchant user 303 represented by label-value pair 5217.1K is verified (check) as follows. Server software 110 obtains the 8-byte salt of field 130CC. Server software 110 then accesses message data structure 150 to determine which label-value pairs were hashed at step 1627 of message assembly procedure CA12 for message CA2 to compute the value of label-value pair 5217.1K. Server software 110 then hashes those same label-value pairs. The 8-byte salt of field 130CC is added as both a prefix of and a suffix to the label-value pairs before the hash is computed. This hash value is compared to the value of label-value pair 5217.1K. If the values differ, an appropriate error flag is set at step 1681. In this case, server message unwrap procedure 1660 for message CA2 terminates at step 1682. If the values match, processing continues at step 1671.

At step 1671, variable "n" is initialized to one. The value of variable "n", as described above, represents the $n^{th}$ CA1 message included in message CA2.

At step 1672, server software 110 generates DES key DES-CA1, according to CA-DES-key generation process 1600. DES key DES-CA1 generated by server computer 100 is stored in a temporary register.

At step 1673, customer-opaque label-value pair 5217.2 is decrypted using DES key DES-CA1.

At step 1674, the success or failure of the decryption of label-value pair 5217.2 is determined. If the decryption fails for any reason, an error flag is set at step 1678 and processing continues at step 1679. There, it is determined if there are more CA1 messages to process. If so, processing continues at step 1680. If not, server message unwrap procedure 1660 terminates at step 1682.

If the decryption of label-value pair 5217.2 is successful, processing continues at step 1675. <cr> At step 1675, if the merchant 303 has a valid open session, server computer 100 determines whether the customer user 203 associated with the nth payment request included in message CA2 has a valid session open. Server computer 100 obtains the session id number of customer user 203 from label-value pair 5217.1 E. The session is used to obtain customer session record 130.1 for the session identified in label-value pair 5217.1 E. The opening date stored in field 130G is then compared with the date as determined by reference to server computer 100's clock and the time that has elapsed since the creation of the session calculated. The session is invalid if the amount of time that has elapsed since the creation of the session exceeds the value in key-lifetime field 130J. The transaction is invalid if the value in index label-value pair 5217. IF exceeds the value of the key-use limit stored in field 130I. If the session is invalid, a session-closed flag is set at step 1678 and processing continues at step 1679. There, it is determined whether there are more CA1 messages to process. If so, processing continues at step 1680. If not, server message unwrap procedure 1660 terminates at step 1682.

At step 1676, the authentication code of customer user 203 represented by label-value pair 5117B of message CA1 is verified as follows. Server software 110 obtains the 8-byte salt of field 130C. Server software 110 then accesses message data structure 150 to determine which label-value pairs were hashed at step 1627 of message assembly procedure CA12 for message CA1 to compute the value of label-value pair 5117B. Server software 110 then hashes those same label-value pairs. The 8-byte salt of field 130C is added as both a prefix of and a suffix to the label-value pairs before the hash is computed. This hash value is compared to the value of label-value pair 5117B. If the values differ, an appropriate error flag is set at step 1678 and processing continues at step 1679. There, it is determined if there are more CA1 messages to process. If not, server message unwrap procedure 1660 terminates at step 1682. If so, processing continues at step 1680. If the values match at step 1675, processing continues at step 1676.

If customer user $_2$03's session is valid, processing continues at step 1667.

At step 1677, payment to merchant user 303 is effected. For customer user 203, this means deducting the amount reflected in amount label-value pair 5217.2A from the current amount of field 130F and capturing transaction data 130N of record 130.1. Transaction data 130N is shown in FIG. 4I where the following data is captured: The amount in label-value pair 5217.2A is stored in field 130N.1; the customer session-id from label-value pair 5217.1E is stored in field 130N.2; the order-id from label-value pair 5217.1I is stored in field 130N.3; the merchant session-id from label-value pair 5213C is stored in filed 130N.4; and the customer index from label-value pair 5217.1F is stored in field 130N.5.

For merchant user 303, this payment means adding the amount reflected in amount field 5117A to the current amount of field 130FF and capturing transaction data 1 30NN of record 130.2.130.1. Transaction data 130NN is shown in FIG. 4K where the following data is captured: The amount in label-value pair 5217.2A is stored in field 130NN.1; the customer session-id from label-value pair 5217.1E is stored in field 130NN.2; the order-id from label-value pair 5217.1I is stored in field 130NN.3; the merchant session-id from label-value pair 5213C is stored in filed 130NN.4; and the merchant index from label-value pair 5213D is stored in field 130NN.5.

At step 1679, server software 110 determines whether message CA2 includes additional messages CA1 to be processed. If there are additional CA1 messages to be processed, variable "n" is incremented at step 1680 and processing continues at step 1672 as previously described. If there are no additional CA1 messages to process, server message unwrap procedure 1660 for message CA2 terminates at step 1682.

Processing continues at step 1714 of FIG. 24. There, if error flags were set at step 1681 as a result of the checks of steps 1664, 1668A, 1668B, 1669, or 1670, processing continues at step 1681. There, the type of error will cause an appropriate code to be associated with response-code label-value pair 5317.1C and a message to be associated with label-value pair 5317.1E. The level of detail detected by error flags and reported in the response-code label-value pair is a decision for the system administrator. For example, a "failure" may be a "hard failure", that is, a failure of a subset of failures for which resubmission of the message would not result in processing of the message (e.g., invalid format or session closed). "Failure" could also encompass a failure which can be cured (a time-out because of a temporary outage of server computer 100). In the discussion which follows, the term failure will be used in its broad context.

If no flags were set at step 1681, processing proceeds to step 1716 where server computer 100 determines whether the checks at steps 1674, 1675, and 1676 of the payment request messages caused an error flag to be set at step 1678. If the nth CA1 message caused a flag to be set, at step 1717 the value of label-value pair 5317.1K (response-code-n)and label-value pair 5317.2A (response code) will be set to failure; and label-value pair 5317.1N (problem-n) and label-value pair 5317.2E (problem) will assigned a value of a code associated with the value of label-value pair 5317.1K. If the operator of server computer 100 deems it desirable, a free form message regarding the failure can be included in label-value pair 5317.1L (remark-n) and label-value pair 5317.5A (remark).

Figure 33:
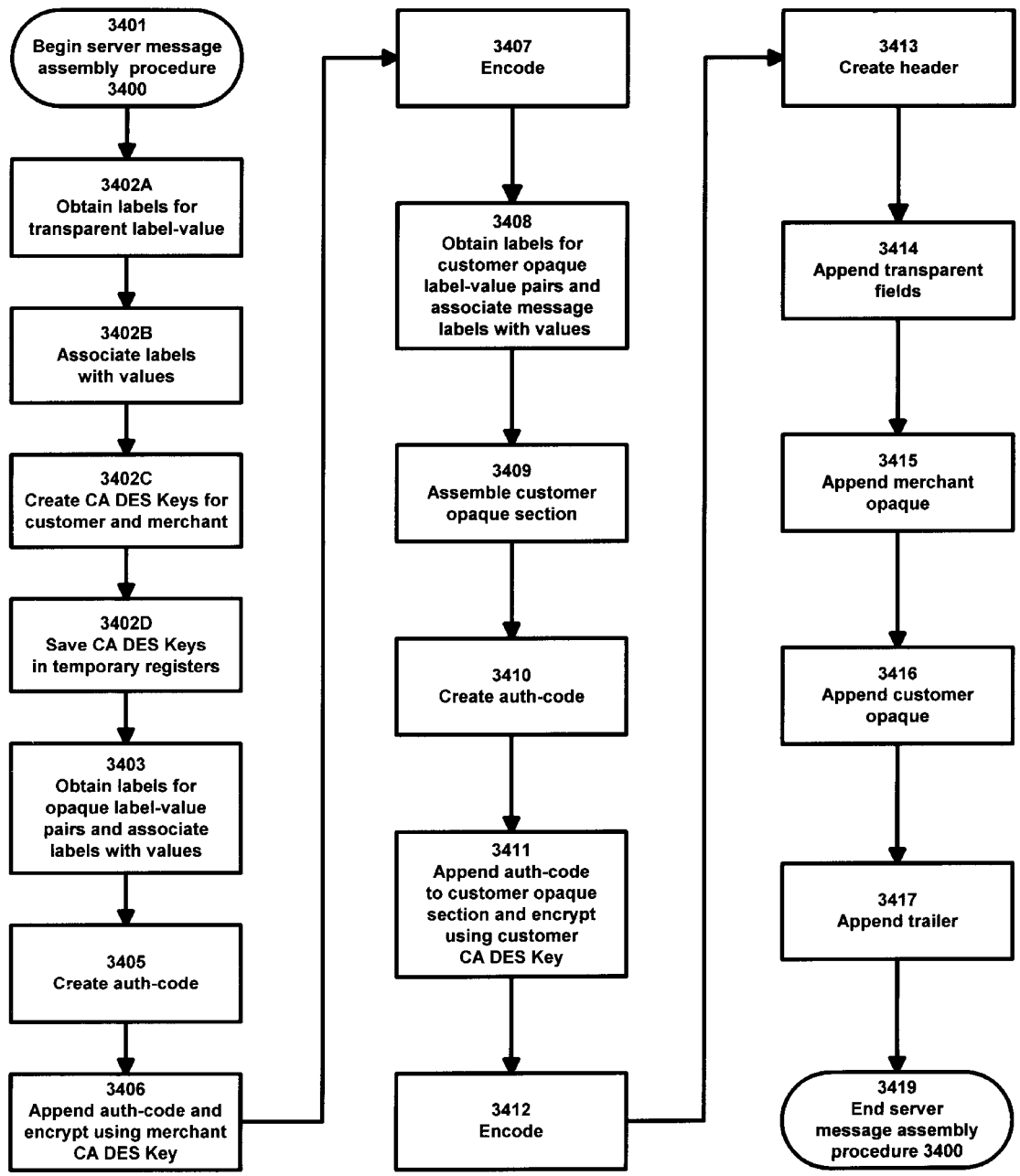
FIG. 33 depicts a flow diagram illustrating server message assembly procedure 3400.
Figure 35:
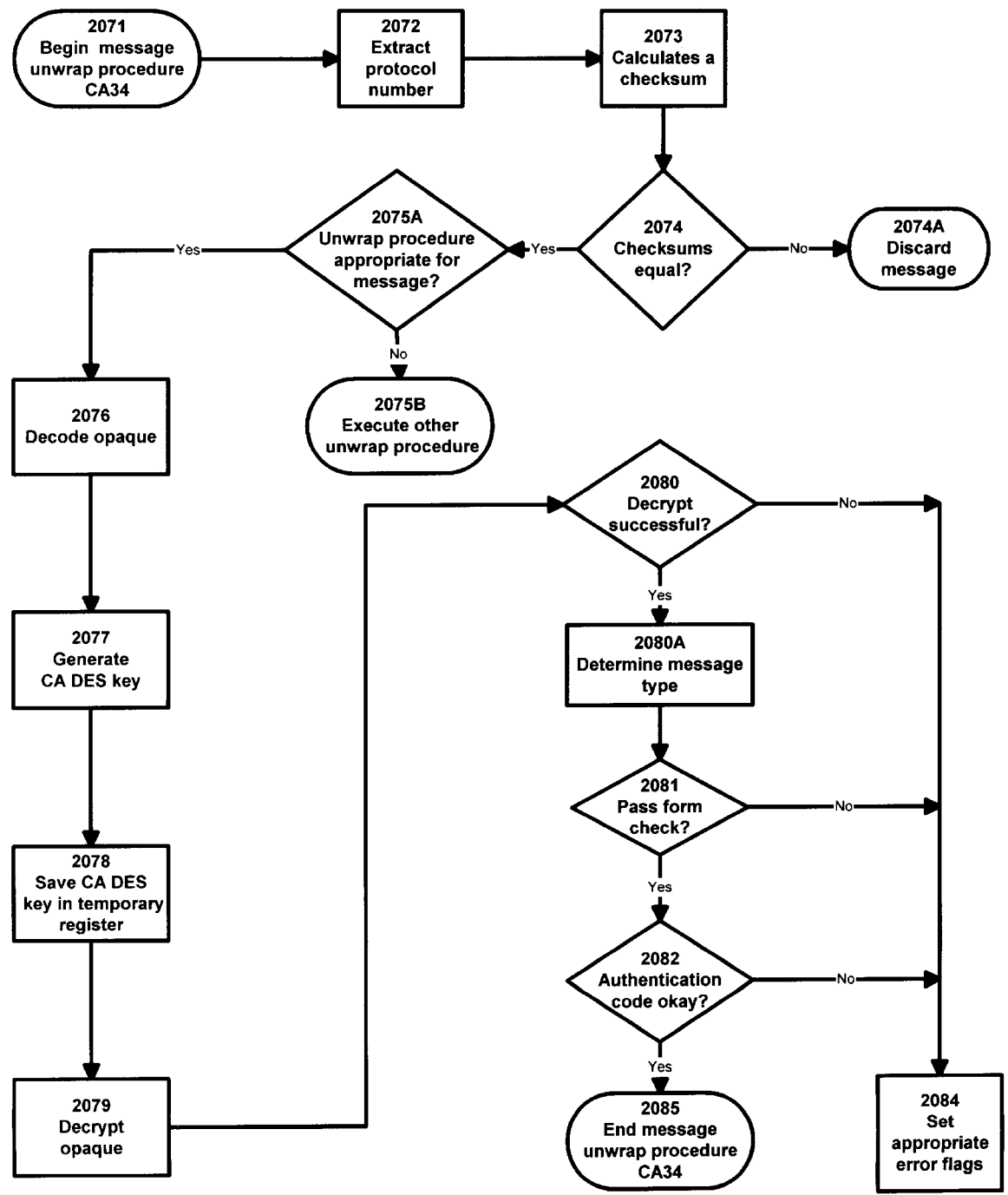
FIG. 35 depicts a flow diagram illustrating message unwrap procedure CA34.

At step 1718A, server computer 100 assembles message CA3 according to server message assembly procedure 3400, shown in FIG. 33.

Server message assembly procedure 3400 for message CA3 begins at step 3401.

At step 3402A, server software 110 accesses message type and version data structure 150 to obtain a list of labels, which, when matched up with associated values, make up the transparent label-value pairs 5313A–5313E for message CA3, shown in FIGS. 34A and 34B. At step 3402B, values are associated with each label as follows.

Label-value pair 5313A has the label "type". The value of label-value pair 5313A references a record in message data structure 380 which sets forth the labels of message CA3. The value of label-value pair 5313A is obtained from server software 110.

Label-value pair 5313B has the label "version" and references a record relating to the record referenced by label-value pair 5313A. As previously discussed, label-value pair 5313B permits the sender of a message to advise the recipient as to the version of that message and how to parse and process that version. Because message CA3 is in response to message CA2 sent by merchant computer 300, the version of message CA3 will be selected by server software 110 to assure that it can be processed by merchant application software 310. Label-value pair 5313B advises merchant application software 310 of the form and content of the transparent label-value pairs 5313A, 5313C, 5313D, and 5313E. The value of label-value pair 5313B is obtained from merchant application software 310.

Label-value pair 5313C has the label "session-id". The value of label-value pair 5313C is obtained from the session-id of field 130AA of merchant session data structure 130.

Label-value pair 5313D has the label "index". The value of label-value pair 5313D is obtained from the index of field 130LL of merchant session data structure 130.2.

Label-value pair 5313E has the label "service-category". The value of label-value pair 5313E is a label which may be used by merchant computer 300 to route message CA3 to a processor within merchant computer 300 that handles messages of a particular service category.

At step 3402C, server software 10 generates 56-bit DES keys DES-CA3-C-n and DES-CA3-M. DES keys DES-CA3-C-n and DES-CA3-M will be used to encrypt data to be received by customer computer 200 and merchant computer 300, respectively. DES keys DES-CA3-C and DES-CA3-M are generated according to CA-DES-key generation process 1600, previously described.

Referring again to FIG. 33, message assembly procedure CA3 continues at step 3402D. There, DES keys DES-CA3-C-n and DES-CA3-M are stored in temporary registers.

At step 3403, server software 10 accesses message template data structure 150 to obtain a list of labels, which, when matched up with associated values, make up the merchant-opaque section contents of message CA3 (FIG. 34B). Values are associated with each label as follows.

The merchant-opaque section contents of message CA3 are shown in FIG. 34B where label-value pair 5317.1A has the label "subtype". The value of label-value pair 5317.1A is a label referencing a record in message data structure 380 which includes the labels of the merchant-opaque section contents for message CA3. The value of label-value pair 5317.1A is obtained from server software 110.

Label-value pair 5317.1B has the label "subversion". The value of label-value pair 5317.1B is a code maintained in message data structure 150 which permits processing variations of a message type as are valid at a given time.

Label-value pair 5317.1C has the label "response-code" and the value "success" or "failure" as previously described. Label-value pair 5317.1C indicates whether the transaction presented to server computer 100 by message CA2 was a success, failure, etc. The value of label-value pair 5317.1C is obtained at step 1715 described above from server software 110.

Label-value pair 5317.1D has the label "fee". The value of label-value pair 5317.1 D indicates a fee charged to merchant user 303, if any, associated with processing message CA2. The value of label-value pair 5317. ID is obtained from server software 110.

Label-value pair 5317.1E has the label "problem". If the response-code value of label-value pair 5317.1C has other than a "success" value, the value of label-value pair 5317.1E is a code advising merchant user 303 as to the cause for the non-success. The value of label-value pair 5317.1E is obtained at step 1715 described above from server software 110.

Label-value pair 5317.1F has the label "remark". If the response-code value of label-value pair 5317.1C has other than a "success" value, the value of label-value pair 5317.1F is a free form text message providing a detailed explanation of the reason for the non-success. The value of label-value pair 5317.1F is obtained at step 1715 described above from server software 110.

Message CA3 includes the following label-value pairs 5317.1G–5317.1P for each of the "n" CA1 messages submitted with message CA2:

Label-value pair 5317.1G has the label "subtype$_n$" and the value of label-value pair 5217.1C of message CA2.

Label-value pair 5317.1H has the label "subversion$_n$" and the value of label-value pair 5217.1D of message CA2.

Label-value pair 5317.1I has the label "payer-session$_n$" and the value of label-value pair 5217.1E of message CA2.

Label-value pair 5317.1J has the label "payer-index$_n$" and the value of label-value pair 5217.1F of message CA2.

Label-value pair 5317.1K has the label "response-code$_n$" and the value "success" or "failure" as previously described. The value of label-value pair 5317.1K is obtained at step 1717 described above from server software 110.

Label-value pair 5317.1L has the label "remark$_n$". If the response-code value of label-value pair 5317.1K has other than a "success" value, the value of label-value pair 5317.1L is a free form text message providing a detailed explanation of the reason for the non-success. The value of label-value pair 5317.1L is obtained at step 1717 described above from server software 110. Label-value pair 5317.1M has the label "collected-amount$_n$" and the value indicating the amount of electronic cash collected by merchant user 303 for the transaction (at step 1677 of server message unwrap procedure 1660 for message CA2).

Label-value pair 5317.1N has the label "problem$_n$". If value of label-value pair 5317.1K has other than a "success" value, the value of label-value pair 5317.1N is a code advising customer user 203 as to the cause for the non-success. The value of label-value pair 5317.1N is obtained at step 1717 described above from server software 110.

Label-value pair 5317.1O has the label "order-id$_n$". The value of label-value pair 5317.1O is obtained from label-value pair 5217.1I of message CA2.

Label-value pair 5317.1P has the label "request-version". The value of label-value pair 5317.1P represents the version of message CA2 actually processed by server computer 100. <cr> Referring again to FIG. 33, at step 3405, an authentication code for the merchant-opaque section of message CA3, represented by label-value pair 5317.1Q of FIG. 34B, is created. Label-value pair 5317.1Q has the label "auth-code". The value of label-value pair 5317.1Q represents the authentication code of server computer 100. For the merchant-opaque section of message CA3, the value of label-value pair 5317.1Q is an MD5 hash of the concatenation of the following: 8-byte salt of field 130CC, label-value pairs 5313A–5313E and 5317.1A–5317.1P, and the 8-byte salt of field 130CC. Prior to hashing, all white space embedded in label-value pairs 5313A–5313E and 5317.1A–5317.1P is removed.

At step 3406, label-value pair 5317.1Q, created at step 3405, is appended to label-value pairs 5317.1A–5317.1P. Label-value pairs 5317.1A–5317.1Q are encrypted using the 56-bit DES key DES-CA3-M.

At step 3407, data encrypted at step 3406 is encoded using well known techniques.

At step 3408, server software 110 accesses message template data structure 150 to obtain a list of labels, which, when matched up with associated values, make up the customer-opaque section contents of message CA3. At step 3409, the customer opaque section is assembled. Values are associated with each label as follows.

The customer-opaque section contents of message CA3 are shown in FIG. 34 where label-value pair 5317.2A has the label "response-code" and the value "success" or "failure". Label-value pair 5317.2A indicates whether the transaction presented to server computer 100 by message CA2 was a success, failure, etc. The value of label-value pair 5317.2A is obtained in step 1717 described above from server software 110.

Label-value pair 5317.2B has the label "remark". If the response-code value of label-value pair 5317.2A has other than a "success" value, the value of label-value pair 5317.2B is a free form text message providing a detailed explanation of the reason for the non-success. The value of label-value pair 5317.2B is obtained at step 1717 described above from server software 110.

Label-value pair 5317.2C has the label "foreign-exchange". The value of label-value pair 5317.2C provides updated information regarding a conversion rate from the currency denomination included in the value of label-value pair 5117A into other currencies. The value of label-value pair 5317.2C is obtained from server software 110.

Label-value pair 5317.2D has the label "amount" and a value indicating the amount of funds charged to customer user 203 for the transaction. The value of label-value pair 5317.2D is obtained from server software 110.

Label-value pair 5317.2E has the label "problem". If the response-code value of label-value pair 5317.2A has other than a "success" value, the value of label-value pair 5317.2E is a code advising customer user 203 as to the cause for the non-success. The value of label-value pair 5317.2E is obtained at step 1717 described above from server software 110.

Label-value pair 5317.2F has the label "order-id". The value of label-value pair 5317.2F is obtained from label-value pair 5217.1I of message CA2.

Label-value pair 5317.2G has the label "request-version". The value of label-value pair 5317.2G represents the version of message CA1 actually processed by server computer 110. <cr> Referring again to FIG. 33, at step 3410, an authentication code for the customer-opaque section of message CA3, represented by label-value pair 5317.2H of FIG. 34C, is created. Label-value pair 5317.2H has the label "auth-code". The value of label-value pair 5317.2H shown in FIG. 34C represents the authentication code of server computer 100. For the customer-opaque section of message CA3, the value of label-value pair 5317.2H is a hash of a concatenation of the following: 8-byte salt of field 130C, the values of label-value pairs 5313A–5313D and 5317.2A–5317.2G, and the 8-byte salt of field 130C. Prior to hashing, all white space embedded in the values of label-value pairs 5313A–5313D and 5317.2A–5317.2G is removed and a vertical bar separator character inserted between each adjacent pair of values.

At step 3411, label-value pair 5317.2H, created at step 3410, is appended to label-value pairs 5317.2A–5317.2G. Label-value pairs 5317.2A–5317.2H are encrypted using DES key DES-CA3-C-n.

At step 3412, data encrypted at step 3411 is encoded using well known techniques (preferably base 64).

Message CA3 is assembled at steps 3413–3417. At step 3413, header 5305 is created using the message template found at type and version data structure 150 and the protocol number as embedded in server software 110.

Next, at step 3414, transparent label-value pairs 5313A–5313D are added (appended). Label-value pairs 5213A–5213D were described previously.

At steps 3415 and 3416, merchant-opaque label-value pair 5317.1 and customer-opaque label-value pair 5317.2 are appended. Label-value pairs 5317.1 and 5317.2 have the labels "merchant-opaque" and "customer-opaque", respectively, signifying that the values which follow are encrypted data. The value of label-value pair 5317.1, represents the data which was encoded at step 3407. The value of label-value pair 5317.2 represents the data which was encoded at step 3412 (which will be forwarded to customer computer 200 in message CA4).

Trailer 5350 is assembled at step 3417. The checksum of trailer 5350 is calculated as described above with respect to sample message 4000. Trailer 5350 is added (appended) to the remainder of message CA3.

The assembly of message CA3 is complete. Message assembly procedure 3400 for message CA3 ends at step 3419.

At step 1719, merchant computer 300 receives message CA3 from server computer 100 and unwraps message CA3 by executing message unwrap procedure CA34. Message unwrap procedure CA34 for message CA3 is now described with reference to FIG. 35, where it begins at step 2072.

At step 2072, merchant software 310 extracts the protocol number from header 5305 of message CA3. Next, based upon the extracted protocol number, message data structure 380 is accessed to determine the expected format of message CA3. The expected format may include message syntax (e.g., permitted end-of-line characters) and message coding (e.g., ASCII or hex). Message CA3 is parsed in accordance with the expected format as follows.

At step 2073, merchant computer 300 calculates a checksum using the same data used by server computer 100 at step 3417 of message assembly procedure 3400 for message CA3. At step 2074, the checksum calculated at step 2073 is compared to the checksum of trailer 5350 of message CA3. If the checksums are not equal, message CA3 is discarded at step 2074A where message unwrap procedure CA34 terminates.

If the checksums are equal at step 2074, processing continues at step 2075A where the message is checked to determine if it is appropriate for message unwrap procedure CA34. A message is appropriate if it includes the label "type" in the transparent part of the message and the value indicating a message CA3 or CA4. If a message does not include this label-value pair, it is inappropriate. Processing of inappropriate message occurs at step 2075B where the message is diverted to another unwrap procedure described elsewhere. Message CA3 is appropriate; therefore, processing continues at step 2076 where the value of merchant-opaque label-value pair 5317.1 is decoded.

At step 2077, merchant application software 310 generates the same DES key DES-CA3-M generated by server software 10 according to CA–DES-key generation process 1600.

At step 2078, DES key DES-CA3-M is stored in a temporary register.

At step 2079, DES key DES-CA3-M is used to decrypt the value of merchant-opaque label-value pair 5317.1.

A check of message CA3 is then performed at step 2080 as follows.

At step 2080, the success or failure of the decryption of label-value pair 5317.1 is determined. If the decryption fails for any reason, an error flag is set at step 2084 and message unwrap procedure CA34 terminates at step 2085.

If the decryption is successful, at step 2080A, the message type is determined by reference to label-value pair 5317.1A. For example, value of label-value pair 5317.1A for message CA3 may be "cash-batch-receipt."

Processing continues at step 2081. There, merchant computer 300 performs a check of the form of message CA3. The form check procedure of step 2081 is software version dependent. That is, the expected form of the message, and the criteria that determine whether it is acceptable, depend on the message and any variations of the message that are valid at a given time as determined by reference to message type and version information provided in message CA3 and message template structure 380 as previously described. At a minimum, the form check procedure will ascertain whether an incoming message contains all the labels that are prescribed for that message, whether there are values for each labels that requires a value, and whether the values are of the type (e.g., text, signed numbers), syntax and within any specified limits as required. If a message cannot be parsed, or can be parsed but does not meet a form criteria, merchant computer 300 will set an error flag at step 2084 and message unwrap procedure CA34 terminates at step 2085.

If message CA3 passes the form check at step 2081, processing continues at step 2082. There, the authentication code represented by label-value pair 5317.1P is verified as follows. Merchant software 310 obtains the 8-byte salt of field 340C (FIG. 6E). Based on the value of subtype label-value pair 5317.1A and subversion label-value pair 5317.1B, merchant application software 310 accesses message template data structure 380 to determine which label-value pairs were hashed at step 3405 of message assembly procedure CA3 to compute the value of label-value pair 5317. IP. Merchant application software 310 then adds the 8-byte salt of field 340C as both a prefix of and a suffix to the values of those same label-value pairs and computes the hash of the result. This hash value is compared to the value of label-value pair 5317.1Q. If the values differ, an appropriate error flag is set at step 2084. Message unwrap procedure CA34 terminates at step 2085.

Referring again to FIG. 24, processing continues at step 1720. There, (1) if an error flag was set at step 2084, the flag will be detected at step 1720 and processing of message CA3 will terminate at step 1721.

(2) if no error flag was set at step 2084 but an error in message CA2 was detected at step 1681, processing will continue at step 1722 where the content of label-value pair 5317.1C is checked. If the value of label-value 5317.1C is other than "success", error processing routines are performed at step 1723 causing merchant application software 310 to display the message contained in label-value 5317.1F associated with the content of label-value 5317.1C. Merchant application software 310 will also interpret the value of label-value 5317.1E and take whatever action may be associated with that value and CA3 message processing ends at step 1733; or (3) if message CA3 passed the check at step 1720 and step 1722, processing continues at step 1724 where merchant computer 300 updates local data structure as follows.

Record 350.1 (FIG. 7A) is updated to reflect whether a payment request was paid. Field 350C contains a flag which is set to either "paid" or "not-paid", depending on whether the response-code from label-value pair 5317.1C is "success" or "failure". Similarly, record 370.1 (FIG. 7C) is updated to reflect the status of a particular payment request. Field 370B, which is set to "attempt" at the time a particular payment request is sent to server computer 100 in message CA2, is set to "success" or "failure" depending on whether the response-code from label-value pair 5317.1C is "success" or "failure". The result code from label-value pair 5317.1E is stored in field 370M. The fee paid by merchant user 303 for processing of the payment request from label-value pair 5317.1D is stored in field 370L. The amount collected by merchant user 303 for a particular payment request from label-value pair 5317.1M is stored in field 370K and is added to field 360F of record 360.1 of sales session data structure 360.

Figure 36:
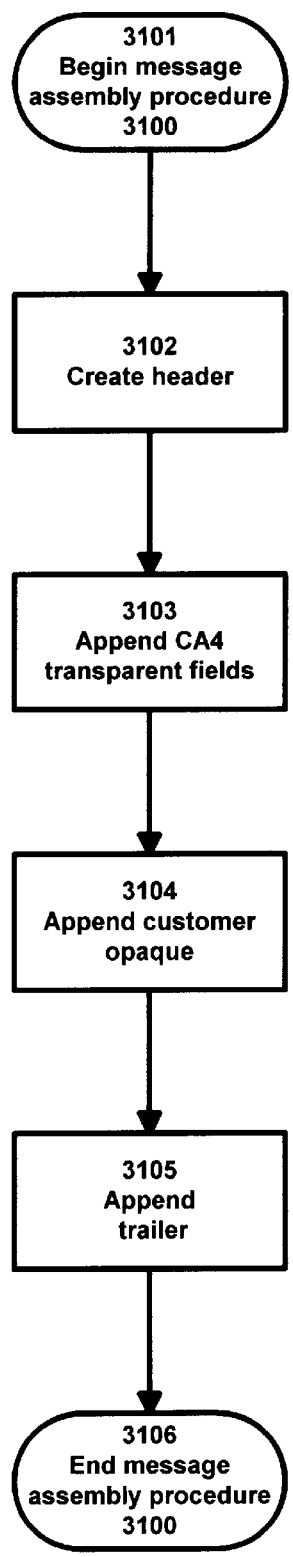
FIG. 36 depicts a flow diagram illustrating message assembly procedure 3100.

At step 1725, merchant computer 300 assembles message CA4 according to message assembly procedure 3100, shown in FIG. 36. Message CA4 is shown in FIGS. 37A and 37B.

Message assembly procedure 3100 for message CA4 begins at step 3101. At step 3102, header 5405 is created using the message template found at message data structure 380 and the protocol number protocol as embedded in merchant application software 310.

Next, at step 3103, transparent label-value pairs 5413A–5413G are added (appended).

Label-value pair 5413A has the label "type". The value of label-value pair 5413A references a record in message data structure 270 (FIG. 5A) which sets forth the labels of message CA4. The value of label-value pair 5413A is obtained from merchant application software 310.

Label-value pair 5413B has the label "version" and references a record relating to the record referenced by label-value pair 5413A. As previously discussed, label-value pair 5413B permits the sender of a message to advise the recipient as to the version of that message how to parse and process that version. Because message CA4 is in response to message CA1 from customer user 203, the version used by merchant application software 310 to construct message CA4 will be selected by merchant application software 310 to assure that it can be processed by customer application software 210. Label-value pair 5313B advises customer application software 210 of the form and content of both the transparent label-value pairs 5413A, 5413C and 5413D and the opaque label-value pair 5417. The value of label-value pair 5413B is obtained from merchant application software 310.

Label-value pair 5413C has the label "session-id" and a value indicating the current session id for customer user 203. Merchant computer 300 obtains the value of label-value pair 5413C from the session-id value of label-value pair 5113C of message CA1.

Label-value pair 5413D has the label "index". The value of label-value pair 5413D is an integer selected from a range of unused values indicating each time different transactions with a session is attempted. Merchant user 303 obtains the value of label-value pair 5413D from the index value of label-value pair 5113D of message CA1.

Label-value pair 5413F has the label "order-id". The value of label-value pair 5413F indicates the order identification number generated by merchant computer 300 to identify the order. The value of label-value pair 5413F is the same as that provided in label-value pair 5013C of message PR1.

Label-value pair 5413G has the label "service-category". The value of label-value pair 5413G is a label which may be used by customer computer 100 to route message CA4 to a processor within customer computer 200 that handles messages of a particular service category.

At step 3104, opaque label-value pair 5417 is appended. Label-value pair 5417 has the label "opaque" signifying that the value which follows is encrypted data. The value of label-value pair 5417 represents the value of label-value pair 5317.2, forwarded from server computer 100 to merchant computer 300.

Trailer 5450 is assembled at step 3105. The checksum of trailer 5450 is calculated as described above with respect to sample message 4000. Trailer 5450 is added (appended) to the remainder of message CA4.

The assembly of message CA4 is now complete. Message assembly procedure 3100 ends at step 3106.

Referring again to FIG. 24, processing continues at step 1726. There, merchant computer 300 transmits message CA4 to customer computer 200.

At step 1727, customer computer 200 receives message CA4 from merchant computer 300 and unwraps message CA4 by executing message unwrap procedure CA34. Message unwrap procedure CA34 for message CA4 was previously described for message CA3 with reference to FIG. 35.

Referring again to FIG. 24, processing continues at step 1728. There, (1) if an error flag was set at step 2084, the flag will be detected at step 1728 and processing of message CA4 will terminate at step 1729; or (2) if no error flag was set at step 2084 but an error in message CA1 was detected at step 1678, processing will continue at step 1730 where the content of label-value pair 5417A is checked. If the value of label-value 5317A is other than "success", error processing routines are performed at step 1731 causing customer application software 210 to display the message contained in label-value 5417B associated with the content of label-value 5317.1C. Customer application software 210 will also interpret the value of label-value 5417E and take whatever action may be associated with that value and processing message CA4 will terminate at step 1733; or (3) if message CA4 passed the check at step 1728 and step 1730, processing continues at step 1732 where customer computer 200 updates its data structures as follows.

Customer computer 200 compares the value contained in label-value pair 5417D with the value of label-value pair 5117A. If the values are different, customer computer 200 adjusts the current amount field 240D to reflect the amount actually deducted from current amount field 130F as maintained by server computer 100. In addition to the values recorded in customer session data structure 240, a new record 263 of customer log data structure 260 is created as follows: The date from label-value pair 5413E is stored in field 263C. The response-code from label-value pair 5417A is stored in field 263D. The remark from label-value pair 5417B associated with the response code from label-value pair 5417A is stored in field 263E. The amount from label-value pair 5417D is stored in filed 263J. The order-id from label-value pair 5417F is stored in field 263G. The session-id from label-value pair 5413C is stored in field 263L. The index from label-value pair 5413D is stored in field 263M.

G. Close Session Process 411

Close session process 411 may be used by customer user 203 to close a session.

Figure 38:
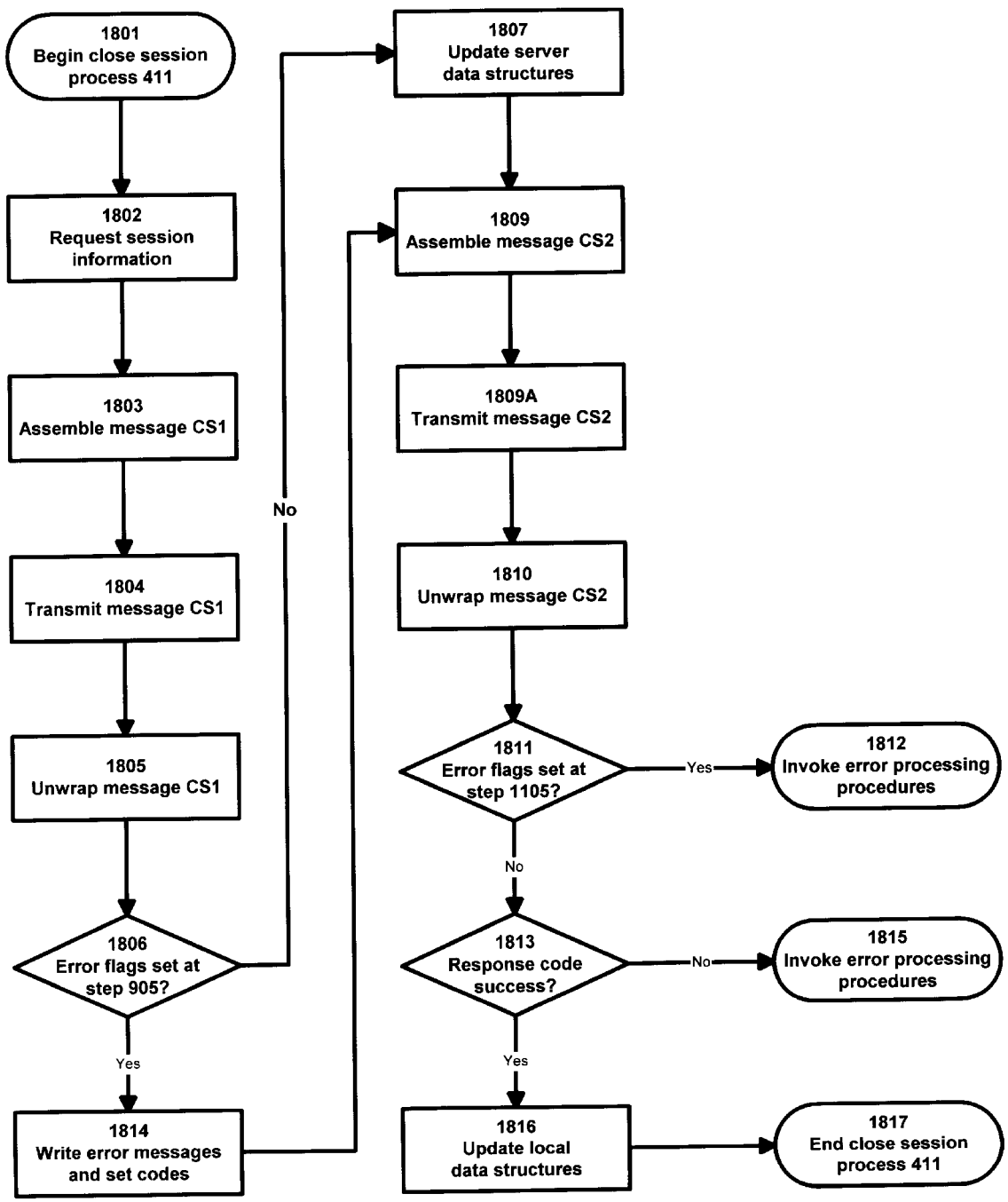
FIG. 38 depicts a flow diagram illustrating close session process 411.

FIG. 38 depicts a flow diagram illustrating close session process 411 which begins at step 1801.

At step 1802, customer application software 210 prompts (requests) customer user 203 to enter the identification number of the session to be closed, any record-note to be attached to a session, and whether customer user 203 desires a log of transactions submitted to server computer 100 by merchant 303 for customer user 203 during the session that is being closed. If customer user 203 has more than one session open, the prompt will include a list of all open sessions and request customer user 203 to select the session to close.

The content of message CS1 is now described with reference to FIGS. 39A and 39B.

Label-value pair 4813A has the label "id". The value of label-value pair 4813A indicates the persona id for customer user 203. The value of label-value pair 4813A is obtained from field 220A (FIG. 5C).

Label-value pair 4813B has the label "transaction". The value of label-value pair 4813B is a transaction number, generated by customer application software 210, which uniquely identifies message CS1. The value of label-value pair 4813B allows server computer 100, upon receipt of message CS1, (1) to send an associated reply message CS2, described below, and (2) to determine if message CS1 is a duplicate message (i.e., already received by server computer 100). The value associated with label-value pair 4813B is stored in field 256B.

Label-value pair 4813C has the label "date". The value of label-value pair 4813C indicates the date and time that message CS1 was assembled and sent to server computer 100, according to the clock of customer computer 200. The value associated with label-value pair 4813C is stored in field 256C.

Label-value pair 4813D has the label "serverkey". As previously described, the DES key/IV pair used by customer computer 200 to encrypt the opaque label-value pair 4817 of message CS1 is encrypted using an RSA public key of server computer 100. Label-value pair 4813D points to the corresponding RSA private key as stored in server private key data structure 160.

Label-value pair 4813E has the label "service-category". The value of label-value pair 4813E is a label which may be used by server computer 100 to route message CS1 to a processor within server computer 100 that handles messages of a particular service category.

Label-value pair 4817 is described next. Label-value pair 4817 has the label "opaque" signifying that the value which follows is encrypted data. The value of label-value pair 4817 represents the data which was encoded at step 813. The opaque section contents of message CS1 (FIG. 39B) is as follows:

Label-value pair 4817A has the label "type". Label-value pair 4817A references a record in message data structure 150 which sets forth the labels of the opaque section contents message CS1. The value of label-value pair 4817A is obtained from customer application software 210 which generates the label when customer user 203 initiates close session process 411.

Label-value pair 4817B has the label "server-date". The value of label-value pair 4817B indicates the date and time message CS1 was assembled. This date and time is customer computer 200's perception of server computer 100's clock.

Label-value pair 4817C has the label "swversion" (software version). The value of label-value pair 4817C indicates the version of customer application software 210 communicating with server computer 100 and is obtained from data embedded in customer application software 210. The value associated with label-value pair 4817C is also in field 256D.

Label-value pair 4817D has the label "record-note". The value of label-value pair 4817D is an optional short text note to be stored in field 130M of server session data structure 130 relating to the current close session process 411. The value of label-value pair 4817D is obtained from customer user 203's response to a prompt from customer application software 210 and is preferably limited to sixty characters to for convenience in display. If a record-note was created by customer user 203 during open session process 407, the value of label-value pair 4817D is added to the value previously stored in field 130M.

Label-value pair 4817E has the label "session-id". The value associated with label-value pair 4817E is obtained from field 240A of customer session data structure 240 and is stored in field 256F.

Label-value pair 4817F has the label "request-log". The value associated with label-value pair 4817F is either "yes" or "no". The value of label-value pair 4817F reflects whether customer user 203 has elected to receive a log of the transactions at step 1802. The value of label-value pair 4817F is stored in field 256G of customer pending data structure 250.

Label-value pair 4817G has the label "key". The value of label-value pair 4817H represents a hash of the modulus part of the RSA public/private key pair of customer persona 120.1. The value of label-value pair 4817G permits server computer 100 to confirm that the RSA public key maintained in field 120B (FIG. 4B) is the same key used to sign message CS1 (label-value pair 4817H).

Label-value pair 4817H has the label "signature". The value of label-value pair 4817I represents the digital signature of customer persona 120.1. For message CS1, the value of label-value pair 4817H is a hash of label-value pairs 4813A–4813E and label-value pairs 4817A–4817G in alphabetical order, encrypted with the RSA private key of customer persona 120.1. The RSA private key of customer persona 120.1 is obtained from field 220H.

At step 1803, message CS1 is assembled in accordance with message assembly procedure 800. Message assembly procedure 800 was previously described for message R1 with reference to FIG. 9. One noted exception: A copy of message CS1 is saved in field 256H.

Referring again to FIG. 38, close session process 411 continues at step 1804. There, customer computer 200 transmits message CS1 to server computer 100. Customer computer 200 waits for a reply message CS2 from server computer 100.

At step 1805, server computer 100 receives message CS1 from customer computer 200 and unwraps message CS1 by executing server message unwrap procedure 900 for message CS1. Server message unwrap procedure 900 was previously described for message R1 with reference to FIG. 11. A noted exception: a copy of message CS1 is stored in field 140E.

At step 1806, if any of the tests of steps 904, 909A, 912, 914, 915 or 916 caused an error flag to be set at step 905, error processing procedures are executed by server computer 100 at step 1814. While the level of error processing at step 1814 is largely an administrative decision, it is preferred that a minimum, failures of the signature, and form, and a "fatal" return on the software check procedure result in a return message containing a code that can be processed by customer application software 210 and a message that can be read by customer user 203. The error processing procedure in step 1814 entails associating a flag with a specific error code (described in the context of the return message CS2 below) and creating a text message (either from a data structure of messages or a message sent by the system administrator). Server computer 100 then generates a message CS2 similar to that described below to customer computer 200 conveying the error code and any related message.

If the tests of steps 904, 909A, 912, 914, 915 and 916 did not cause an error flag to be set at step 905, processing continues at step 1807. There, server computer 100 invalidates (updates server data structures) the session identified in label-value pair 4817E by setting the status flag in field 130L to "closed".

At step 1809, server software 110 assembles reply message CS2, according to server message assembly procedure 1000. Server message assembly procedure 1000 was previously described for message R2, with reference to FIG. 12. The content of message CS2 (FIGS. 40A and 40B) is now described.

Label-value pair 4913A has the label "id". The value of label-value pair 4913A indicates the persona id for customer user 203. The value of label-value pair 4913A is obtained from the value of label-value pair 4813A of message CS1.

Label-value pair 4913B has the label "transaction". The value of label-value pair 4913B is a transaction number. The value of label-value pair 4913B is the same as that received in message CS1 in label-value pair 4813B.

Label-value pair 4913C has the label "date". Label-value pair 4913C has the same value as label-value pair 4813C of message CS1.

Label-value pair 4913D has the label "service-category". Label-value pair 4913D has the same value as label-value pair 4813E of message CS1.

The opaque section contents of message CS2 are shown in FIG. 40B where label-value pair 4917A has the label "type". The value of label-value pair 4917A references a record in message data structure 270 (FIG. 5A) which sets forth the labels of the opaque section contents of message CS2. The value of label-value pair 4917A is obtained from server software 110.

Label-value pair 4917B has the label "server-date". The value of label-value pair 4917B indicates the date and time message CS2 was assembled according to the clock of server computer 100.

Label-value pair 4917C has the label "response-code". The value of label-value pair 4917C indicates whether close session process 411 was a success or failure.

Label-value pair 4917D has the label "swseverity" (software severity). The value of label-value pair 4917D indicates whether customer application software 210 needs to be updated, but is still usable ("warning") or is no longer usable ("fatal"). The value of label-value pair 4917D is null if customer application software 210 is current.

Label-value pair 4917E has the label "swmessage" (software message). The value of label-value pair 4917E indicates instructions as to what customer user 203 should do in the case of a "fatal" or "warning" software severity. The value of label-value pair 4917E is only present if the value of label-value pair 4917D is not null.

Label-value pair 4917F has the label "message". The value of label-value pair 4917F is a free text message associated with an error or success condition returned in label-value pair 4917C and is displayed to customer user 203.

Label-value pair 4917G has the label "fee". The value of label-value pair 4917G indicates a fee, if any, charged to customer user 203 for processing message CS1.

Label-value pair 4917H has the label "amount" and indicates the amount of electronic funds remaining from the amount allocated to the session during open session process 407 after all payments and fees are deducted. If the process of message CS1 is successful, the amount represented by label-value pair 4917H will be added to cash container field 120G.2 (FIG. 4C).

The assembly of message CS2 is now complete.

Referring again to FIG. 38, at step 1809A, message CS2 is sent (transmitted) from server computer 100 to customer computer 200.

At step 1810, customer computer 200 receives message CS2 from server computer 100 and unwraps message CS2 by executing message unwrap procedure 1100. Message unwrap procedure 1100 for message CS2 was previously described for message R2 with reference to FIG. 14.

At step 1811,
(1) if an error flag was set at step 1105, the flag will be detected at step 1811 and processing of message CS2 will terminate at step 1812. From the perspective of customer user 203, no further action is taken with respect to message CS2. In the present invention, a mechanism is provided within customer application software 210 to create and send to server computer 100 a message. This message includes the CS2 message as received by customer computer 200 and any diagnosis of what caused the message to fail. No response to this message is sent by server computer 100 to customer computer 200. Rather, the information is used to ascertain whether a problem exists within the system and if appropriate corrective measures need to be taken.

(2) if no error flag was set at step 1105 but an error in message CS1 was detected at step 905, processing will continue at step 1813 where the content of label-value pair 4717C is checked. If the value of label-value pair 4917C is other than "success", error processing routines are performed at step 1815 causing customer application software 210 to display the message contained in label-value pair 4917F associated with the content of label-value pair 4917C and to interpret the value of label-value pair 4917C and take whatever action may be associated with that value; or (3) if message CS1 passed the check at step 905 and no flags were set at step 1105, processing continues at step 1816 where customer application software 210 updates customer data structure 202 as follows:

The amount from label-value pair 4917H is added to field 220J.

Record 267 of customer log data structure 260 is updated as follows: the persona id from label-value pair 4913A is stored in field 267H. The transaction number from label-value pair 4913B is stored in field 267B. The date from label-value pair 4917B is stored in field 267C. The response-code from label-value pair 4917C is stored in field 267F. The software severity code from label-value pair 4917D is stored in field 267D. The software-message from label-value pair 4917E is stored in field 267E. The response message associated with the response code from label-value pair 4917F is stored in field 267G. The fee from label-value pair 4917G is stored in field 267K. The amount from label-value pair 4917H is stored in field 267I.

If the value of request-log label-value pair 4817F in message CS1 was set to "yes", a report will be delivered to customer computer 200 of all transactions initiated by customer user 203 during the session just closed.

Processing continues at step 1817 where close session process 411 ends.

V. Sample Transaction

Below is a description of a sample transaction. In the sample transaction, customer user 203 and merchant user 303 each perform registration process 401, instrument binding process 403, load/unload process 405, open session process 407, transaction payment process 409, and close session process 411. By performing these processes, customer user 203 is able to purchase a pair of "rocket shoes" from Acme Products.

It should be noted that in the current invention, message label-value pairs for which no value have been assigned are preferably not included in a transmitted message. This attribute of the current invention is reflected in the sample messages depicted below.

A. Registration process 401

Registration process 401 is identical for a customer and a merchant. Only the registration of customer user 203 is described below.

Customer user 203 runs customer application software 210 which prompts customer user 203 for its assent to one or more legal agreements. In response to a request for customer user 203's assent to a legal agreement, customer user 203 selects "agreed". Customer application software 210 then prompts customer user 203 for the following information: a desired persona id, the email address of customer user 203, the desired language in which any error messages will be displayed, the autoclose passphrase to be associated with the persona, and the default currency of the persona.

In response to a prompt for a desired persona id, customer user 203 selects "brianb". In response to a prompt for an the email address, customer user 203 enters "brianb@reality.com". In response to a prompt for the desired language for error messages, customer user 203 selects "English". In response to a prompt for the autoclose passphrase associated with the persona, customer user 203 enters "badnews". In response to a prompt for the default currency of the persona, customer selects "U.S. dollars".

Customer user 203 is prompted to enter a password. Customer user 203 then enters "enterprise". Customer user 203 is prompted to re-enter the password and complies. Customer application software 210 then generates a RSA public/private key pair and initiates the creation of message R1 as previously described, which message will include the following:

| | |
|---|---|
| transaction-number: | 2277052 |
| date: | 19951105100505456 |
| serverkey: | CC1001 |
| type: | registration |
| service-category: | admin |
| opaque: | |
|     server-date: | 19951105100506656 |
|     swversion: | 1.0win |
|     content-language: | en-us |
|     default-currency: | usd |
|     requested-id: | BrianB |
|     email: | brianb@reality.com |
|     agreements: | 75 |
|     autoclose-passphrase: | badnews |
|     pubkey: | aslfflasdflasjylfdjslyafkjfjslakjfyldskajyflkajsyldfjlaskfaslfj flasflasjykjfjslakjfjuyresdfutkpoiuqwasderfgthyujikolpkm n75cxz1 |
|     signature: | sdjflsajflksjdlkfjlsakjflkdsajflksjfjslakjfyldskajyjfjslakjfylds kajydjlfasdloprytuazxcnmklokmnuhbvgytfcdxszaqwe3r5t6 y7u8io09km+ |

Server computer 100 creates a new record 140.1 in server message log 140 and saves a copy of message R1 in field 140E. Server computer 100 then unwraps message R1 and processes it as previously described and updates record 140.1 of server message log 140 as

| | |
|---|---|
| persona-id: | brianb-23 |
| session-id | |
| tranaction-number: | 2277052 |
| index: | |
| incoming-message: | copy of message R1 |
| response-message: | |

Server computer 100 then compares the id requested by customer user 203 to the list of existing personas. If the requested persona id is unique, it creates a persona record 120.1 for customer user 203 as follows:

```
persona-id:              brianb-23
email:                   brianb@reality.com
public-key:              aslfjflasdflasjylfdjslyafkjfjslakjfyldskajyflkajsyldfjlaskfaslfjflasdfla
                         sjykjfjslakjfjuyresdfutkpoiuqwasderfgthyujikolpkmn75cxz1
date-registered:         19951105100507556
content-language:        en-us
autoclose-passphrase:    badnews
cash-container-data:
agreements:
instrument-binding-data:
```

Server computer 100 then assembles message R2, saves a copy of it in field 140F of record 140.1 of server message log data structure 140, and transmits message R2 to customer computer 200. Message R2 contains the following:

```
transaction:             2277052
date:                    19951105100505456
type:                    registration-response
service-category:        admin
opaque:
    server-date:         19951105100507556
    requested-id:        brianb
    response-id:         brianb-23
    email:               brianb@reality.com
    response-code:       success
    pubkey:              aslfjflasdflasjylfdjslyafkjfjslakjfyldskajyflkajsyldfjlaskfaslfj
                         flasdflasjykjfjslakjfjuyresdfutkpoiuqwasderfgthyujikolpkm
                         n75cxz1
    swseverity:          warning
    swmessage;           New software is available.
```

Customer computer 200 unwraps and processes message R2 as previously described. Customer application software 210 creates a record of persona "brianb-23" in customer persona data structure 220 as follows:

```
persona-id:              brianb-23
email:                   brianb@reality.com
public-key:              aslfjflasdflasjylfdjslyafkjfjslakjfyldskajyflkajsyldfjlaskfaslfj
                         flasdflasjykjfjslakjfjuyresdfutkpoiuqwasderfgthyujikolpkm
                         n75cxz1
date-registered:         19951105100507556
content-language:        en-us
autoclose-passphrase:    badnews
cash-container-data:
agreements:              75
instrument-binding data:
software-options:        default
private-key:             8ikuhbrfvedc3erfg56yu87yg0okmsdfghjk3erfqwerty7yuh8i
                         j7yfgdcsdfv6y89i0oolujmhncvzx2wdplkjhgffdsawe/9+45rf
                         6tg7yhkjhgf2waaz4ed5tgfv
```

B. Instrument Binding Process 403

Instrument binding process 403 is the same for both customers and merchants. Only the binding of an instrument by customer user 203 will be described.

Bind instrument process 403 begins when customer user 203 selects the bind instrument operation from the client application. Customer application software 210 prompts customer user 203 for a default name and address. Customer user 203 then enters "Brian Brian, 100 Elm Street, Nice Place, Va. 00000 U.S.A.".

Customer user 203 selects "bank account" and is prompted for the following information: bank account number; whether the bank account is the autoclose account for the persona; a description of the account; and customer user 203's assent to one more legal agreement. Customer user 203 is prompted to change any information necessary to describe the name, address, and telephone number of the holder of the instrument.

In response to a prompt for a the bank account number, customer user 203 enter "059013218175654". In response to a prompt to the response for whether the account is the autoclose account for the persona, customer user 203 enters "yes". In response to a prompt to change the displayed name, address, and telephone number, customer user 203 declines.

In response to a prompt for a description of the account, customer user 203 enters "My fun account". In response to a prompt for customer user 203's assent to a legal agreement, customer selects "agreed". Customer user 203 is prompted to "bind instrument" with server computer 100.

This act causes customer application software 210 to create a message BI1 as previously described, which message will include the following:

| | |
|---|---|
| id: | brianb-23 |
| transaction-number: | 2277053 |
| date: | 19951125100510589 |
| serverkey: | CC1001 |
| service-category: | admin |
| opaque: | |
|     type: | bind-instrument |
|     server-date: | 19951125100512689 |
|     swversion: | 1.0win |
|     instrument-number; | 059013218175654 |
|     instrument-type: | dda |
|     instrument-category: | dda |
|     instrument-functions: | load, unload |
|     instrument-salt: | 4bnm8poetqv= |
|     instrument-name: | Brian Q. Brian |
|     instrument-street: | 100 Elm Street |
|     instrument-city: | Nice Place |
|     instrument-state: | VA |
|     instrument-postal-code: | 0000 |
|     instrument-country: | USA |
|     agreements: | 75,123 |
|     autoclose: | yes |
|     autoclose-passphrase: | badnews |
|     key: | 4/Roos+2ac8= |
|     signature: | sjadlkaslzfzlksajzlffzlksajzlffzlksajzlffzlksajzlffzlksajzl ffzlksajzlfjszlfjsldfjlskflsajfsa/9iu7hgfce/juy+poiuh nbvcdewqazxp |

Server computer creates a new record 140.2 in server message log 140 and saves a copy of message BI1 in field 140E. Server computer 100 then unwraps message BI1 and processes it as previously described and updates record 140.2 of server message log 140 as follows:

| | |
|---|---|
| persona-id: | brainb-23 |
| session-id | |
| transaction-number: | 2277053 |
| index: | |
| incoming-message: | copy of BI1 |
| response-message: | |

Server computer 100 then updates server persona data structure 120.1 for persona "brianb-23" by entering "badnews" into the autoclose passphrase field 120F and by adding instrument binding data to field 120H as follows:

| | |
|---|---|
| persona-id: | brianb-23 |
| instrument-type: | dda |
| Instrument-number: | aswerfcvg [encrypted] |
| Instrument-native currency | usd |
| Instrument-prefix: | 055654 |
| Legal-agreements: | 75, 123 |
| Instrument-hash: | uou980y57rd98jnhgt54e3== |
| Issuer-identification number: | 735980 |
| Instrument-holder-name: | lkpipoipoi [encrytped] |
| Instrument-holder-address: | oipipoipipo [encrypted] |
| Instrument-bind-date: | 19951125100513583 |
| Instrument-first-used-date: | |
| Binding-status: | created |
| Sale-transaction-enabled: | no |
| Sale-transaction-limit: | |
| Credit-transaction-enabled: | no |
| Credit-transaction-limit: | |
| Load-cash-enabled: | yes |
| Load-cash-transaction limit: | usd 1000.00 |
| Unload-cash-enabled: | yes |

-continued

| | |
|---|---|
| Unload-cash-transaction limit: | −1 |
| Autoclose-binding: | yes |

Server computer 100 then assembles message BI4, saves a copy of it in field 140F of record 140.2 of server message log 140, and sends message BI4 to customer user 203. Message BI4 contains the following:

| | |
|---|---|
| persona-id: | brianb-23 |
| transaction-number: | 2277053 |
| date: | 19951125100510589 |
| service-category: | admin |
| opaque: | |
|     type: | bind-instrument-response |
|     server-date: | 19951125100513583 |
|     response-code: | success |
|     swseverity: | warning |
|     swmessage; | New software is available. |
|     instrument-number: | 059013218175654 |
|     instrument-type: | dda |
|     instrument-issuer: | East Bank of the Mississippi |
|     instrument-issuer-country: | us |
|     instrument-functions: | load, unload |
|     instrument-number: | 059013218175654 |
|     instrument-type: | dda |
|     instrument-issuer: | East Bank of the Mississippi |
|     instrument-issuer-country: | us |
|     instrument-functions: | load, unload |
|     instrument-salt: | 4bnm8poetqv= |

Customer computer 200 unwraps message BI4 and processes it as previously described, then updates record 220.1 in customer persona data structure 220 for persona "brianb-23" by adding instrument binding data to field 220J as follows:

| | |
|---|---|
| persona-id | brianb-23 |
| instrument-number: | 059013218175654 |
| instrument-description: | my fun account |
| holder-name: | Brian Brian |
| holder-address: | 100 Elm Street |
| holder-city: | Nice Place, VA |
| holder-country: | USA |
| holder-postal-code: | 00000 |
| holder-country-code: | 1 |
| holder-area-code: | 703 |
| holder-telephone: | 555-1212 |
| currency: | usd |
| transact-sale-flag: | no |
| transact-credit-flag: | no |
| unload-funds-flag: | yes |
| load-funds-flag: | yes |
| status: | approved |
| instrument-recurring-data: | instrument-number:059013218175654\|instrument-type:dda\|instrument-issuer:EastBankofthe Mississippi\|instrument-issuer-country:us\|instrument-functions:load,unload\|instrument-salt:4bnm8poetqv= |
| agreements: | 75,123 |

C. Load/unload Process 405

Load/unload process 405 begins when customer user 203 selects the load operation from customer application software 210. Customer application software 210 then prompts customer user 203 for the instrument from which to load funds to persona brianb-23. Customer user 203 selects "my fun account" and is prompted for the amount to be transferred. In response to a prompt for the amount, customer user 203 enters $100.00. Customer application software 210 then assembles message LU1 as previously described and sends it to server computer 100. Message LU1 contains the following information:

| | |
|---|---|
| id: | brianb-23 |
| transaction-number: | 2277054 |
| date: | 19951105103517688 |
| serverkey: | CC1001 |
| service-category: | cash |
| opaque: | |
|    type: | load-unload-funds |
|    server-date: | 19951105103519788 |
|    amount: | usd 100.00 |
|    key: | 4/Roos+2ac8= |
|    signature: | lljwlrjwlimceiwlcefjdwewleiciwlcefjdwewleiciwl cefjdwewleicjwlierqiqhodqhoiwehqxq23jioerpoiuklhgr qwer7y6tghjuiko09p+po9ijht5re3wx |

Server computer creates a new record 140.3 in server message log 140 and saves a copy of message LU1 in field 140E. Server computer 100 then unwraps message LU1 and processes it as previously described and updates record 140.3 of server message log 140 as follows:

| | |
|---|---|
| persona-id: | brainb-23 |
| session-id: | |
| transaction-number: | 2277054 |
| index: | |
| incoming-message: | copy of LU1 |
| response-message: | |

Server computer 100 then updates customer persona record 120.1 by adding cash container data to field 120G as follows:

| | |
|---|---|
| Currency: | usd |
| Available-balance: | 100.00 |
| On-hold-balance: | 0.00 |
| Agency-account-number: | 113317834 |

Server computer 100 then assembles message LU2, saves a copy of it in field 140E of record 140.3 of server message log 140, and transmits message LU2 to customer computer 100. Message LU2 contains the following information:

| | |
|---|---|
| id: | brianb-23 |
| transaction-number: | 2277054 |
| date: | 19951105103517688 |
| service-category: | cash |
| opaque: | |
|    type: | load-unload-response |
|    server-date: | 19951105103607914 |
|    amount: | usd 100.00 |
|    response-code: | success |
|    message; | funds-loaded |
|    swseverity: | warning |
|    swmessage: | New software is available. |
|    fee: | usd 0.0 |
|    balance: | usd 100.00 |
|    session-funds: | usd 0.00 |
|    on-hold: | usd 0.00 |

Customer computer 200 unwraps message LU2 and processes it as previously described, then updates record 220.1 in customer persona data structure 220 for persona "brianb-23" by entering "usd 100" into cash container field 220J.

D. Open Session Process 407

Create session process 407 begins when customer user 203 selects the open session operation from customer application software 210. Customer application software 203 then prompts customer user 203 for the following information: desired session lifetime in minutes; maximum number of transactions to be conducted during session; the amount of funds to be available during the session; and a memo describing the session.

In response to a prompt for the desired lifetime of the session in minutes, customer user 203 enters "120". In response to a prompt for the maximum number of transaction to be conducted during the session, customer user 203 enters "25". In response to the prompt for the amount of funds to be available during the session, customer enters "70.00". In response to a prompt for a memo describing the session, customer user 203 enters "Christmas shopping spree."

Customer 200 then assembles a message OS1 and sends it to server computer 100. Message OS1 includes the following information:

```
id:                 brianb-23
transaction-number: 2277055
date:               19951105104131914
serverkey:          CC1001
service-category:   cash
opaque:
    type:           open-session
    server-date:    19951105104134014
    swversion:      1.0win
    record-note:    Christmas shopping spree
    amount:         usd 70.00
    key-lifetime:   0120
    key-uselimit:   25
    key:            4/Roos+2ac8=
    signature:      kasdjflasjdzlkfuoi579384ng09kdfgj09eurtndfbnb909nl
                    ktujwjsi86tjf9086ptjfgr6jir46edcloplaszxewqnym+09u
                    hgtr432zxcvbhgrewq12rg8mko01
```

Server computer creates a new record 140.4 in server message log 140 and saves a copy of message OS1 in field 140E. Server computer 100 then unwraps message OS1, processes it as previously described, and updates record 140.4 of server message log 140 as follows:

```
persona-id:          brianb-23
session-id:
transaction-number:  2277055
index:
incoming-message:    copy of OS1
response-message:
```

Server computer 100 then creates a record 130.1 in server session data structure 130 associated with persona id "brianb-23". Record 130.1 contains the following

```
Session-ID:         J/Pi+sqGtgH=
Session-Key:        7ujm8iktgTRrfv3edc9olk==
Session-Salt:       aa5yh8fdkl+=
Currency:           usd
Opening-Amount:     70.00
Current-Amount:     70.00
Opening-Date:       1995110510137179
Closing-Date:
Key-Use-limit:      15
Key-lifetime:       0060
```

```
Persona-ID:        brainb-23
Status:            open
Memo:              christmas shopping spree
Transaction-data:
```

Server computer 100 also updates record 120.1 in server persona data structure 120 associated with persona "brianb-23" by deducting the amount "70.00" from the amount "100.00" from the available balance field 120G.2 of the cash container previously described. Server computer assembles a message OS2, saves a copy of it in field 140F of record 140.4, and transmits message OS2 to customer computer 200. Message OS2 includes the following information:

```
id:                 brianb-23
transaction:        2277055
date:               19951105104131914
service-category:   cash
opaque:
    type:           open-session-response
```

```
server-date:        19951105104137179
response-code:      success
swseverity:         warning
swmessage;          New software is available.
key-lifetime:       0060
key-uselimit:       15
amount:             usd 70.00
foreign-exchange:   cad 0.60 gbp 1.55
session-funds:      usd 70.00
balance:            usd 30.00
on-hold:            usd 0.00
fee:                usd 0.00
session-id:         J/Pi+sqGtgH=
session-key:        7ujm8iktgTRrfv3edc9olk==
session-salt:       aa5yh8fdkl+=
```

Customer computer 200 unwraps message OS2 and processes it as previously described, then creates a new record 240.1 in customer session data structure 240 associated with persona "brianb-23" as follows:

```
Session-ID:        J/Pi+sqGtgH=
Session-Key:       7ujm8iktgTRrfv3edc9olk==
Session-Salt:      aa5yh8fdkl+=
Currency:          usd
Opening-Amount:    70.00
```

-continued

| | |
|---|---|
| Current-Amount | 70.00 |
| Opening-Date: | 19951105104137179 |
| Key Use-limit: | 15 |
| Key-lifetime: | 0060 |
| Memo: | christmas shopping spree |

The process whereby merchant user 303 opens a session is the same except that a merchant will not transfer funds from its persona cash container to a session register. This is because a merchant expects to receive funds and does not need funds available to it during a selling session. Server computer 100 creates a record 130.2 in server session data structure 130 associated with merchant user 303's persona "acme-12" as follows:

| | |
|---|---|
| session-ID: | k/iL+tpPmHg= |
| session-key: | 3ejkPOM7T+poBQW9ipqwZ8== |
| session-salt: | qw89lk3vAZ== |
| currency: | usd |
| opening-amount: | 0.00 |
| current-amount: | 0.00 |
| opening-date: | 110595063012147 |
| closing-date: | |
| key-use-limit: | 090 |
| key-lifetime: | 0960 |
| persona-ID: | acme-12 |
| status: | open |
| memo: | shoe department sales |
| transaction-data: | |

Upon opening a session, merchant computer 303 creates a new record 370.1 in merchant cash log data structure 370 as follows:

| | |
|---|---|
| type: | open-session |
| status: | open |
| transaction-number: | 55443322 |
| requested-session-duration: | 0960 |
| requested-session-count: | 90 |
| session-id: | k/iL+tpPmHg= |
| result-code: | success |

E. Transaction Payment Process 409

Transaction payment process 409 begins when customer user 203 responds to an offer from merchant user 303 to sell rocket shoes under specified terms by selecting "cash payment" as the mechanism for payment. This act causes merchant computer 300 to assemble message PR1 and transmit it to customer computer 200 as previously described. Message PR1 includes the following information:

| | |
|---|---|
| type: | payment-request |
| merchant-ccid: | Acme-12 |
| merchant-order-id: | 1231-3424-234242 |
| merchant-date: | 19951105104536378 |
| merchant-swversion: | foo69 |
| note; | ACME Products |
| | Purchase of 1 pair "Rocket Shoes" at $37.50 ea. |
| | Shipping and handling $5.00 |
| | Total Price: $42.50 |
| | Ship to: |
| | Brian Brian |
| | 100 Elm Street |
| | Nice Place, VA 00000 USA |
| merchant-amount: | usd 42.50 |
| merchant-amount2: | cad 54.25 |
| accepts: | visa; master; amex; JCPenny; macy |
| url-pay-to: | http://www.ACME.com/ServerPayment |
| url-cancel: | http://www.ACME.com/CyberPayment |
| | Cancel |
| url-success: | hffp://www.ACME.com/ordersuccess |
| url-fail: | http://www.ACME.com/orderfail |
| merchant-signed-hash-key: | lSLzs/vFQ0BXfU98LZNWhQ== |
| merchant-signed-hash: | klfjlkdfglkdfsutkdfjglds7503qwrtjtyuvnvidur09e58fdj908 6jCS985kf9086kg9894j6g-r094543jvndmkzazqpl |

Merchant computer 300 also creates a new record 350.1 of merchant amount data structure 350 as follows:

| | |
|---|---|
| order-id: | 1231-3424-234242 |
| amount-of-transaction: | usd 42.50 |
| flag: | pending |

Customer computer 200 processes message PR1 as previously described. In response to a prompt from customer application software 210, customer user 203 indicates its acceptance of the offer of merchant user 203 by selecting "pay cash". This act causes customer computer 200 to assemble message CA1 and transmit it to merchant computer 300. Message CA1 includes the following information:

| | |
|---|---|
| type: | cash-payment |
| version: | 1 |
| session-id: | J/Pi+sqGtgH= |
| index: | 1 |
| payee-currency: | usd |
| note-hash: | tyriokljhgbvxczm7rfde4== |
| payee-id: | acme-12 |
| order-id: | 1231-3424-234242 |
| service-category: | cash |
| opaque: | |
| amount: | usd 42.50 |
| auth-code: | iou234rfgvbmcxp+poliu7== |

Merchant computer 300 processes message CA1 as previously described. Merchant computer 100 then assembles message CA2 as previously described and transmits it to server computer 100. Message CA2 includes the following information:

| | |
|---|---|
| version: | 1 |
| session-id: | k/iL+tpPmHg= |
| index: | 77 |
| service-category: | cash |
| merchant-opaque: | |
|     type: | cash-collection |
|     version: | 1 |
|     $type_n$: | Cash-payment |
|     $subversion_n$: | 1 |
|     $payer\text{-}session\text{-}id_n$: | J/Pi+sqGtgH= |
|     $payer\text{-}index_n$: | 1 |
|     $note\text{-}hash_n$: | kchfiZ5WAUlpk1/vlogwuQ== |
|     $payee\text{-}id_n$: | Acme-12 |
|     $order\text{-}id_n$: | 1231-3424-234242 |
|     $merchant\text{-}amount_n$: | usd 42.50 |
|     auth-code: | UjkHgtK/38uhzxs9io3+PL== |
| customer-opaque: | jksyfditdfkjgdfut029jf9q0875jCSjmgmbnfiur86fm9345kd kjrjghnvmfhazaplaksdijdfhjgutiroklop8trewqasz |

Merchant computer 300 updates record 370.1 of merchant cash log data structure 370 by adding the following additional data to the existing record (all of record 370.1 is shown for clarity):

| | |
|---|---|
| type: | cash payment |
| status: | pending |
| order-id: | 1231-3424-234242 |
| customer-session-ID: | J/Pi+sqGtgH= |
| customer-index-number: | 1 |
| customer-currency: | usd |
| merchant-session-ID: | k/iL+tpPmHg= |
| merchant-index-number: | 77 |
| merchant-currency: | usd |
| merchant-amount-requested: | 42.50 |
| amount-credited: | 42.50 |
| fees-paid: | 0.00 |
| type: | open-session |
| status: | open |
| transaction-number: | 78765437 |
| requested-session-duration: | 0960 |
| requested-session-count: | 90 |
| session-ID: | k/iL+tpPmHg= |
| result-code: | success |

Server computer creates a new record 140.5 in server message log 140 and saves a copy of message CA2 in field 140E. Server computer 100 then unwraps message CA2, processes it as previously described. Server computer 100 checks records 130.1 and 130.2 of server session data structure 130 to determine if both persona brianb-23 and persona acme-12 have open sessions. If a session is invalid, server computer terminates transaction payment process 409. Here, server computer 100 proceeds and updates record 140.5 of server message log 140 as follows:

| | |
|---|---|
| persona-id: | acme-12 |
| session-id: | k/iL+tpPmHg= |
| transaction-number: | |
| index: | 77 |
| incoming-message: | copy of message CA2 |
| response-message | |

Server computer also updates record 130.1 of server session data structure 130 by associating the following information with transaction data field 130N:

| | |
|---|---|
| amount: | usd 42.50 |
| customer-session-id: | J/Pi+sqGtgH= |
| merchant-order-id: | 1231-3424-234242 |
| merchant-persona-id: | acme-12 |
| customer-index: | 1 |

Server computer also updates record 130.2 of server session data structure 130 by associating the following information with transaction data field 130NN:

| | |
|---|---|
| amount: | usd 42.50 |
| customer-session-id: | J/Pi+sqGtgH= |
| merchant-order-id: | 1231-3424-234242 |
| merchant-persona-id: | acme-12 |
| merchant-index: | 77 |

Server computer 100 then assembles message CA3 and transmits it to merchant computer 300 as previously described. Message CA3 includes the following information:

| | |
|---|---|
| type: | from-server |
| version: | 1 |
| session-id: | k/iL+tpPmHg= |
| index: | 77 |
| service-category: | cash |
| merchant-opaque: | |
|     subtype: | cash-batch-receipt |
|     subversion: | 1 |
|     request-version: | 1 |
|     response-code: | success |
|     fee: | usd 0.00 |
|     $subtype_n$: | cash-payment-receipt |
|     $subversion_n$: | 1 |
|     $payer\text{-}session\text{-}id_n$: | J/Pi+sqGtgH= |
|     $payer\text{-}index_n$: | 1 |
|     $response\text{-}code_n$: | success |
|     $collected\text{-}amount_n$: | usd 42.50 |
|     order-id: | 1231-3424-234242 |
|     auth-code: | p12P+/BNfr59dsXz+lmnTP== |
| customer-opaque: | |
|     service-category: | cash |
|     response-code: | success |
|     amount: | usd 42.50 |
|     order-id: | 1231-3424-234242 |
|     auth-code: | kjTUY7f7zr+pGB65RXE+hc== |

Merchant computer 300 unwraps message CA3 and processes it as previously described. Merchant computer 300 updates record 350.1 of merchant amount data structures 350 by setting flag field 350C to "paid".

Merchant computer 300 updates record 370.1 of merchant cash log data structure 370 as follows:

Status field 370B is set to "success". Amount credited field 370k is set to "usd 42.50".

Merchant computer assembles message CA4 and transmits it to customer computer 200. Message CA4 includes the following information:

```
type:            cash-payer-receipt
version:         1
session-id:      k/iL+tpPmHg=
service-category: cash
index:           77
order-id:        1231-3424-234242
opaque:
     response-code: success
     amount:        usd 42.50
     order-id:      1231-3424-234242
     auth-code:     mhgD4QaBPkj+vWkjHytR5J==
```

Customer computer 200 unwraps and processes message CA4 as previously described. Customer computer 200 updates record 240.1 of customer session data structure 240 by deducting "$42.50" from current amount field 240F leaving a balance of $27.50.

F. Close Session Process 411

Close session process 411 begins when customer user 203 chooses the close session prompt from the display on customer computer 200. This act causes customer computer 200 to assemble message CS1 and transmit it to server computer 100 as previously described. Message CS1 includes the following information:

```
id:              brianb-23
transaction:     2277056
date:            19951105110223666
serverkey:       CC1001
service-category: cash
opaque:
     type:         close-session
     server-date:  19951105110225766
     swversion:    1.0win
     session-id:   J/Pi+sqGtgH=
     request-log:  No
     key:          4/Roos+2ac8=
     signature:    kasdjfzlskadufsodpirulksdnzlskd803dipodsifdfsadybmipjg4eazqer
                   98jfejoiudfji98ytrnmvcxzaqw23rgtyhpmklo1qaszxsw34rfvgy+09o
                   kiju7yhnbg
```

Server computer creates a new record 140.6 in server message log 140 and saves a copy of message CS1 in field 140E. Server computer 100 then unwraps message CS1, processes it as previously described, and updates record 140.6 as follows:

```
persona id:        brainb-23
session id:
transaction:       2277057
index:
incoming-message:  copy of CS1
response-message:
```

Server computer 100 then updates record 130.1 in server session data structure 130 associated with persona id "brianb-23" by adding the value in current amount field 130F ($27.50) to the amount in the available balance field 120G.2 of the cash container previously described for a balance of $57.50, by entering the value "19951105110301999" into closing date field 130H, and by changing status field 130L from "open" to "closed" and.

Server computer assembles a message CS2, saves a copy of it in field 140F of recored 140.6, and transmits message CS2 to customer computer 200. Message CS2 includes the following information:

```
id:              brianb-23
transaction:     2277057
date:            19951105110223666
service-category: cash
opaque:
     type:            close-session-response
     server-date:     19951105110301999
     response-code:   success
     swseverity:      warning
     swmessage;       New software is available.
     fee:             usd 0.00
     amount:          usd 27.50
```

Customer computer 200 unwraps and processes message CS2 as previously described. Customer computer 200 updates field 220I of record 220.1 of customer persona data structure 220 by adding $27.50 to the current value of field 220I ($30.00) for a balance of $57.50. Customer computer 200 deletes record 240.1 of customer session data structure 240.

While the foregoing description of the present invention has been given as an example, it will be appreciated by those of ordinary skill in the art that various modifications, alternate configurations and equivalents may be used without departing from the spirit and scope of the present invention.

We claim:

1. A method for securely communicating in a communication system, wherein the communication system comprises a first device at a first party's location, a second device at a second party's location, and a server in communication therewith, wherein the method comprises:

(a) creating a first session associated with the first party, wherein said first session has first use parameters for limiting the duration that said first session can be used and a first set of data, wherein said first use parameters and said first set of data are identifiable by the server;

(b) creating a second session associated with the second party, wherein said second session has second use parameters for limiting the duration that said second session can be used and a second set of data, wherein said second use parameters and said second set of data are identifiable by the server; and (c) linking a portion of said first session with a portion of said second session in the communication system, wherein said portion of said first session includes said first set of data and said first use parameters and said portion of said second session includes said second set of data and said second use parameters;
(d) verifying the first and second parties based upon at least portions of said first and second sets of data by the server; and
(e) determining whether said first and second sessions can be used based upon said first and second use parameters by the server
so that when the server verifies the first and second parties and determines that said first and second sessions can be used, the first and second parties are assured of communicating securely in the communication system.

2. The method of claim 1 wherein certain of said first set of data is not transmitted between the first device and the server after said first session is created and certain of said second set of data is not transmitted between the second device and the server after said second session is created.

3. The method of claim 2 wherein said first and second sets of data include first and second keys, respectively, and wherein the server verifies the first and second parties using said first and second keys.

4. The method of claim 1 wherein said first use parameters are determined by the first party and said second use parameters are determined by the second party.

5. The method of claim 1 wherein said first and second use parameters are determined by the server.

6. The method of claim 1 wherein said amount of electronic funds have (a) an amount of electronic funds available to the first party for the duration of said first session, (b) a length of time that said first session will last and (c) a number of transactions that the first party may perform during said first session.

7. The method of claim 1 wherein said second use parameters comprise (a) a length of time that said second session will last and (b) a number of transactions that the second party may perform during said second session.

8. A method for securely communicating in a communication system, wherein the communication system has a device at a user's location and a server in communication therewith, wherein the method comprises:
 a. transmitting a request from the device to the server for creating a session having use parameters associated therewith;
 b. encrypting a first key with a second key by the server;
 c. transmitting said encrypted first key and said use parameters associated with said session from the server to the device;
 d. receiving said encrypted first key and said use parameters by the device and decrypting said encrypted first key so that the device can communicate securely in the communication system by using said decrypted first key according to said use parameters.

9. The method of claim 8, wherein said first key is a DES key.

10. The method of claim 9, wherein said second key is a DES key.

11. The method of claim 8, wherein said secure communication is at a security level greater than DES.

12. The method of claim 8, further comprising a second device at a second user's location wherein said second device is also in communication with the user's device and the server and wherein the method further comprises:
 a. transmitting a second request from the second device to the server for creating a second session having second use parameters associated therewith;
 b. encrypting a third key with a fourth key by the server;
 c. transmitting said encrypted third key and said second use parameters from the server to the second device;
 d. receiving said encrypted third key and said second use parameters by the second device and decrypting said third key so that the second device can communicate securely in the communication system by using said decrypted third key according to said second use parameters.

13. The method of claim 12, wherein said third key is a DES key.

14. The method of claim 12, wherein said fourth key is a DES key.

15. The method of claim 12, wherein said secure communication is at a security level greater than DES.

16. The method of claim 12, further comprising:
 a. transmitting a first set of data from the user's device to the second device, wherein said first set of data includes an encrypted portion and an unencrypted portion, wherein said encrypted portion is encrypted using said decrypted first key and at least a portion of said unencrypted portion of said first set of data;
 b. receiving said first set of data by the second device and transmitting a second set of data together with said encrypted portion of said first set of data from the second device to the server, wherein said second set of data includes an encrypted portion and an unencrypted portion, wherein said encrypted portion of said second set of data includes at least a portion of said unencrypted portion of said first set of data, and wherein said encrypted portion of said second set of data is encrypted using said decrypted third key and at least a portion of said unencrypted portion of said second set of data; and
 c. receiving said second set of data transmitted from said second device by the server and decrypting said encrypted portion of said second set of data using said third key and said portion of said unencrypted portion of said second set of data so that said portion of said first set of data included in said encrypted portion of said second set of data is decrypted, and decrypting said encrypted portion of said first set of data using said first key and said portion of said decrypted portion of said first set of data,
so that the user is verified by the server using said first key and the second user is verified by the server using said third key.

17. An electronic transfer system in a communication network for processing a transaction between a customer having a customer device, a merchant having a merchant device, and a server connected therewith, wherein the transaction has terms associated therewith and wherein the server transfers electronic funds from the customer to the merchant so that the merchant can provide a product to the customer, wherein the electronic transfer system comprises:
 a. the merchant device for
  (1) obtaining a first session from the server,
  (2) transmitting an invoice including at least a portion of the terms of the transaction to the customer device,
  (3) receiving a customer response to said invoice from the customer device and transmitting a first set of data representing the transaction to the server, wherein said first set of data includes at least a portion of said customer response,
  (4) receiving a second set of data from the server indicating whether the transaction has been approved by the server, wherein said second set of data includes a merchant part and a customer part, wherein said merchant part and said customer part of said second set of data include at least a portion of said first set of data; and (5) transmitting said customer part of said second set of data to the customer device;

b. the customer device for
  (1) obtaining a second session from the server,
  (2) receiving said invoice including said portion of the terms of the transaction from said merchant device and transmitting said portion of said customer response to the merchant device, and
  (3) receiving said customer part of said second set of data from the merchant device;

c. the server having a merchant persona and customer persona stored therein, wherein said merchant persona represents the merchant and said customer persona represents the customer, wherein said merchant persona has a merchant electronic funds storage structure associated therewith for storing electronic funds received by the merchant and said customer persona has a customer electronic funds storage structure associated therewith for storing electronic funds of the customer, wherein the server is for
  (1) providing said first session to said merchant device and said second session to said customer device,
  (2) receiving said first set of data representing the transaction from the merchant device and processing said first set of data to determine whether the transaction has been approved,
  (3) transferring electronic funds from said customer electronic funds storage structure to said merchant electronic funds storage structure if the transaction has been approved, and
  (4) transmitting said second set of data to the merchant device indicating whether the transaction has been approved so that if the transaction has been approved, the merchant can provide the product to the customer.

18. The electronic transfer system of claim 17, wherein the merchant device further comprises communicating with the server to bind a first financial instrument to said merchant persona; and wherein the customer device further comprises communicating with the server to bind a second financial instrument to said customer persona.

19. The electronic transfer system of claim 18, wherein the customer device further comprises transmitting a request to the server to transfer funds from said second financial instrument to said customer electronic funds storage structure; and wherein the server further comprises receiving and processing said request to transfer funds and for transferring funds from said second financial instrument to said customer electronic funds storage structure.

20. The electronic transfer system of claim 19, wherein the customer device includes a customer session container for storing electronic funds of the customer during said second session, and further comprises transmitting a second request to the server for transferring electronic funds from said customer electronic funds storage structure to said customer session container; and wherein the server further comprises processing said second request and transferring the electronic funds from said customer electronic funds storage structure to said customer session container.

21. The electronic transfer system of claim 20, wherein the use of said first session is limited by first use parameters comprising (a) a length of time that said first session may last and (b) a number of transactions that the merchant may perform during said first session; and wherein the use of said second session is limited by second use parameters comprising (a) an amount of electronic cash available to the customer during said second session, (b) a length of time that said second session may last and (c) a number of transactions that the customer may perform during said second session.

22. The electronic transfer system of claim 21, wherein the merchant device further comprises transmitting a third request for transferring electronic funds from said merchant session container to said merchant electronic funds storage structure; and wherein the customer device further comprises transmitting a fourth request for transferring electronic funds from said customer session container to said customer electronic funds storage structure; and the server further comprising processing said third request and for transferring electronic funds from said merchant session container to said merchant electronic funds storage structure and for processing said fourth request and for transferring electronic funds from said customer session container to said customer electronic funds storage structure.

23. The electronic transfer system of claim 21, wherein the server further comprises transferring electronic funds from said merchant session container to said merchant electronic funds storage structure when at least one of said first use parameters is satisfied; and transferring electronic funds from said customer session container to said customer electronic funds storage structure when at least one of said second use parameters is satisfied.

24. The electronic transfer system of claim 22 wherein the server further comprises terminating said first and second sessions when at least one of said first and second use parameters have been satisfied.

25. The electronic transfer system of claim 23, wherein the merchant device further comprises transmitting a fifth request to the server for transferring electronic cash funds from said merchant electronic funds storage structure to said first financial instrument; and the server for processing said fifth request and for transferring electronic funds from said merchant electronic funds storage structure to said first financial instrument.

* * * * *